United States Patent
Kusaka

(10) Patent No.: US 8,310,590 B2
(45) Date of Patent: Nov. 13, 2012

(54) IMAGE SENSOR AND IMAGE-CAPTURING DEVICE WITH IMAGE-CAPTURING AND FOCUS DETECTION PIXELS

(75) Inventor: Yosuke Kusaka, Yokohama (JP)

(73) Assignee: Nikon Corporation, Tokyo (JP)

( * ) Notice: Subject to any disclaimer, the term of this patent is extended or adjusted under 35 U.S.C. 154(b) by 1016 days.

(21) Appl. No.: 11/902,627

(22) Filed: Sep. 24, 2007

(65) Prior Publication Data

US 2008/0074534 A1 Mar. 27, 2008

(30) Foreign Application Priority Data

Sep. 27, 2006 (JP) .................. 2006-261831

(51) Int. Cl.
*H04N 5/238* (2006.01)
(52) U.S. Cl. ......... 348/364; 348/326; 396/111; 396/326
(58) Field of Classification Search .................. 348/326, 348/364; 396/111, 114
See application file for complete search history.

(56) References Cited

U.S. PATENT DOCUMENTS

| | | | |
|---|---|---|---|
| 5,241,167 A | 8/1993 | Suzuki et al. | |
| 6,781,632 B1 | 8/2004 | Ide | |
| 6,906,751 B1 * | 6/2005 | Norita et al. | 348/349 |
| 6,933,978 B1 | 8/2005 | Suda | |
| 7,283,737 B2 * | 10/2007 | Ohmura | 396/111 |
| 2002/0121652 A1 * | 9/2002 | Yamasaki | 257/222 |
| 2003/0193600 A1 | 10/2003 | Kitamura et al. | |
| 2004/0090550 A1 | 5/2004 | Park | |
| 2004/0125230 A1 * | 7/2004 | Suda | 348/345 |
| 2004/0169767 A1 * | 9/2004 | Norita et al. | 348/350 |
| 2005/0151866 A1 | 7/2005 | Ando et al. | |
| 2005/0190274 A1 * | 9/2005 | Yoshikawa et al. | 348/231.99 |
| 2006/0045507 A1 * | 3/2006 | Takamiya | 396/111 |
| 2007/0237511 A1 * | 10/2007 | Kusaka | 396/111 |

FOREIGN PATENT DOCUMENTS

| | | |
|---|---|---|
| EP | 0 290 802 A2 | 11/1988 |
| JP | A-H07-154670 | 6/1995 |
| JP | A-2001-124984 | 5/2001 |
| JP | A-2001-230964 | 8/2001 |
| JP | A 2005-277513 | 10/2005 |
| JP | A 2005-303409 | 10/2005 |
| JP | A-2007-214792 | 8/2007 |

OTHER PUBLICATIONS

Office Action issued in corresponding Japanese Application No. 2006-261831 on Aug. 2, 2011. (with English language translation).

* cited by examiner

*Primary Examiner* — Usman Khan
(74) *Attorney, Agent, or Firm* — Oliff & Berridge, PLC

(57) ABSTRACT

An image sensor includes: image-capturing pixels that generate first image signals with a charge storage time controlled by a first storage control signal; and focus detection pixels that generate second image signals with a charge storage time controlled by a second storage control signal generated independently of the first storage control signal.

23 Claims, 50 Drawing Sheets

201: digital still camera
202: interchangeable lens
203: camera body
204: mount unit
206: lens drive control device
207: aperture
208: zooming lens
209: lens
210: focusing lens
212: image sensor
213: electrical contact point portion
214: body drive control device
215: liquid crystal display element drive circuit
216: liquid crystal display element
217: eyepiece lens
219: memory card

| 201: digital still camera | 208: zooming lens | 214: body drive control device |
| 202: interchangeable lens | 209: lens | 215: liquid crystal display element drive circuit |
| 203: camera body | 210: focusing lens | 216: liquid crystal display element |
| 204: mount unit | 212: image sensor | 217: eyepiece lens |
| 206: lens drive control device | 213: electrical contact point portion | 219: memory card |
| 207: aperture | | |

FIG.41A t0
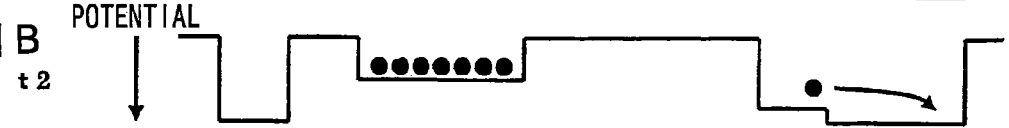
FIG.41B t2
FIG.41C t3
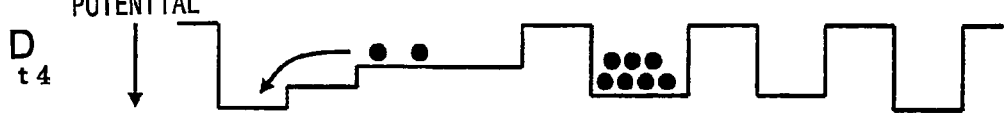
FIG.41D t4
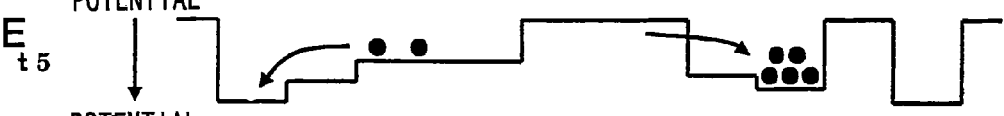
FIG.41E t5
FIG.41F t6
FIG.41G t7

| | | |
|---|---|---|
| 201: digital still camera | 208: zooming lens | 214: body drive control device |
| 202: exchangeable lens | 209: lens | 215: liquid crystal display element drive circuit |
| 203: camera body | 210: focusing lens | 216: liquid crystal display element |
| 204: mount unit | 211: image sensor | 217: eyepiece lens |
| 206: lens drive control device | 212: image sensor | 219: memory card |
| 207: aperture | 213: electrical contact point portion | |

1

IMAGE SENSOR AND IMAGE-CAPTURING DEVICE WITH IMAGE-CAPTURING AND FOCUS DETECTION PIXELS

INCORPORATION BY REFERENCE

The disclosure of the following priority application is herein incorporated by reference Japanese Patent Application No. 2006-261831 filed Sep. 27, 2006

BACKGROUND OF THE INVENTION

1. Field of the Invention

The present invention relates to an image sensor and an image-capturing device.

2. Description of Related Art

There is an image-capturing device known in the related art that includes an image sensor equipped with image-capturing pixels and focus detection pixels (see Japanese Laid Open Patent Publication No. 2005-303409). The device executes focus detection based upon image signals output from the focus detection pixels through a first image-capturing operation and displays at a viewfinder liquid crystal display element an image constituted with image signals output from the image-capturing pixels through a second image-capturing operation.

SUMMARY OF THE INVENTION

There are issues to be addressed with regard to the image-capturing device in the related art described above which sequentially executes the image-capturing operation for obtaining the image signals to be used for the focus detection and the image-capturing operation for obtaining the image signals for the viewfinder display, in that a significant length of time is bound to elapse while the whole operational sequence is executed and in that if a long period of time is required for storage at the focus detection pixels, the refresh rate at the viewfinder becomes slow.

According to the 1st aspect of the present invention, an image sensor comprises: image-capturing pixels that generate first image signals with a charge storage time controlled by a first storage control signal; and focus detection pixels that generate second image signals with a charge storage time controlled by a second storage control signal generated independently of the first storage control signal.

According to the 2nd aspect of the present invention, an image sensor comprises: image-capturing pixels that generate first image signals with a first charge storage time controlled by a first storage control signal; and focus detection pixels that generate second image signals with a second charge storage time control-led by a second storage control signal generated independently of the first storage control signal. And: the image-capturing pixels are each equipped with an image-capturing photoelectric conversion portion at which an electrical charge corresponding to light entering therein during the first charge storage time is stored, and an image-capturing output unit that outputs a signal corresponding to a quantity of the electrical charge having been stored at the photoelectric conversion portion following a storage end; and the focus detection pixels are each equipped with a focus detection photoelectric conversion portion at which an electrical charge corresponding to light entering therein during the second charge storage time is stored, a charge holding unit that temporarily holds the electrical charge having been stored at the photoelectric conversion portion following a storage end and a focus detection output unit that outputs an image signal corresponding to a quantity of the electrical charge held in the charge holding unit.

According to the 3rd aspect of the present invention, in the image sensor according to the 2nd aspect, it is preferred that the focus detection pixels are each equipped with a pair of photoelectric conversion portions.

According to the 4th aspect of the present invention, in the image sensor according to the 2nd aspect, it is preferred that the focus detection pixels include first focus detection pixels each equipped with a first photoelectric conversion portion and second focus detection pixels each equipped with a second photoelectric conversion portion to be paired up with the first photoelectric conversion portion.

According to the 5th aspect of the present invention, in the image sensor according to the 2nd aspect, it is preferred that each of the image-capturing output unit and the focus detection out-put unit each comprises a floating diffusion portion to which the electrical charge having been stored in the photoelectric conversion portion is transferred and an amplifier portion that outputs the image signal corresponding to the quantity of the electrical charge having been transferred to the floating diffusion portion.

According to the 6th aspect of the present invention, in the image sensor according to the 1st aspect, it is preferred that the image-capturing pixels are disposed in a matrix pattern, charge control is executed so as to store electrical charges at all the image-capturing pixels through a uniform charge storage time and storage starts and ends at all the image-capturing pixels in each row with matching timing.

According to the 7th aspect of the present invention, an image-capturing device, comprises: an image sensor that captures an image formed by an image-capturing optical system; a control unit that executes storage time control and output read control for the image sensor; a display unit at which display is brought up based upon first image signals; and a focus detection unit that detects a focus adjustment state of the image-capturing optical system based upon second image signals. And: the image sensor comprises image-capturing pixels that generate the first image signals with a first charge storage time controlled by a first storage control signal and focus detection pixels that generate the second image signals with a second charge storage time controlled by a second storage control signal generated independently of the first storage control signal; the image-capturing pixels are each equipped with an image-capturing photoelectric conversion portion at which an electrical charge corresponding to light entering therein during the first charge storage time is stored, and an image-capturing output unit that outputs a signal corresponding to a quantity of the electrical charge having been stored at the photoelectric conversion portion following a storage end; the focus detection pixels are each equipped with a focus detection photoelectric conversion portion at which a charge corresponding to light entering therein during the second charge storage time is stored, a charge holding unit that temporarily holds the electrical charge having been stored at the photoelectric conversion portion following a storage end and a focus detection output unit that outputs an image signal corresponding to a quantity of electrical charge held in the charge holding unit; and the control unit concurrently executes the storage time control for the image-capturing pixels and the storage time control for the focus detection pixels, controls storage at the image-capturing pixels by using the first storage control signal, brings up a display at the display unit by reading the first image signals over a predetermined cycle, controls storage at the focus detection pixels independently of the storage at the image-capturing pixels by using the second storage control signal and engages the focus detection unit in focus detection by reading out the second image signals in synchronization with the predetermined cycle.

According to the 8th aspect of the present invention, in the image-capturing device according to the 7th aspect, it is preferred that the control unit reads out the first image signals and the second image signals sequentially in an order corresponding to a positional arrangement assumed for the image-capturing pixels and the focus detection pixels and also specifies whether the second image signals having been read are valid or invalid.

According to the 9th aspect of the present invention, in the image-capturing device according to the 7th aspect, it is preferred that the control unit executes read of the first image signals and read of the second image signals independently of each other.

According to the 10th aspect of the present invention, in the image-capturing device according to the 7th aspect, it is preferred that the control unit reads out the first image signals from some of the image-capturing pixels.

According to the 11th aspect of the present invention, in the image-capturing device according to the 7th aspect, it is preferred that: there is further provided a recording unit that records image signals; and the control unit engages the image-capturing pixels and the focus detection pixels in parallel operation and records into the recording unit the first image signals and the second image signals obtained by executing storage control for the image-capturing pixels and the focus detection pixels to store electrical charges through a uniform storage time based upon the first storage control signal and the second storage control signal.

According to the 12th aspect of the present invention, an image sensor, comprises: a first pixel group, a charge storage time of which is controlled by a first storage control signal; a second pixel group formed on a substrate on which the first pixel group is also formed and surrounded by the first pixel group, a charge storage time of which is controlled by a second storage control signal generated independently of the first storage control signal; and an output unit that outputs first image signals obtained from the first pixel group and second image signals obtained from the second pixel group through time sharing.

According to the 13th aspect of the present invention, in the image sensor according to the 12th aspect, it is preferred that pixels in the first pixel group and pixels in the second pixel group are disposed in a two-dimensional array and the charge storage time at the pixels in the first pixel group is controlled by adopting a rolling shutter method.

According to the 14th aspect of the present invention, in the image sensor according to the 12th aspect, it is preferred that pixels in the first pixel group and pixels in the second pixel group are disposed in a two-dimensional array, the second pixel group is formed at a plurality of positions and the charge storage time and storage timing are controlled independently for each second pixel group.

According to the 15th aspect of the present invention, in the image sensor according to the 14th aspect, it is preferred that there is further provided a control unit that enables the output unit to cyclically output the first image signals and also enables the output unit to output the second image signals during an interval between outputs of the first image signals.

According to the 16th aspect of the present invention, in the image sensor according to the 14th aspect, it is preferred that the pixels in the second pixel groups are each equipped with a charge holding unit that temporarily holds an image signal.

According to the 17th aspect of the present invention, in the image sensor according to the 12th aspect, it is preferred that the first image signals are used for display and the second image signals are used for focus detection.

According to the 18th aspect of the present invention, an image-capturing device, comprises: an image sensor that captures an image formed by an image-capturing optical system and comprises image-capturing pixels that generate display image signals and focus detection pixels that generate focus detection image signals; a control unit that executes storage time control and output read control for the image sensor; a display unit at which display is brought up based upon the display image signals; and a focus detection unit that detects a focus adjustment state at the image-capturing optical system based upon the focus detection image signals. And the control unit engages the image-capturing pixels and the focus detection pixels in parallel operation, executes storage control so as to store electrical charges at the image-capturing pixels and the focus detection pixels through a uniform storage time, brings up a display at the display unit by reading out the display image signals over a predetermined cycle through a destructive read and engages the focus detection unit in focus detection by reading out the focus detection image signals over the predetermined cycle through a non-destructive read.

According to the 19th aspect of the present invention, an image-capturing device, comprises: an image sensor that captures an image formed by an image-capturing optical system and comprises image-capturing pixels that generate display image signals, focus detection pixels that generate focus detection image signals and an output unit that amplifies the display image signals and the focus detection image signals and outputs amplified signals; a control unit that executes storage time control and output read control for the image sensor; a display unit at which display is brought up based upon the display image signals; and a focus detection unit that detects a focus adjustment state at the image-capturing optical system based upon the focus detection image signals. And the control unit engages the image-capturing pixels and the focus detection pixels in parallel operation, executes storage control so as to store electrical charges at the image-capturing pixels and the focus detection pixels through a uniform storage time, brings up a display at the display unit by reading out over a predetermined cycle the display image signals having been amplified with a predetermined amplification factor in the output unit and engages the focus detection unit in focus detection by reading out the focus detection image signals having been amplified to an amplification degree different from the predetermined amplification degree in the output unit in synchronization with read of the display image signals.

According to the 20th aspect of the present invention, an image sensor, comprises: a first pixel group, a charge storage time of which is controlled by a first storage control signal; a second pixel group formed on a substrate on which the first pixel group is also formed and surrounded by the first pixel group, a charge storage time of which is controlled by a second storage control signal generated independently of the first storage control signal; an output unit that outputs first image signals obtained from the first pixel group and second image signals obtained from the second pixel group through time sharing; and a control unit that enables the output unit to cyclically output the first image signals and also enables the output unit to output the second image signals during an interval between outputs of the first image signals.

According to the 21st aspect of the present invention, an image sensor comprises: a first pixel group, a charge storage time of which is controlled by a first storage control signal; a second pixel group formed on a substrate on which the first pixel group is also formed and surrounded by the first pixel group, a charge storage time of which is controlled by a second storage control signal generated independently of the first storage control signal; and an output unit that outputs first image signals obtained from the first pixel group and second image signals obtained from the second pixel group through time division. And pixels in the second pixel group are each equipped with a charge holding unit that temporarily holds an image signal.

According to the 22nd aspect of the present invention, an image sensor comprises: image-capturing pixels that generate first image signals with a charge storage time controlled by a first storage control signal; and focus detection pixels that generate second image signals with a charge storage time controlled by a second storage control signal generated independently of the first storage control signal. And: after reading out electrical charges having been stored at the image-capturing pixels, the first storage control signal resets the stored charges; and after reading out electrical charges having been stored at the focus detection pixels, the second storage control signal does not always reset the stored charges.

According to the 23rd aspect of the present invention, an image-capturing device, comprises: an image sensor that captures an image formed by an image-capturing optical system; a control unit that executes storage time control and output read control for the image sensor; a display unit at which display is brought up based upon first image signals; and a focus detection unit that detects a focus adjustment state of the image-capturing optical system based upon second image signals. And: the image sensor comprises image-capturing pixels that generate the first image signals with a charge storage time controlled by a first storage control signal and focus detection pixels that generate the second image signals with a charge storage time controlled by a second storage control signal generated independently of the first storage control signal; after reading out electrical charges having been stored at the image-capturing pixels, the first storage control signal resets the stored charges; after reading out electrical charges having been stored at the focus detection pixels, the second storage control signal does not always reset the stored charges; and the control unit concurrently executes the storage time control for the image-capturing pixels and the storage time control for the focus detection pixels, controls storage at the image-capturing pixels by using the first storage control signal, brings up the display at the display unit by reading the first image signals over a predetermined cycle, controls storage at the focus detection pixels independently of the storage at the image-capturing pixels by using the second storage control signal and engages the focus detection unit in focus detection by reading out the second image signals in synchronization with the predetermined cycle.

BRIEF DESCRIPTION OF THE DRAWINGS

FIGS. 41A through 41G are potential diagrams, illustrating the electrical charge storage operation and the signal output operation executed at the focus detection pixels in FIG. 36;

DESCRIPTION OF PREFERRED EMBODIMENTS

Figure 1:
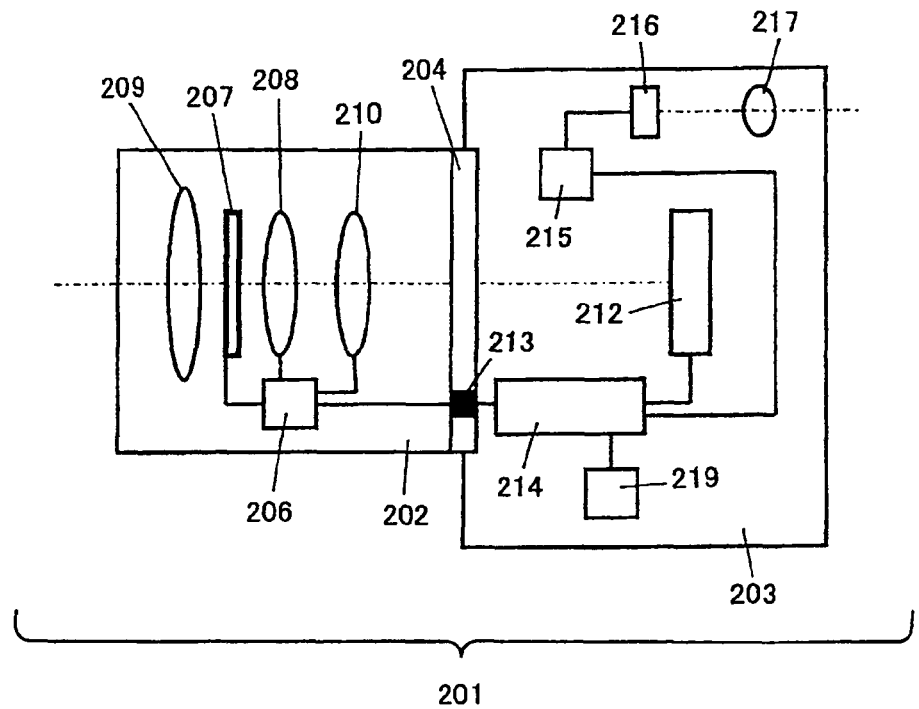
FIG. 1 shows the structure adopted in an embodiment.

A digital still camera achieved in an embodiment by adopting the image sensor and the image-capturing device according to the present invention is now explained. FIG. 1 shows the structure adopted in the embodiment. A digital still camera 201 achieved in the embodiment comprises an exchangeable lens 202 and a camera body 203. The exchangeable lens 202 is mounted at the camera body 203 via a mount unit 204.

The exchangeable lens 202 includes a lens drive control device 206, a zooming lens 208, a lens 209, a focusing lens 210, an aperture 207 and the like. The lens drive control device 206, which includes a microcomputer and peripheral components such as a memory, controls the drive of the focusing lens 210 and the aperture 207, detects the states of the zooming lens 208 and the focusing lens 210 and transmits lens information to a body dive control device 214 to be detailed later, receives camera information from the body drive control device 214 and the like.

An image sensor 212, the body drive control device 214, a liquid crystal display element drive circuit 215, a liquid crystal display element 216, an eyepiece lens 217, a memory card 219 and the like are disposed at the camera body 203. Pixels to be detailed later are two-dimensionally arrayed at the image sensor 212, which is disposed at an predetermined imaging plane of the exchangeable lens 202 to capture a subject image formed through the exchangeable lens 202. It is to be noted that focus detection pixels arrayed at a specific focus detection position at the image sensor 212, are to be described in detail later.

The body drive control device 214, constituted with a microcomputer and peripheral components such as a memory, controls image signal read from the image sensor 212, image signal correction, detection of the focus adjustment state at the exchangeable lens 202, and reception of lens information from the lens drive control device 206 and transmission of camera information (defocus amount) to the lens drive control device 206, as well as the overall operations of the digital still camera. The body drive control device 214 and the lens drive control device 206 engage in communication with each other via an electrical contact point portion 213 at the mount unit 204 to exchange various types of information.

The liquid crystal display element drive circuit 215 drives the liquid crystal display element 216 at a liquid crystal viewfinder (EVF: electrical viewfinder). The photographer is able to observe an image displayed at the liquid crystal display element 216 via the eyepiece lens 217. The memory card 219 can be loaded into/unloaded from the camera body 203 freely and is a portable storage medium for storing image data.

Light from the subject having passed through the exchangeable lens 202 and formed as a subject image on the image sensor 212 undergoes photoelectric conversion at the image sensor 212 and the photoelectric conversion output is then provided to the body drive control device 214. The body drive control device 214 calculates the defocus amount indicating the extent of defocusing manifesting at a specific focus detection position based upon the data output from the focus detection pixels disposed on the image sensor 212 and transmits this defocus amount to the lens drive control device 206. In addition, the body drive control device 214 stores image signals generated based upon the output from the image sensor 212 into the memory card 219 and provides the image signals to the liquid crystal display element drive circuit 215 to enable the liquid crystal display element 216 to display the image.

Operation members (e.g., a shutter button, a focus detection position setting member and the like, not shown) are disposed at the camera body 203. The body drive control device 214 detects operation state signals from these operation members and controls operations (image-capturing operation, focus detection position setting operation, image processing operation) based upon the detection results.

The lens drive control device 206 adjusts the lens information in correspondence to the current focusing state, zooming state and aperture setting state, the aperture F value and the like. More specifically, the lens drive control device 206 monitors the positions of the lenses 208 and 210 and the setting at the aperture 207, and calculates lens information based upon the monitored information. Alternatively, it may select the lens information corresponding to the monitored information from a lookup table prepared in advance. In addition, the lens drive control device 206 calculates a lens drive quantity indicating the extent to which the lens is to be driven based upon the defocus amount having been received and drives the focusing lens 210 to a focusing point based upon the lens drive quantity via a drive source such as motor (not shown).

Figure 2:
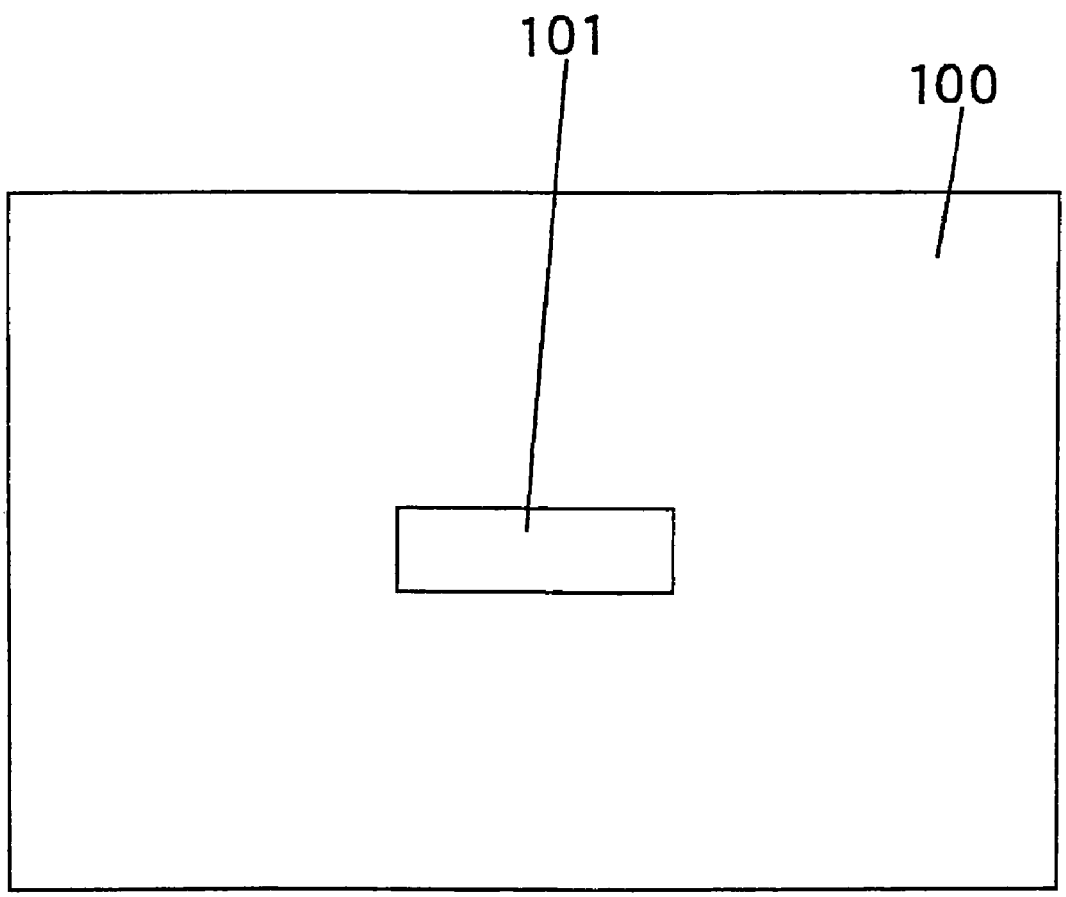
FIG. 2 indicates a focus detection position set on the photographic image plane in the embodiment.

FIG. 2 shows the focus detection position set on the photographic image plane in the embodiment, i.e., the area (focus detection area) where the subject image is sampled on the photographic image plane to detect the focus on a focus detection pixel row to be detailed later. In the embodiment, a focus detection area 101 is set at the center of a photographic image plane 100 with focus detection pixels arrayed linearly along the longer side of the focus detection area 101 assuming a rectangular shape.

Figure 3:
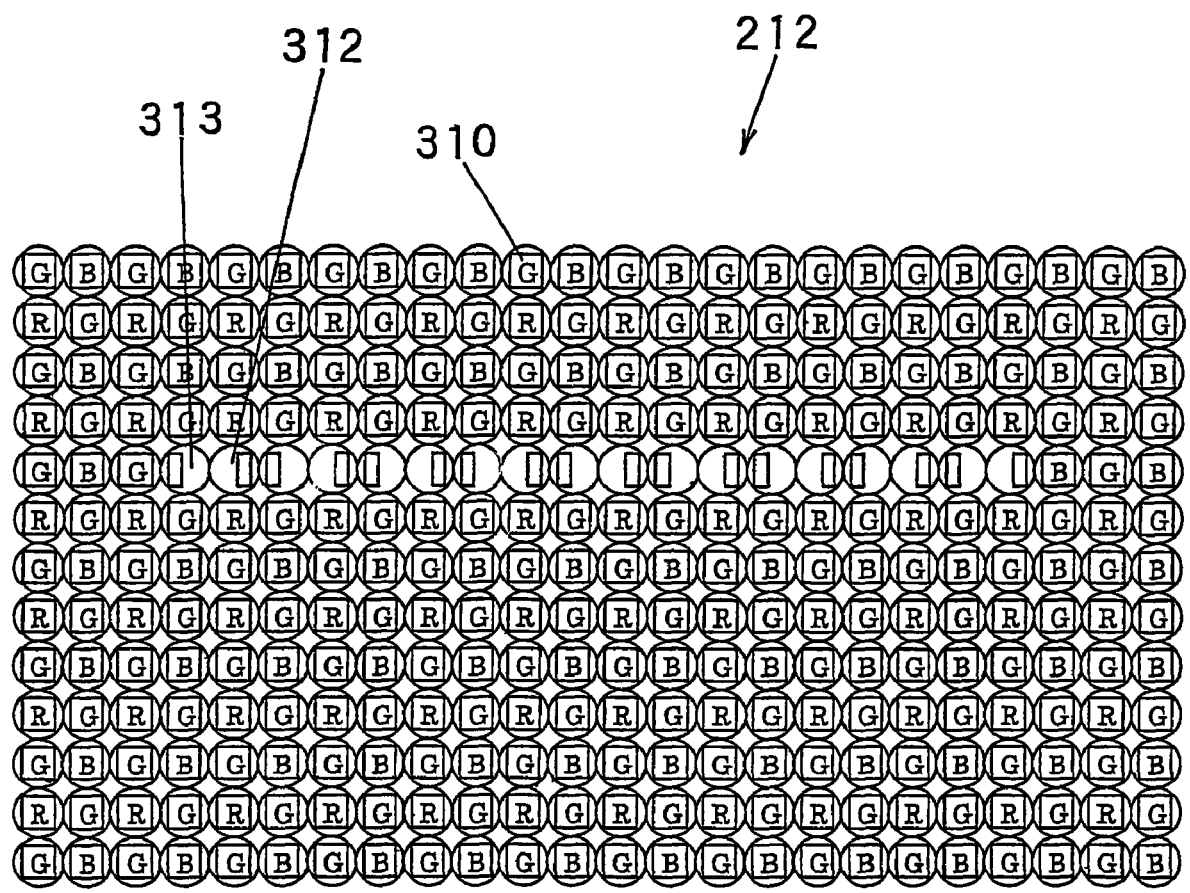
FIG. 3 shows in detail the structure adopted in the image sensor in the embodiment.

FIG. 3 is a front view showing in detail the structure adopted in the image sensor 212, in an enlargement of the vicinity of the focus detection area 101 on the image sensor 212. The lengthwise direction and the widthwise direction (the directions along which the pixel rows and the pixel columns respectively extend) assumed in the figure corresponds to the lengthwise range and the widthwise range of the photographic image plane 100 in FIG. 2. The image sensor 212 comprises image-capturing pixels 310 engaged in image-capturing operation and focus detection pixels 312 and 313 engaged in focus detection, with the focus detection pixels 312 and 313 alternately disposed along the horizontal direction in the focus detection area 101. The focus detection pixels 312 and 313 are disposed in a straight line in a row where G color image-capturing pixel 310 and a B color image-capturing pixel 310 would be disposed.

Figure 4:
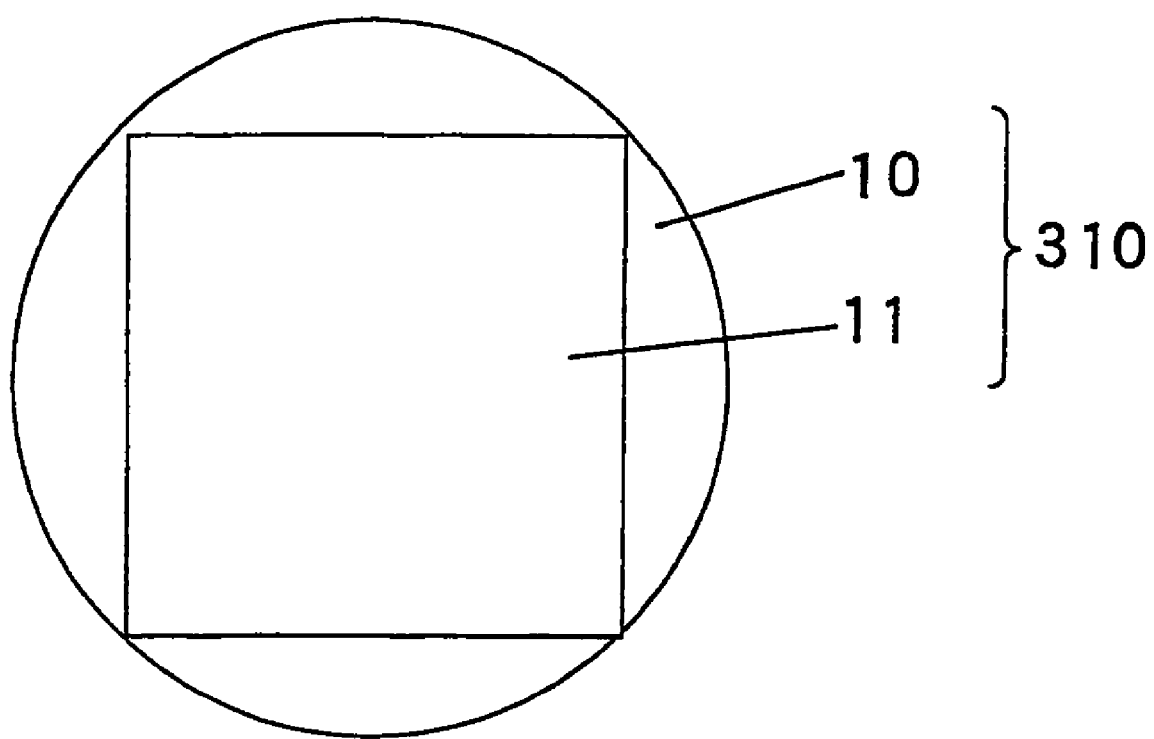
FIG. 4 shows the structure of the image-capturing pixels.
Figure 6:
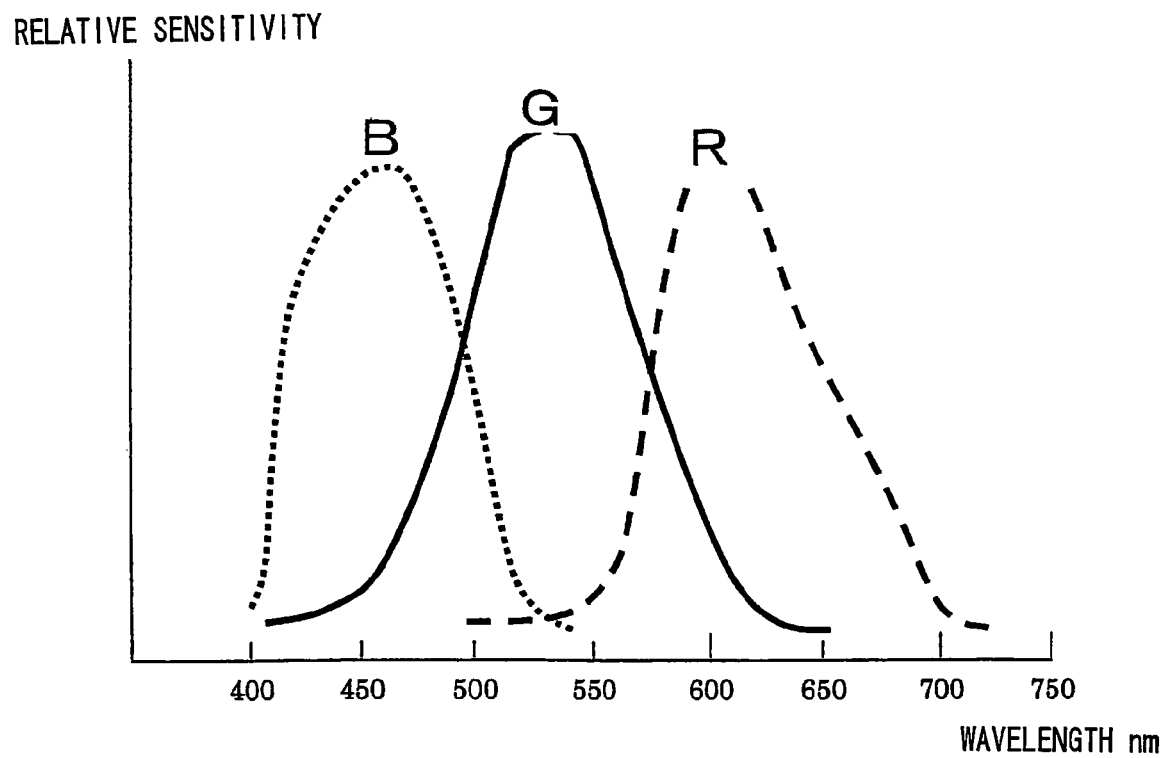
FIG. 6 shows the spectral sensitivity characteristics of green, red and blue image-capturing pixels.

As shown in FIG. 4, the image-capturing pixels 310 each include a micro-lens 10, a photoelectric conversion portion 11 and a color filter (not shown). The color filters at the individual image-capturing pixels each assume one of the three colors, red (R), green (G) or blue (B) and the red, green and blue color filters assume spectral sensitivity characteristics shown in FIG. 6. The image-capturing pixels 310 equipped with such color filters are arranged in a Bayer array at the image sensor 212.

Figure 5A:
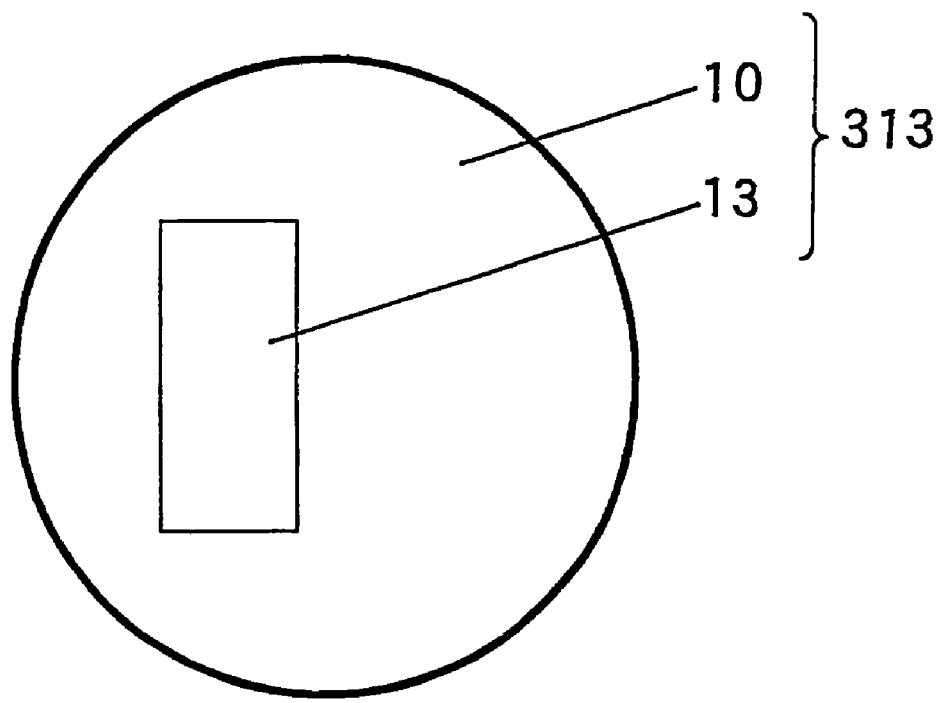
FIGS. 5A and 5B show the structures of the focus detection pixels.
Figure 5B:
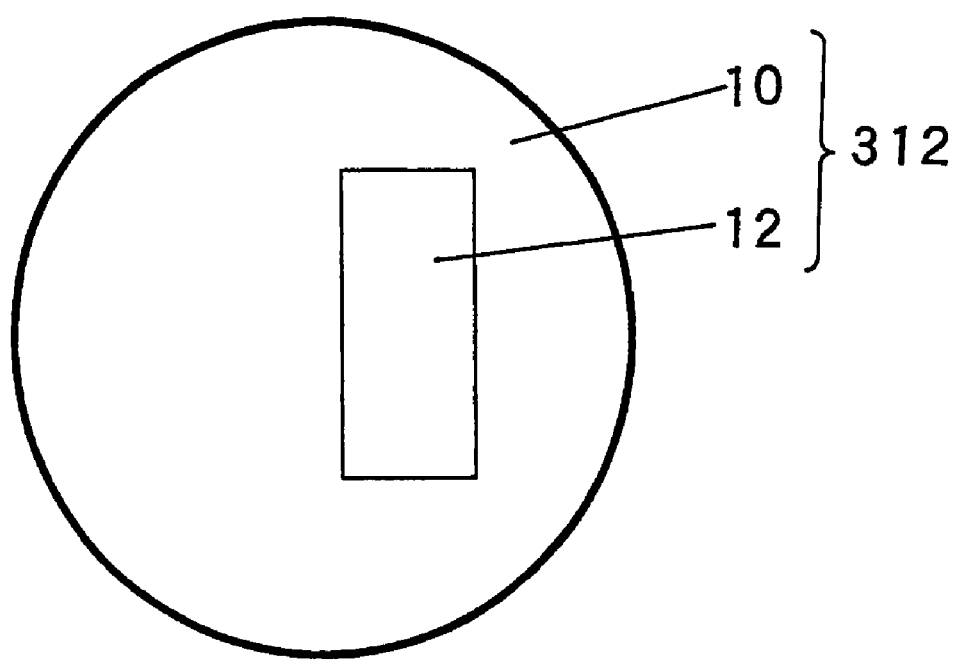

FIG. 5 shows the structures of the focus detection pixels 312 and 313. As shown in FIG. 5B, the focus detection pixels 312 each include a micro-lens 10 and a photoelectric conversion portion 12. The photoelectric conversion portion 12 assumes the shape of a rectangle, the left side of which is substantially in contact with the vertical bisector extending along the diameter of the micro-lens 10. As shown in FIG. 5A, the focus detection pixels 313 each include a micro-lens 10 and a photoelectric conversion portion 13. The photoelectric conversion portion 13 assumes the shape of a rectangle, the right side of which is substantially in contact with the vertical bisector extending along the diameter of the micro-lens 10. When their micro-lenses 10 are aligned, the photoelectric conversion portions 12 and 13 assume side-by-side positions, one taking up a right-side position and the other taking up a left-side position along the horizontal direction in the figures. The photoelectric conversion portions 12 and 13 are symmetrical with each other relative to the vertical bisector extending along the diameter of the micro-lenses 10. The focus detection pixels 312 and the focus detection pixels 313 are disposed alternately along the horizontal direction in the figures, i.e., along the direction in which the photoelectric conversion portions 12 and 13 are set next to each other.

Figure 7:
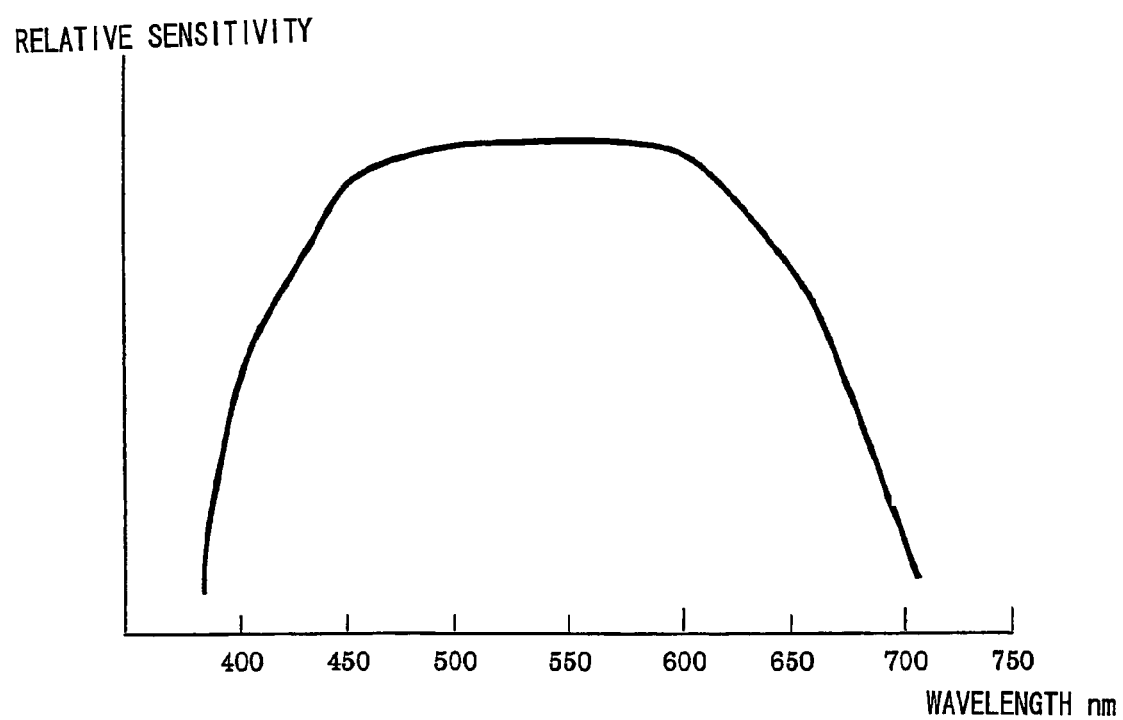
FIG. 7 shows the spectral sensitivity characteristics of the focus detection pixels.

It is to be noted that in order to assure a sufficient light quantity, no color filters are disposed at the focus detection pixels 312 and 313 and thus, the focus detection pixels have the spectral sensitivity characteristics (see FIG. 7), which are achieved by integrating the spectral sensitivity of the photodiodes engaged in photoelectric conversion and the spectral sensitivity characteristics of the infrared cut filters (not shown). Namely, the spectral sensitivity characteristics are similar to the sum of the spectral sensitivity characteristics of the green pixels (G), the red pixels (R) and the blue pixels (B) shown in FIG. 6, which indicate sensitivity in a light wavelength range containing the light wavelength ranges corresponding to the sensitivity characteristics of all the pixels, i.e., the green pixels, the red pixels and the blue pixels.

The photoelectric conversion portion 11 at the image-capturing pixel 310 is designed in a shape that allows the photoelectric conversion portion to receive all the light flux passing through the exit pupil of a highest-speed exchangeable lens, e.g., an exit pupil equivalent to F 1.0, via the micro-lens 10. In addition, the photoelectric conversion portions 12 and 13 at the focus detection pixels 312 and 313 are designed so as to receive all the light fluxes passing through a specific area (e.g., F 2.8) at the exit pupil of the exchangeable lens, via the micro-lens 10.

Figure 8:
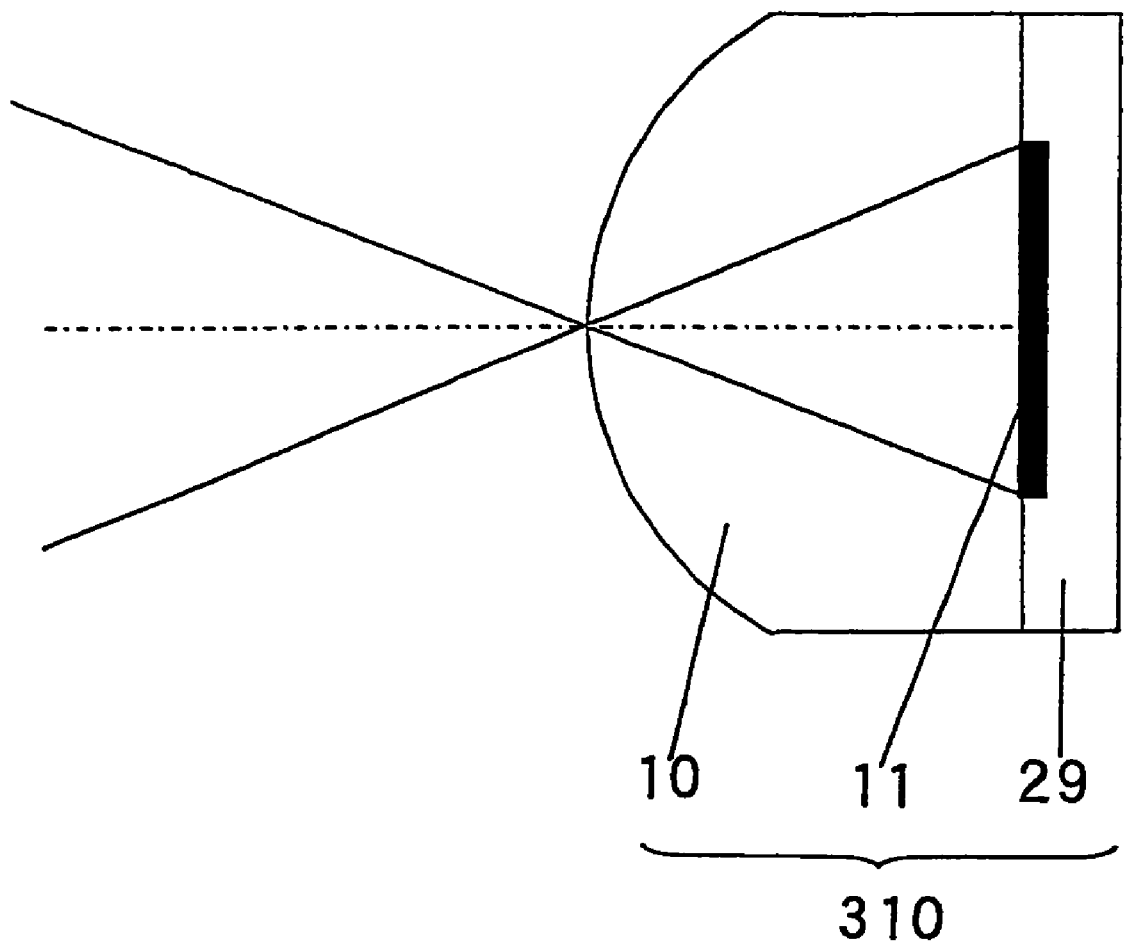
FIG. 8 is a sectional view of an image-capturing pixel.

FIG. 8 is a sectional view of an image-capturing pixel 310. The micro-lens 10 is set to the front of the image-capturing photoelectric conversion portion 11 at the image-capturing pixel 310 and, as a result, an image of the photoelectric conversion portion 11 is projected frontward via the micro-lens 10. The photoelectric conversion portion 11 is formed on a semiconductor circuit substrate 29, with a color filter (not shown) disposed between the micro-lens 10 and the photoelectric conversion portion 11.

Figure 9:
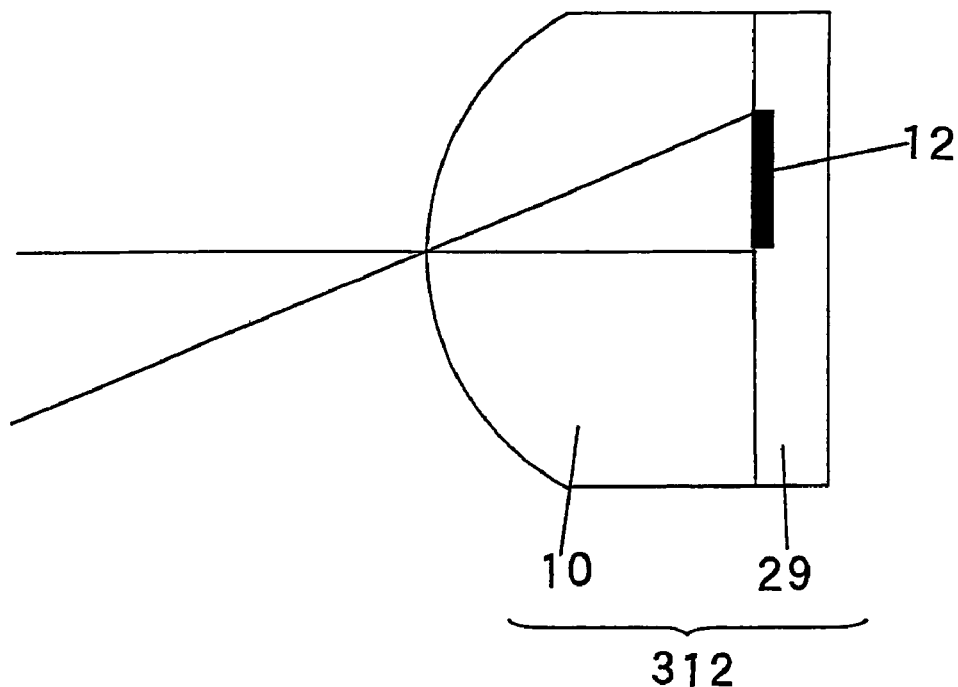
FIGS. 9A and 9B are sectional views of focus detection pixels.
Figure 9:
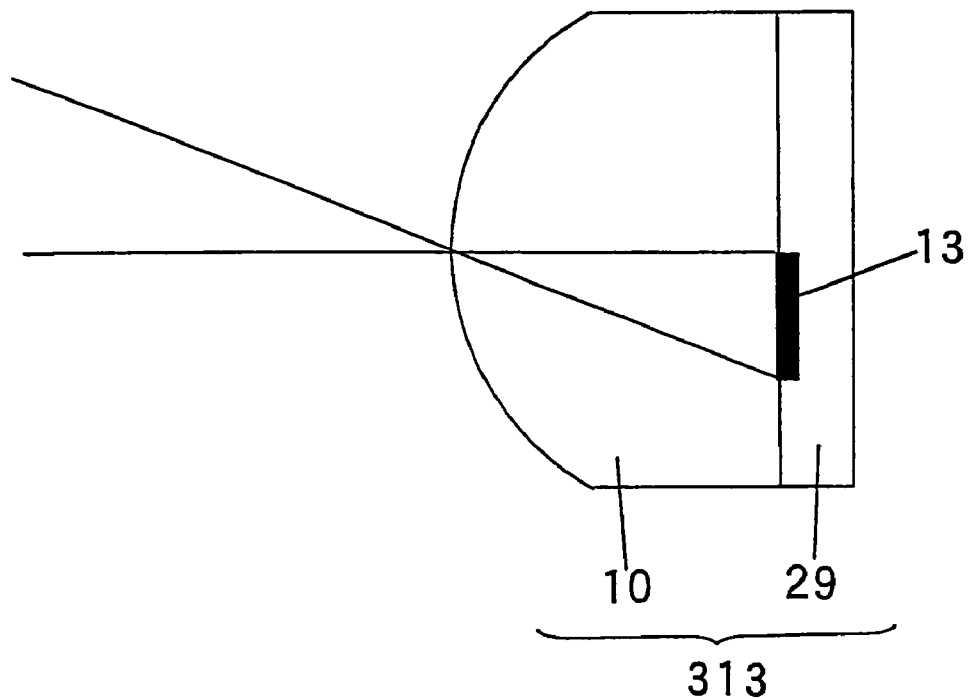

FIGS. 9A and 9B present sectional views of a focus detection pixel 312 and a focus detection pixel 313. The focus detection pixel 312 shown in the sectional view in FIG. 9A includes a micro-lens 10 disposed at the front of the photoelectric conversion portion 12 and the photoelectric conversion portion 12 is projected frontward via the micro-lens 10. The photoelectric conversion portion 12 is formed on the semiconductor circuit substrate 29, and the micro-lens 10 is formed as a fixed, integrated part through a semiconductor image sensor manufacturing process. The photoelectric conversion portion 12 is set on one side of the optical axis of the micro-lens 10.

The focus detection pixel 313 shown in the sectional view in FIG. 9B includes a micro-lens 10 disposed at the front of the photoelectric conversion portion 13 and the photoelectric conversion portion 13 is projected frontward via the micro-lens 10. The photoelectric conversion portion 12 is formed on the semiconductor circuit substrate 29, and the micro-lens 10 is formed as a fixed, integrated part through a semiconductor image sensor manufacturing process. The photoelectric conversion portion 13 is set on the opposite side of the optical axis of the micro-lens 10 from the photoelectric conversion portion 12.

Figure 10:
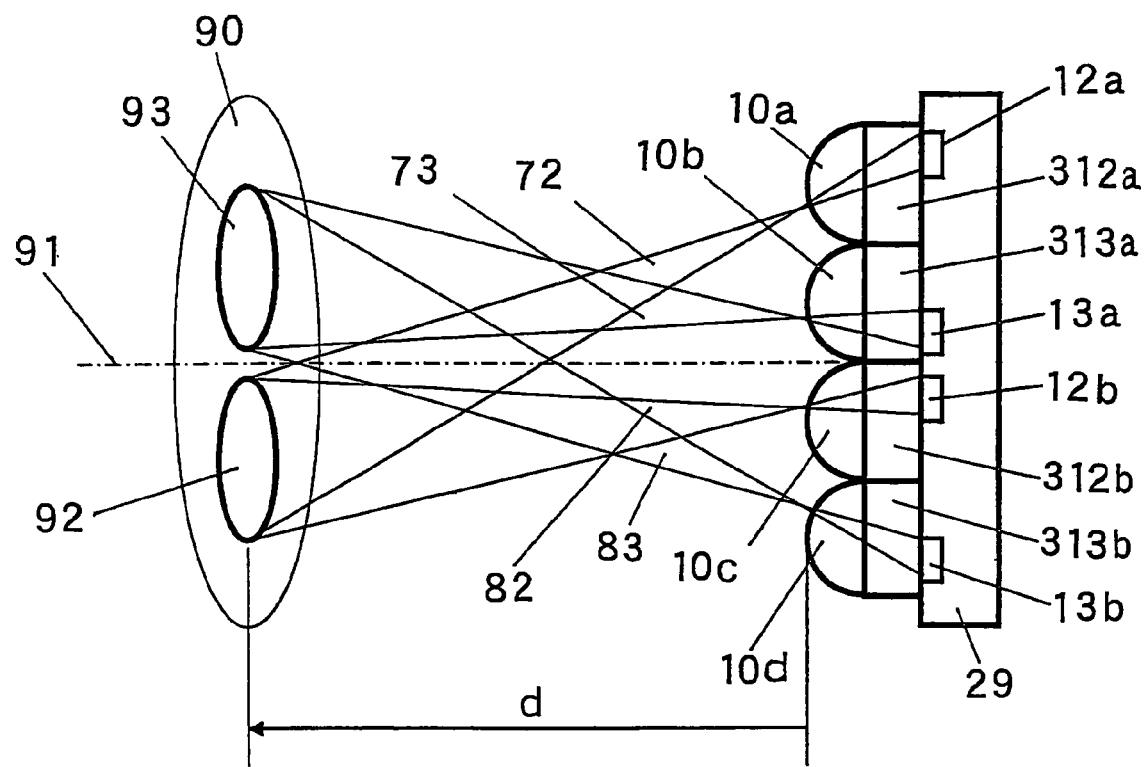
FIG. 10 shows the structure of a focus detection optical system adopting a split-pupil phase difference detection method in conjunction with the use of micro lenses.

FIG. 10 shows the structure of a focus detection optical system adopting a split-pupil-type phase difference detection method in conjunction with the use of micro-lenses. Reference numeral 90 in the figure indicates the exit pupil set over a distance d along the frontward direction from the micro-lenses disposed on the predetermined imaging plane of the exchangeable lens. The distance d is determined in correspondence to the curvature of the micro-lenses, the refractive index of the micro-lenses, the distance between the micro-lenses and the photoelectric conversion portions and the like. The distance d is referred to as a range-finding pupil distance in the following explanation. Reference numeral 91 indicates the optical axis of the exchangeable lens, reference numerals 10a~10d each indicate a micro-lens, reference numerals 12a, 12b, 13a and 13b each indicate a photoelectric conversion portion, reference numerals 312a, 312b 313a and 313b each indicate a pixel and reference numerals 72, 73, 82 and 83 each indicate a light flux.

Reference numeral 92 indicates a range defined by the photoelectric conversion portions 12a and 12b projected via the micro-lenses 10a and 10c, and this range is hereafter referred to as a range-finding pupil. Reference numeral 93 indicates the range defined by the photoelectric conversion portions 13a and 13b projected via the micro-lenses 10b and 10d and this range is hereafter referred to as a range-finding pupil. It is to be noted that while the range-finding pupils 92 and 93 are shown as elliptical areas so as to simplify the illustration in the drawing, the range-finding pupils actually assume the shape of the photoelectric conversion portions projected in an enlargement.

While FIG. 10 provides a schematic illustration of four pixels (the pixels 312a, 312b, 313a and 313b) disposed in sequence next to each other, the photoelectric conversion portions of other pixels, too, receive light fluxes arriving at their micro-lenses from the corresponding range-finding pupils. It is to be noted that the focus detection pixels are arrayed in a direction matching the direction in which the pair of range-finding pupils are set, i.e., matching the direction in which the pair of photoelectric conversion portions are set side-by-side.

The micro-lenses 10a~10d are disposed near the predetermined imaging plane of the exchangeable lens, and as the shapes of the photoelectric conversion portions 12a, 12b, 13a and 13b disposed behind the micro-lenses 10a~10d are projected onto the exit pupil 90 distanced from the micro-lenses 10a~10d by the range-finding pupil distance d, the projected shapes define the range-finding pupils 92 and 93. In other words, the directions along which the photoelectric conversion portions at individual pixels are projected are determined so that the projected shapes (range-finding pupils 92 and 93) of the photoelectric conversion portions at the individual pixels are overlapped on the exit pupil 90 set apart by the projection distance d.

The photoelectric conversion portion 12a outputs a signal corresponding to the intensity of an image formed on the micro-lens 10a with the light flux 72 having passed through the range-finding pupil 92 and having advanced toward the micro-lens 10a. The photoelectric conversion portion 12b outputs a signal corresponding to the intensity of an image formed on the micro-lens 10c with the light flux 82 having passed through the range-finding pupil 92 and having advanced toward the micro-lens 10c. The photoelectric conversion portion 13a outputs a signal corresponding to the intensity of an image formed on the micro-lens 10b with the light flux 73 having passed through the range-finding pupil 93 and having advanced toward the micro-lens 10b. The photoelectric conversion portion 13b outputs a signal corresponding to the intensity of an image formed on the micro-lens 10d with the light flux 83 having passed through the range-finding pupil 92 and having advanced toward the micro-lens 10d.

By linearly disposing large numbers of the two types of focus detection pixels each structured as described above and integrating the outputs from the photoelectric conversion portions at the individual focus detection pixels into output groups each corresponding to one of the two range-finding pupils 92 and 93, information related to the intensity distribution of the pair of images formed on the pixel row with the individual focus detection light fluxes passing through the range-finding pupil 92 and the range-finding pupil 93 is obtained. Image shift detection arithmetic processing (correlation calculation processing, phase difference detection processing) to be detailed later, is subsequently executed by using the information thus obtained so as to detect the extent of image shift (misalignment) manifested by the pair of images through the split-pupil phase difference detection method.

Then, by executing a conversion operation on the image shift quantity in correspondence to the distance between the gravitational centers of the pair of range-finding pupils, the deviation (defocus amount) of the current image forming plane (the image forming plane at the focus detection position corresponding to the position assumed by the micro-lens array on the predetermined imaging plane) relative to the predetermined imaging plane is calculated. It is to be noted that while the explanation is given above by assuming that the range-finding pupils are not restricted at the aperture, the range-finding pupils actually assume the shape and the size determined in correspondence to the aperture.

Figure 11A:
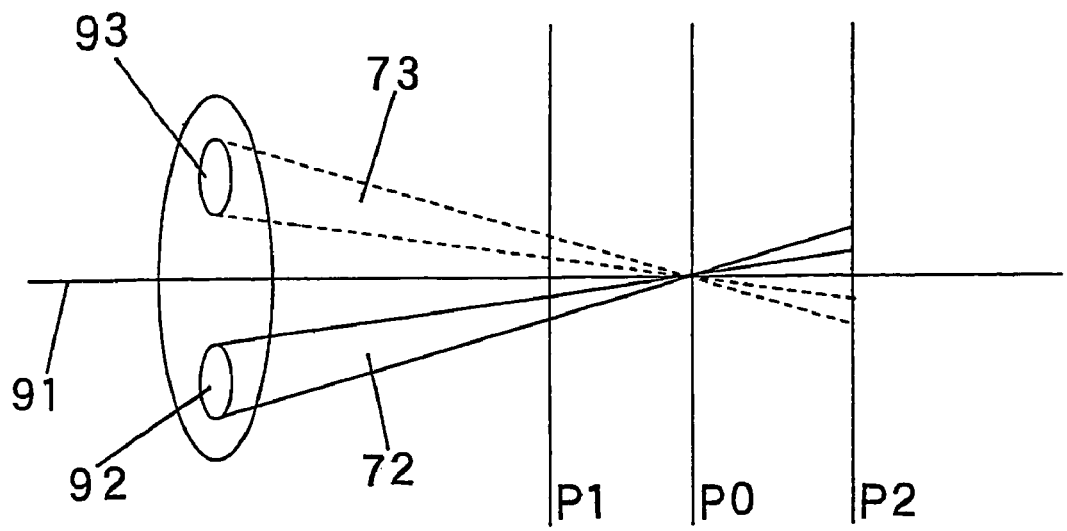
FIGS. 11A through 11D show the relationship between the extent of defocusing and the extent of image shift observed in split-pupil phase difference detection.
Figure 11B:
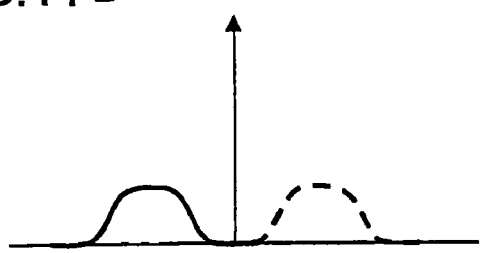
Figure 11C:
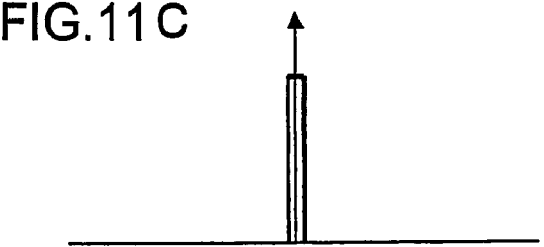

FIGS. 11A through 11D show the relationship between the extent of defocusing and the image shift quantity that may be observed in split-pupil phase difference detection. As shown in FIG. 11A, separate range-finding pupils 92 and 93 are defined at the exit pupil plane 90 of the optical system and the light flux to form an image is divided into a light flux 72 passing through the range-finding pupil 92 and a light flux 73 passing through the range-finding pupil 93. As an image of a line pattern (a white line against a black background) set on the optical axis 91 with the line extending perpendicular to the drawing sheet on which FIG. 11A is drawn, is formed via the optical system, the light flux 72 passing through the range-finding pupil 92 and the light flux 73 passing through the range-finding pupil 93 form high-contrast line image patterns at the same position on the optical axis 91 on the focusing plane P0, as shown in FIG. 11C.

Figure 11D:
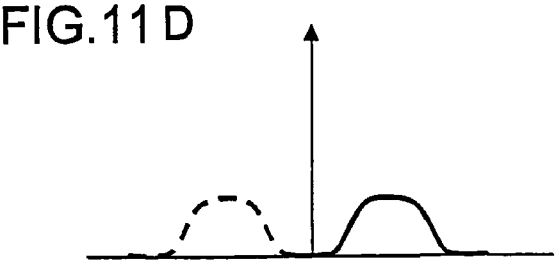

At a plane P1 set further frontward relative to the focusing plane P0, the light flux 72 passing through the range-finding pupil 92 and the light flux 73 passing through the range-finding pupil 93 form blurred line image patterns at different positions, as shown in FIG. 11B. At a plane P2 further rearward relative to the focusing plane P0, the light flux 72 passing through the range-finding pupil 92 and the light flux 73 passing through the range-finding pupil 93 form blurred line image patterns at different positions on the side opposite from that shown in FIG. 11B, as shown in FIG. 11D. Accordingly, by separately detecting the two images formed with the light flux 72 passing through the range-finding pupil 92 and the light flux 73 passing through the range-finding pupil 93 and calculating the positional relationship (image shift quantity) of the two images relative to each other, the state of focal adjustment (defocus amount) of the optical system at the plane at which the two images are detected can be detected.

Figure 12:
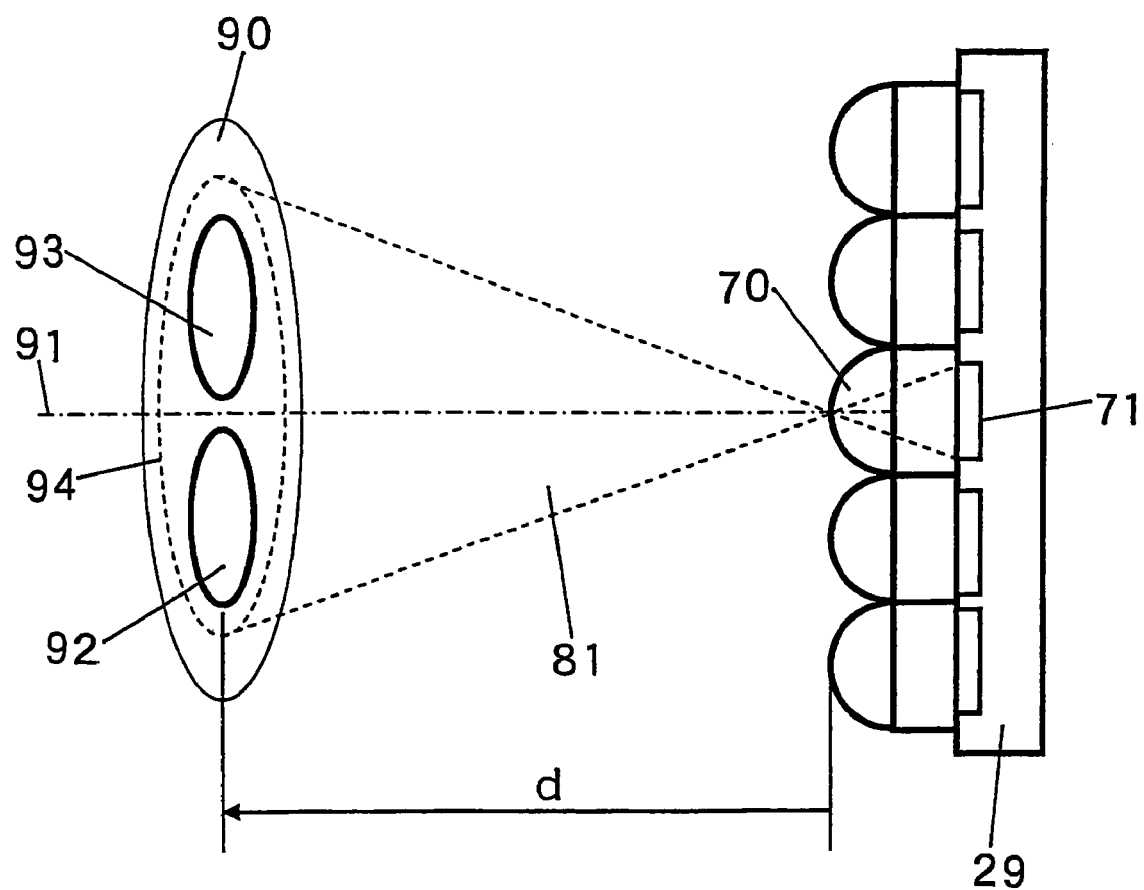
FIG. 12 shows the relationship between the image-capturing pixels and the exit pupil.

FIG. 12 shows the relationship between the image-capturing pixels and the exit pupil. It is to be noted that the same reference numerals are assigned to elements similar to those shown in FIG. 10 and that their explanation is omitted. Reference numeral 70 indicates a micro-lens, reference numeral 71 indicates the photoelectric conversion portion of an image-capturing pixel and reference numeral 81 indicates an image-capturing light flux. In addition, reference numeral 94 indicates the range over which the photoelectric conversion portion 71 is projected via the micro-lens 70. It is to be noted that while FIG. 12 schematically shows the image-capturing pixel (constituted with the micro-lens 70 and the photoelectric conversion portion 71) disposed on the optical axis 91 as an example, the photoelectric conversion portions of the other image-capturing pixels, too, all receive the light flux arriving at the corresponding micro-lenses from the area 94.

The micro-lenses 70 are disposed near the predetermined imaging plane of the optical system and the shape of the photoelectric conversion portion 71 disposed behind the micro-lens 70 on the optical axis 91 is projected onto the exit pupil 90 set apart from the micro-lens 70 by the projection distance d. The shape of the projected photoelectric conversion portion defines the area 94.

The photoelectric conversion portion 71 outputs a signal indicating a level corresponding to the intensity of the image formed on the micro-lens 70 with the focus detection light flux 81 having passed through the area 94 and having traveled toward the micro-lens 70. Numerous image-capturing pixels assuming the structure described above are disposed in a two-dimensional array and image information is obtained based upon the signals output from the photoelectric conversion portions at the individual pixels. It is to be noted that while the explanation is given above by assuming that the area 94 is not restricted at the aperture, the area 94 actually assumes the shape and the size determined in correspondence to the aperture.

Figure 13:
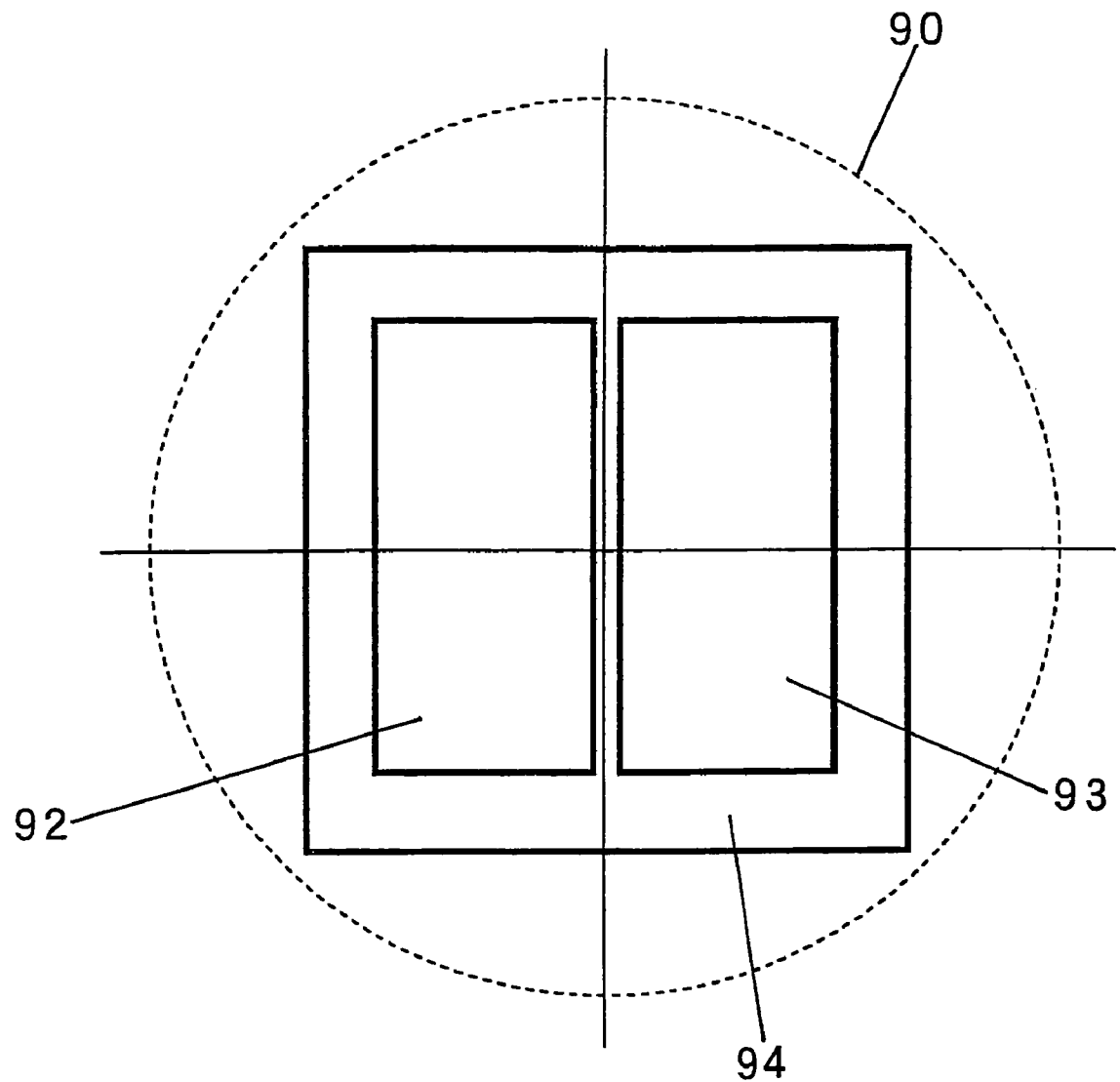
FIG. 13 is a front view showing the relationship between the projection areas achieved at the exit pupil plane.

FIG. 13 presents a front view showing the relationship among the photoelectric conversion portions projected onto the exit pupil. The range-finding pupils 92 and 93 formed by projecting the photoelectric conversion portions at the focus detection pixels onto the exit pupil plane 90 via the micro-lenses are contained in the area 94 formed by projecting the photoelectric conversion portions of the image-capturing pixels onto the exit pupil plane 90 via the micro-lenses of the image-capturing pixels. It is to be noted that the light fluxes received at the photoelectric conversion portions at the image-capturing pixels and the focus detection pixels are in fact light fluxes that pass through areas defined by restricting the area 94 and the range-finding pupils 92 and 93 with the aperture at the exchangeable lens. If an image of a subject with uniform brightness is captured with the photoelectric conversion portions of the image-capturing pixels and the focus detection pixels via the optical system over a uniform length of storage time, the signals from the image-capturing pixels assume a level higher than the signal level indicated by the signals from the focus detection pixels.

Figure 14:
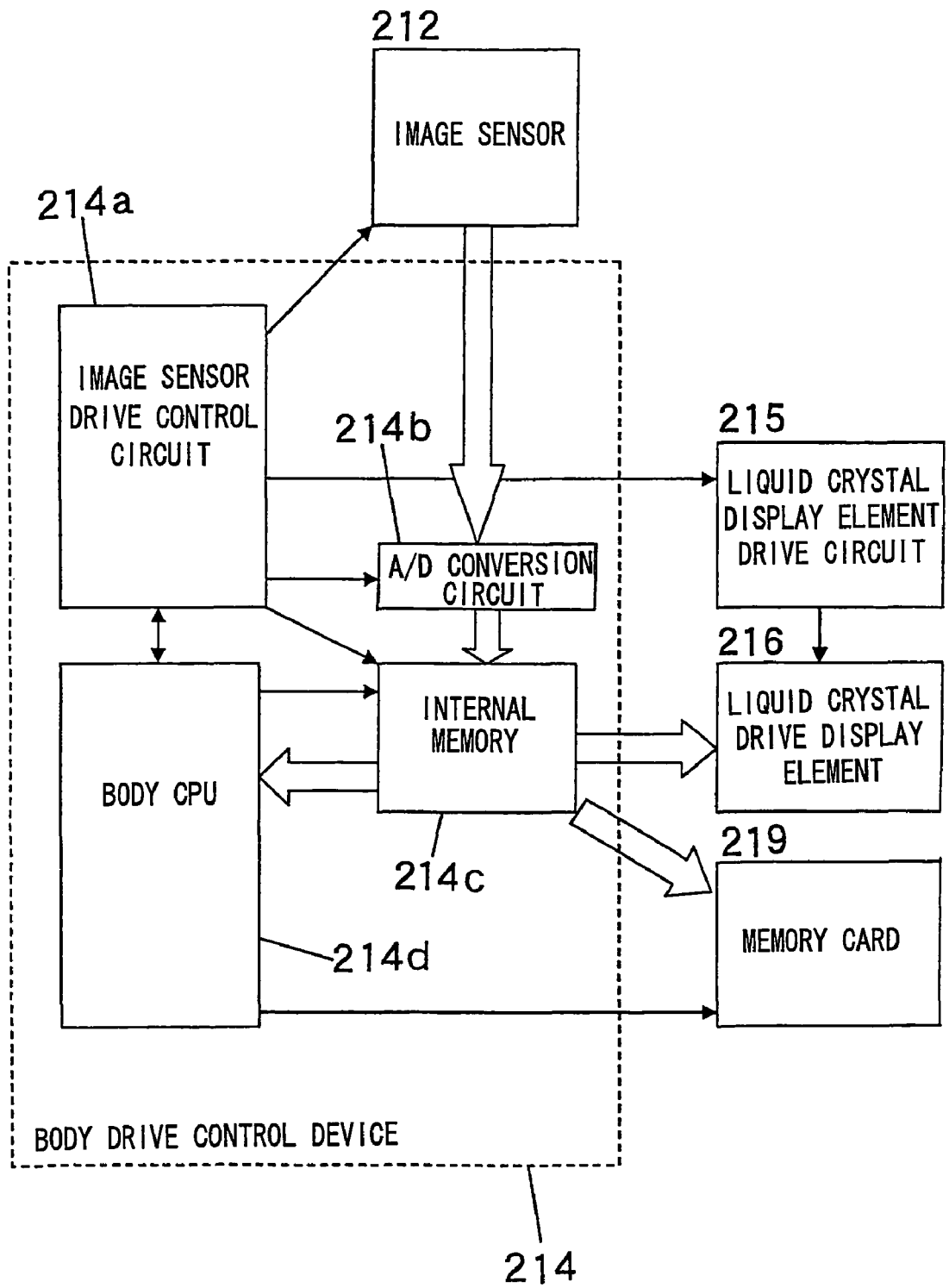
FIG. 14 shows in detail the internal structure of the body of the digital still camera (image-capturing device) shown in FIG. 1.

FIG. 14 shows in detail the internal structure of the body of the digital still camera (image-capturing device) shown in FIG. 1. The body drive control device 214 in FIG. 1 is constituted with an image sensor drive control circuit 214a that controls the drive of the image sensor 212, an A/D conversion circuit 214b that executes A/D conversion to convert the image signals output from the image sensor 212 to image data, an internal memory 214c where the image data are temporarily held and a body CPU 214d that executes overall control of the operations executed in the camera body, engages in communication with the lens drive control device 206 and executes focus detection calculation.

The image sensor drive control circuit 214a controls the length of time over which charges are stored at the image sensor 212, controls the image signal read operation and also engages the A/D conversion circuit 214b in operation synchronously with the image signal read operation to store the image data into the internal memory 214c. In addition, it controls the liquid crystal display element drive circuit 215 to bring up on display at the liquid crystal display element 216 the image data cyclically stored into the internal memory 214c and thus, cyclically refresh the display at the liquid crystal display element 216. The image sensor drive control circuit 214a provides the body CPU 214d with a timing signal indicating the timing with which image data are to be stored into the internal memory 214c and information indicating whether the image data from the focus detection pixels are valid or invalid. It is to be noted that the decision as to whether the image data from the focus detection pixels are valid or invalid may be made by judging that image data are valid if they result from a storage operation executed at the focus detection pixels over a predetermined length of time.

The body CPU 214d provides the image sensor drive control circuit 214a with operation control information indicating whether the image sensor 212 is to be engaged in operation cyclically or on a one-off basis and the like and information related to the lengths of storage time to elapse (determined in correspondence to the output from a photometering sensor (not shown)) at the image-capturing pixels and the focus detection pixels in the image sensor 212. Based upon the information received thereat, the image sensor drive control circuit 214a reads out the image signals by adjusting the operation mode for the image sensor 212 and also controls the lengths of storage time at the image-capturing pixels and the focus detection pixels, as well as the degree to which the image signals are to be amplified.

If the image data from the focus detection pixels stored in the internal memory 214c are determined to be valid, the body CPU 214d reads them out and executes focus detection by executing the focus detection calculation to be detailed later. In addition, in response to an operation of a shutter release member (not shown), the body CPU controls the image sensor drive control circuit 214a to engage the image sensor 212 in image-capturing operation, takes the resulting image data into the internal memory 214c and corrects the image data or alters the format of the image data before storing the image data into the memory card 219.

Under the control executed by the body CPU 214d, the image sensor drive control circuit 214a engages the image sensor 212 in cyclical operation (e.g., 30 screens/sec or 60 screens/sec) for electrical viewfinder display until a shutter release occurs, and then once an image-capturing instruction is issued, it engages the image sensor 212 in a one-off image-capturing operation. In other words, in a non-image-capturing state, the body CPU 214d first allows valid image data from the focus detection pixels to be stored into the internal memory 214c and then executes the focus detection operation while the viewfinder display is cyclically refreshed.

Figure 15:
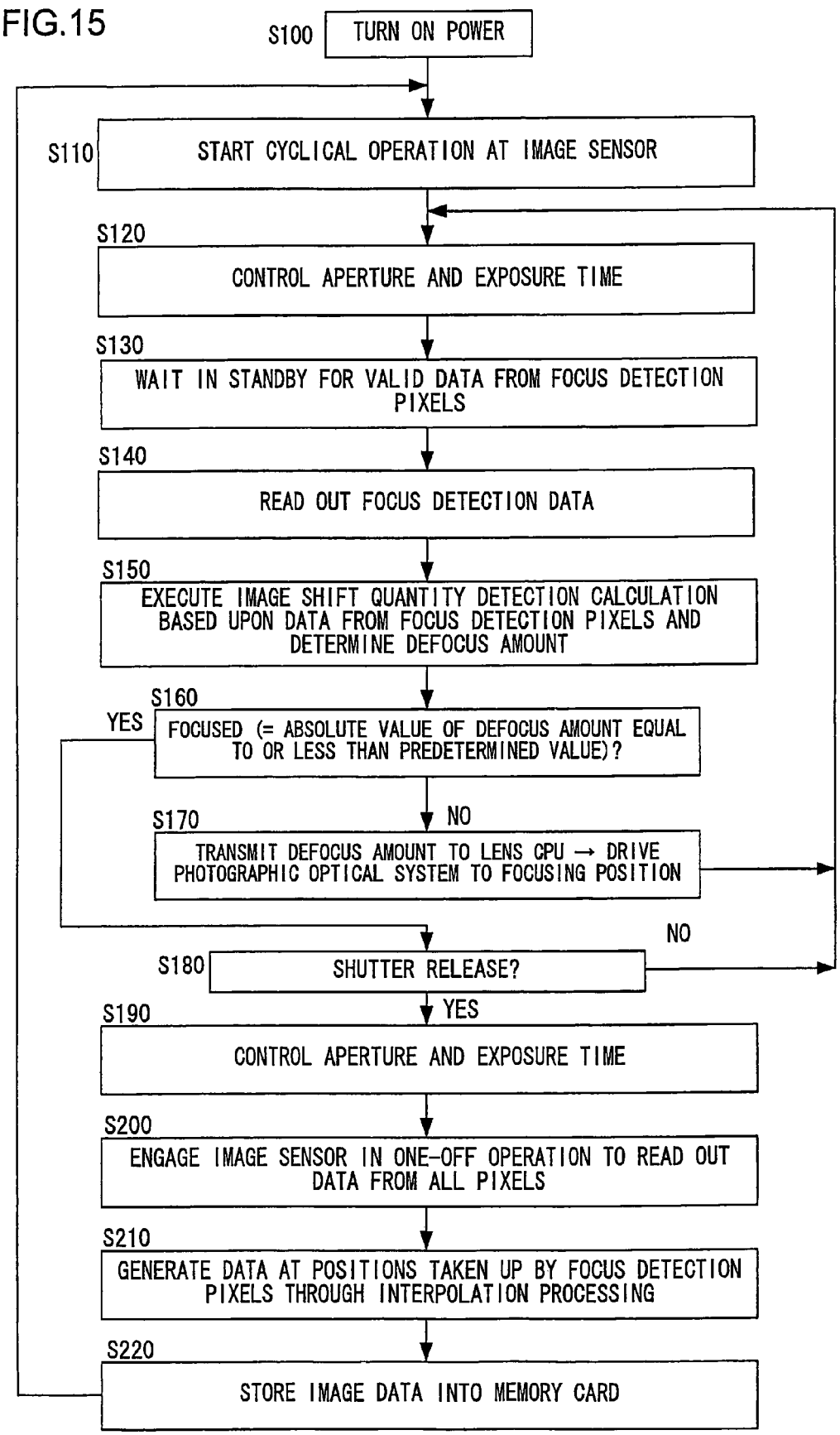
FIG. 15 presents a flowchart of the operations executed in the digital still camera (image-capturing device) shown in FIG. 1.

FIG. 15 presents a flowchart of the operation executed in the digital still camera (image-capturing device) shown in FIG. 1. The body CPU 214d repeatedly executes the operation after power to the camera is turned on. After the power is turned on in step 100, the operation proceeds to step 110 to issue a command for the image sensor drive control circuit 214a to start cyclical operation of the image sensor 212.

In the following step 120, aperture control information corresponding to a photographic aperture value automatically determined in correspondence to the field brightness having been measured by the photometering sensor (not shown) or corresponding to the photographic aperture value manually set by the user via an operation member (not shown), is transmitted to the lens drive control device 206, and the aperture diameter is set in correspondence to the photographic aperture value. In addition, the storage times at the image-capturing pixels and the focus detection pixels and the signal amplification are updated in correspondence to the photographic aperture value, the field brightness and the levels (average values) of image data resulting from the most recent operations and the updated information is provided to the image sensor drive control circuit 214a. It is to be noted that predetermined level values are used immediately after the power is turned on since information indicating the level (average value) of the image data resulting from the most recent operation is not yet available.

In step 130, the operation waits in standby for a notice indicating that valid image data from the focus detection pixels have been stored into the internal memory to be issued from the image sensor drive control circuit 214a. In step 140, the image data originating from the focus detection pixels are read out from the internal memory 214c. In step 150, the image shift detection operation processing (correlation operation processing) to be detailed later is executed based upon the pair of sets of image data corresponding to the focus detection pixel row to calculate the image shift quantity and then to ultimately calculate the defocus amount.

In step 160, a decision is made as to whether or not the current condition is close to a focusing state, i.e., whether or not the absolute value of the defocus amount having been calculated is equal to or less than a predetermined value. If it is decided that the current condition is not close to the focusing state, the operation proceeds to step 170 to transmit the calculated defocus amount to the lens drive control device 206 which then drives the focusing lens 210 at the exchangeable lens 202 to the focusing position. Then, the operation returns to step 120 to repeatedly execute the operation described above. It is to be noted that the operation also branches to this step if focus detection is not possible to transmit a scan drive instruction to the lens drive control device 206. In response, the lens drive control device 206 drives the focusing lens 210 at the exchangeable lens 202 to scan between the infinity position and the close-up position. Subsequently, the operation returns to step 120 to repeatedly execute the operation described above.

If, on the other hand, it is decided that the current condition is close to the focusing state, the operation proceeds to step 180 to make a decision as to whether or not a shutter release has occurred in response to an operation of the shutter release button (not shown). If it is decided that a shutter release has not yet occurred, the operation returns to step 120 to repeatedly execute the operation described above. If it is decided that a shutter release has occurred, the operation proceeds to step 190 to transmit the aperture control information to the lens drive control device 206. In response, the aperture at the exchangeable lens 202 is set to the photographic aperture value. Matching lengths of storage time and matching degrees of signal amplification are determined for the image-capturing pixels and the focus detection pixels in correspondence to the photographic aperture value, the field brightness and the levels (average values) of the image data resulting from the most recent operations, and information indicating the storage time and the signal amplification thus determined is then provided to the image sensor drive control circuit 214a.

As the aperture control ends, the image sensor 212 is engaged in a one-off image-capturing operation and image data originating from the image-capturing pixels and all the focus detection pixels at the image sensor 212 are read out from the internal memory 214c in step 200. In step 210, image data at positions assumed by the individual pixels in the focus detection pixel row are interpolated based upon the data at the focus detection pixels 311 and the data at surrounding image-capturing pixels. In step 220, image data constituted with the data at the image-capturing pixels 310 and the interpolated data are saved into the memory card 219, and then the operation returns to step 110 to repeatedly execute the operation described above.

The focus detection operation executed in step 150 in FIG. 15 is now explained in detail. High-frequency cut filter processing such as that expressed in (1) below is executed on a pair of data strings ($\alpha_1 \sim \alpha_M$ and $\beta_1 \sim \beta_M$; M indicates the number of sets of data) output from the focus detection pixel row, so as to generate a first data string and a second data string ($A_1 \sim A_N$ and $B_1 \sim B_N$), from which a noise component or a high-frequency component that would adversely affect the correlation processing has been eliminated. It is to be noted that the high-frequency cut filter processing may be skipped if the arithmetic operation needs to be completed faster or if the extent of defocusing is already significant and thus it is obvious that only a very small high-frequency component is present.

$$A_n = \alpha_n + 2 \cdot \alpha_{n+1} + \alpha_{n+2},$$

$$B_n = \beta_n + 2 \cdot \beta_{n+1} + \beta_{n+2} \tag{1}$$

In expression (1) above, n=1~N.

The correlation quantity C(k) is calculated by executing a correlation operation expressed in (2) on the data strings $A_n$ and $B_n$ $$C(k) = \Sigma |A_n \cdot B_{n+1+k} - B_{n+k} \cdot A_{n+1}| \tag{2}$$

In expression (2), the Σ operation is cumulatively executed with regard to n and the range assumed for n is limited to the range over which the data $A_n$, $A_{n+1}$, $B_{n+k}$ and $B_{n+1+k}$ exist in correspondence to the shift quantity k. In addition, the shift quantity k is an integer which represents a relative shift quantity assuming a value taken in units matching the data interval with which the data in the data strings are sampled.

Figure 16A:
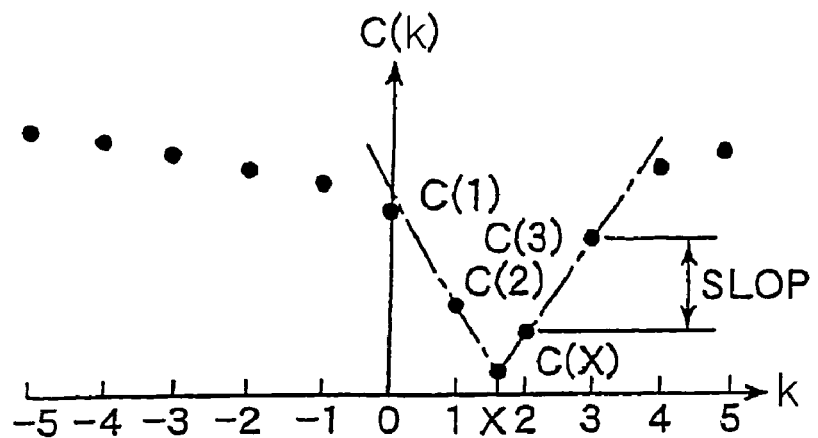
FIGS. 16A through 16C provide detailed illustrations of the focus detection operation.

The results of the arithmetic operation executed as expressed in (2) may indicate that the correlation quantity C(k) assumes the smallest value (the smaller the value, the higher the correlation level) at the shift quantity at which the pair of sets of data achieve a high level of correlation (when k=kj=2 in FIG. 16A). The shift quantity x, which gives the smallest value C(x) in the continuous correlation quantity graph, is determined by adopting a three-point interpolation method expressed in (3)~(6) below.

$$x = kj + D/SLOP \tag{3}$$

$$C(x) = C(kj) - |D| \tag{4}$$

$$D = \{C(kj-1) - C(kj+1)\}/2 \tag{5}$$

$$SLOP = MAX\{C(kj+1) - C(kj), C(kj-1) - C(kj)\} \tag{6}$$

Figure 16B:
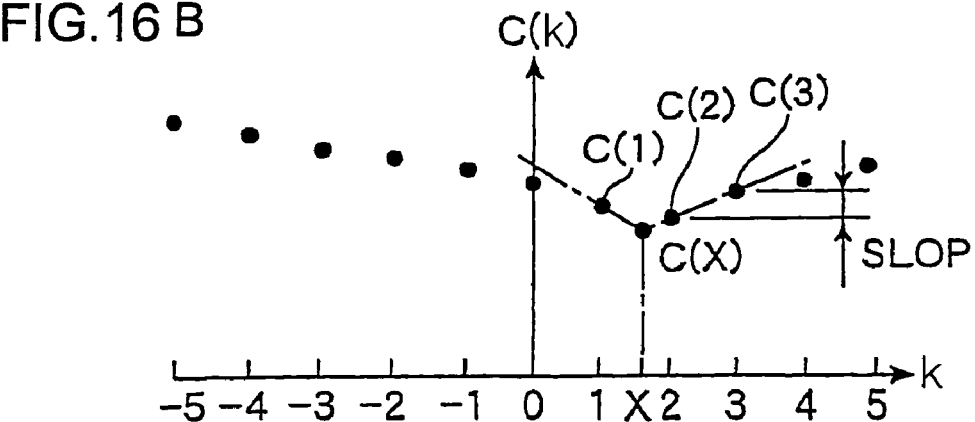

The judgment as to whether or not the shift quantity x calculated as expressed in (3) is reliable is made as follows. As shown in FIG. 16B, the interpolated minimum value C(x) of the correlation quantity increases when the level of correlation between the pair of sets of data is low. Accordingly, if C(x) is equal to or greater than a predetermined threshold value, the shift quantity is judged to be less reliable and the calculated shift quantity x is canceled. Alternatively, C(x) may be standardized with regard to the data contrast, and in such a case, if the value obtained by dividing C(x) by SLOP indicating a value in proportion to the contrast is equal to or greater than a predetermined value, the calculated shift quantity should be judged to be not reliable and accordingly, the calculated shift quantity x is canceled. As a further alternative, if SLOP indicating the value in proportion to the contrast is equal to or less than a predetermined value, the subject should be judged to be a low-contrast subject and, accordingly, the reliability of the calculated shift quantity should be judged to be low and accordingly, the calculated shift quantity x is canceled.

Figure 16C:
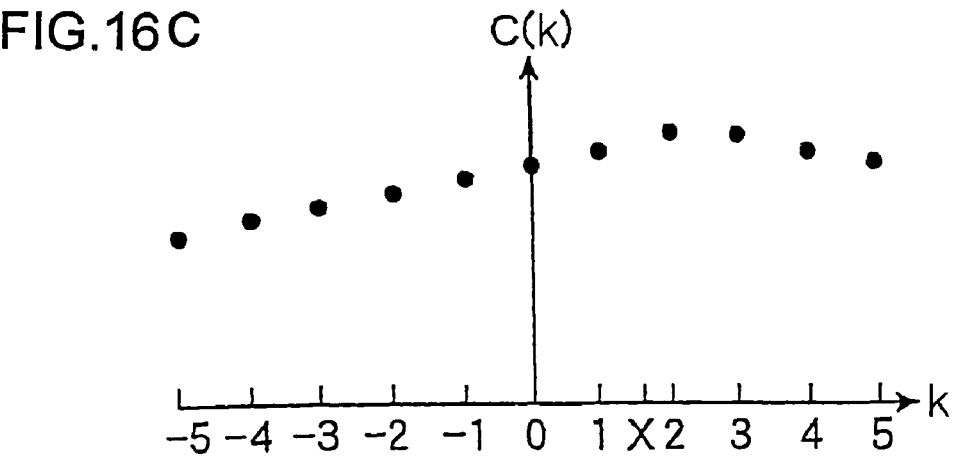

If the level of correlation between the pair of sets of data is low and the correlation quantity C(k) does not dip at all over the shift range kmin to kmax, as shown in FIG. 16C, the minimum value C(x) cannot be determined. In this case, it is decided that focus detection cannot be executed.

The correlation quantity C(k) may be calculated by using the following correlation operation expression instead of correlation operation expression (2).

$$C(k) = \Sigma |A_n / A_{n+1} - B_{n+k} / B_{n+1+k}| \tag{7}$$

In expression (7), the Σ operation is cumulatively executed with regard to n and the range assumed for n is limited to the range over which the data $A_n$, $A_{n+1}$, $B_{n+k}$ and $B_{n+1+k}$ exist in correspondence to the shift quantity k. It is to be noted that the correlation quantity may be calculated by using a correlation operation expression other than expression (2) or expression (7).

If the calculated shift quantity x is judged to be reliable, the defocus amount DEF indicating the extent of defocusing of the subject image plane relative to the predetermined imaging plane can be calculated as expressed in (8) below . . . .

$$DEF = KX \cdot PY \cdot x \tag{8}$$

PY in expression (8) represents the detection pitch (the pitch at which the focus detection pixels are disposed), whereas KX in expression (8) represents the conversion coefficient that is determined in correspondence to the opening angle formed by the gravitational centers of the light fluxes passing through the pair of range-finding pupils. The opening angle formed by the gravitational centers of the light fluxes passing through the pair of range-finding pupils changes in correspondence to the size of the aperture (aperture value) at the exchangeable lens and, accordingly, the opening angle is determined based upon the lens information.

Figure 17:
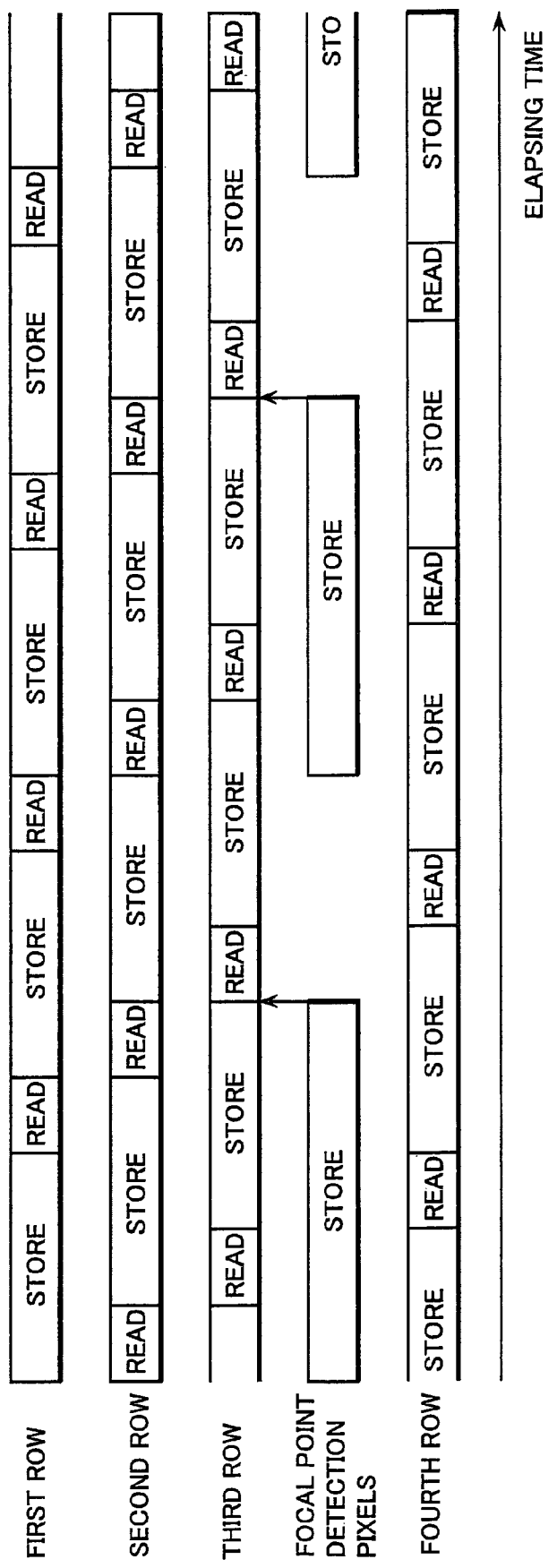
FIG. 17 is a conceptual diagram of the flow of operations executed at the image sensor in an embodiment.

Next, the structure and the operation of the image sensor achieved in an embodiment are explained in detail. FIG. 17 is a conceptual diagram of the flow of the operation executed by the image sensor 212. In order to simplify the explanation, it is assumed that the image sensor 212 includes 4×4 pixels (four rows by four columns) and that two focus detection pixels are disposed at the third row/second column position and at the third row/third column position. The figure shows the operational flow assumed during the cyclical operation. The image sensor 212 is a CMOS image sensor and image signals are read out from the image-capturing pixels through a rolling shutter system. In each row, the charge storage (exposure) at the photoelectric conversion portions and the subsequent read are alternately executed in sequence at the image-capturing pixels. The image signals are read out from the image-capturing pixels in the order of; the first row, the second row, the third row and the fourth row, and the read operation is repeatedly executed over a predetermined cycle.

Electrical charges are stored at the photoelectric conversion portions of the focus detection pixels so that the charge storage ends in synchronization with the image signals from the image-capturing pixels in the third row. A greater length of charge storage time is set for the focus detection pixels than the charge storage time at the image-capturing pixels. Thus, the read cycle over which the image signals from the focus detection pixels are read out is an integral multiple of the read cycle with which the image signals are read out from the image-capturing pixels (twice the read cycle with which the image signals from the image-capturing pixels are read in the example shown in the figure).

Through this operational sequence, image data achieving a level optimal for focus detection calculation can be obtained by allowing electrical charges to be stored at the focus detection pixels over a longer period of time than the charge storage time at the image-capturing pixels while reading out the image signals from the image-capturing pixels over a specific cycle. As a result, reliable focus detection is assured even when the brightness of the subject is low, while sustaining a constant refresh cycle at the EVF. When the brightness of the subject is high, the storage time can be reduced and thus, image signals may be read out from the image-capturing pixels and the focus detection pixels over equal read cycles. It is to be noted that when the brightness of the subject is low, the charge storage time at the image-capturing pixels should be controlled so as to ensure that the required read cycle is sustained and that if this restriction results in an insufficient signal level, the degree to which the image signals are amplified should be adjusted.

Figure 18:
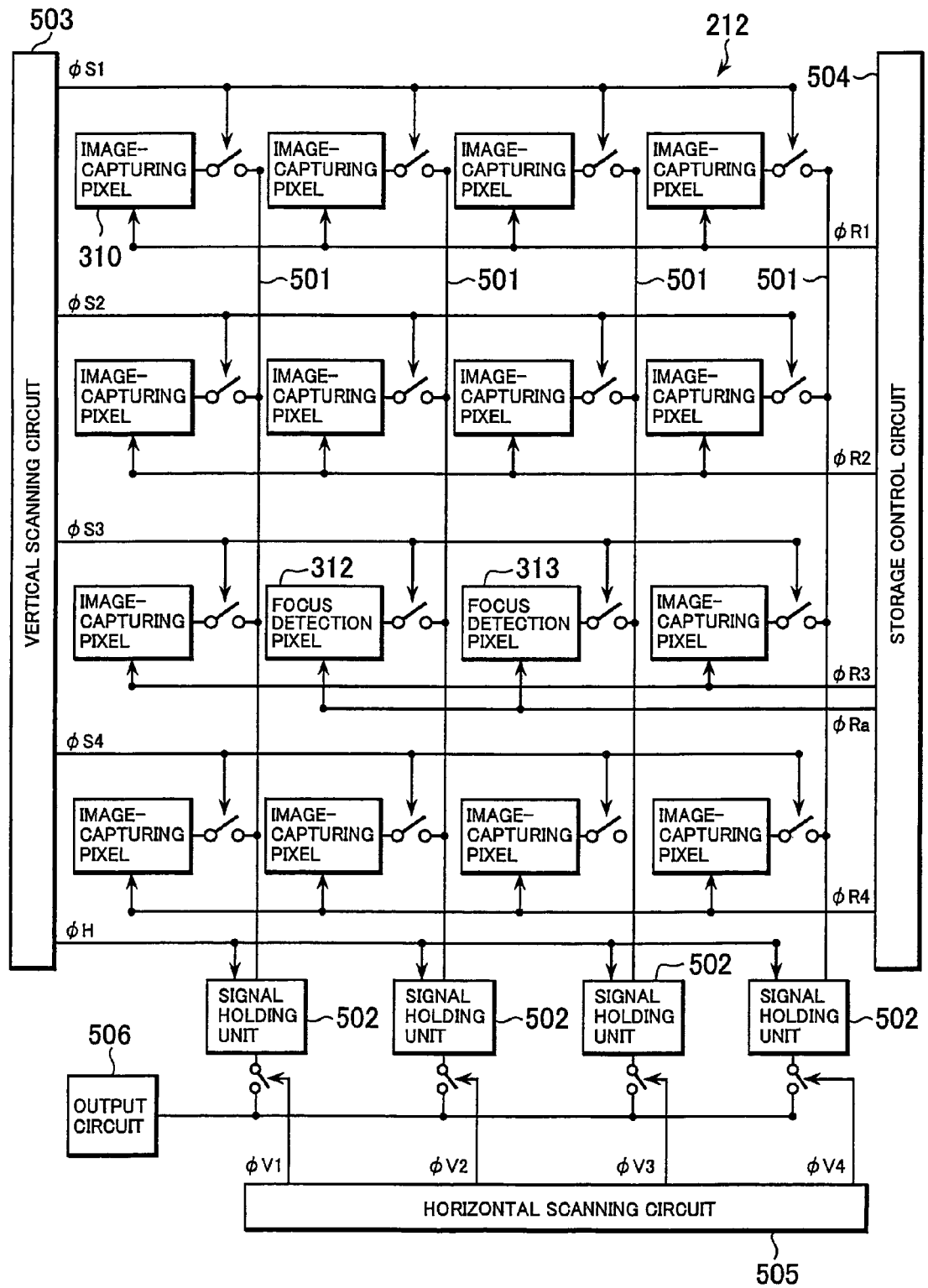
FIG. 18 shows the circuit structure adopted in the image sensor in the embodiment.

FIG. 18 shows the circuit structure of the image sensor 212. With regard to the operational flow explained in reference to FIG. 17, the image sensor includes 4×4 pixels in its circuit structure, with two focus detection pixels 312 and 313 respectively disposed at the third row/second column position and at the third row/third column position. All the other pixels in this circuit structure are image-capturing pixels 310. Signal holding units 502 constitute a buffer where the image signals from the pixels in a given row are temporarily held. The individual signal holding units latch the image signals output to the corresponding vertical signal lines 501 in response to a-control signal ØH generated from a vertical scanning circuit 503.

The electrical charge storage at the image-capturing pixels 310 is controlled in units of the individual rows independently of one another based upon control signals (ØR1~ØR4) generated by a storage control circuit 504. The electrical charge storage at the focus detection pixels 312 and 313 is controlled based upon a control signal ØRa generated by the storage control circuit 504. The image signal output from the image-capturing pixels 310 and the focus detection pixels 312 and 313 is controlled in units of the individual rows independently of one another based upon control signals (ØS1~ØS4) generated by the vertical scanning circuit 503. The image signal at a pixel selected based upon a control signal is output to the corresponding vertical signal line 501.

The image signals held in the signal holding units 502 are sequentially transferred to an output circuit 506 in response to control signals (ØV1~ØV4) generated by a horizontal scanning circuit 505 and the transferred signals are then amplified to a specific preset degree at the output circuit 506 and are output through time-sharing (in time sequence) to the outside.

Figure 19:
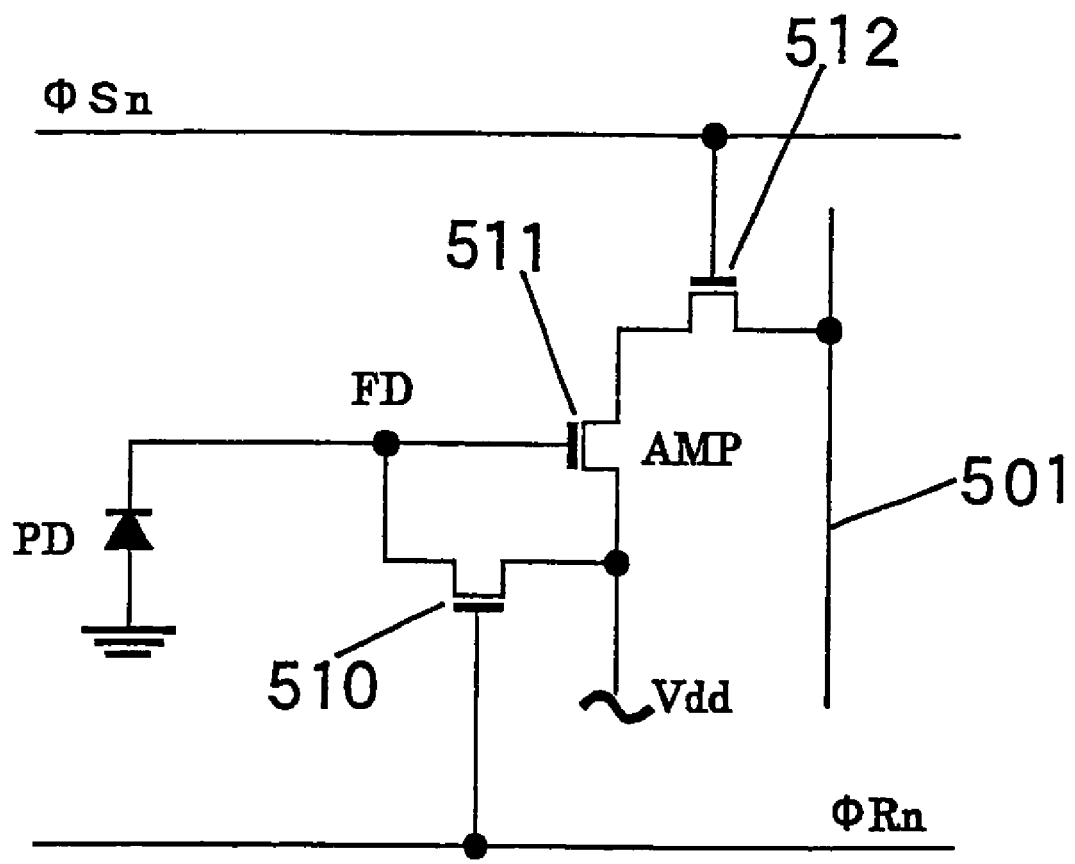
FIG. 19 is a detailed circuit diagram pertaining to the image-capturing pixels and the focus detection pixels shown in FIG. 18.

FIG. 19 is a detailed circuit diagram pertaining to the image-capturing pixels and the focus detection pixels shown in FIG. 18. The photoelectric conversion portion is constituted with a photodiode (PD). The electrical charge stored at the PD is accumulated in a floating diffusion (FD) layer. The FD is connected to the gate of an amplifier MOS transistor (AMP), and the AMP, in turn, generates a signal corresponding to the quantity of the electrical charge accumulated in the FD. The FD portion is connected to a source voltage Vdd via a reset MOS transistor 510 and as the reset MOS transistor 510 is turned on by the control signal ØRn (ØR1~ØR4, ØRa), the electrical charge having been collected in the FD and the PD is cleared, thereby resetting the FD and the PD.

The output from the AMP is connected to the vertical output line 501 via a row selector MOS transistor 512, and as the row selector MOS transistor 512 is turned on by the control signal ØSn (ØS1~ØS4, ØSa), the output from the AMP is output into the vertical output line 501.

Figure 20:
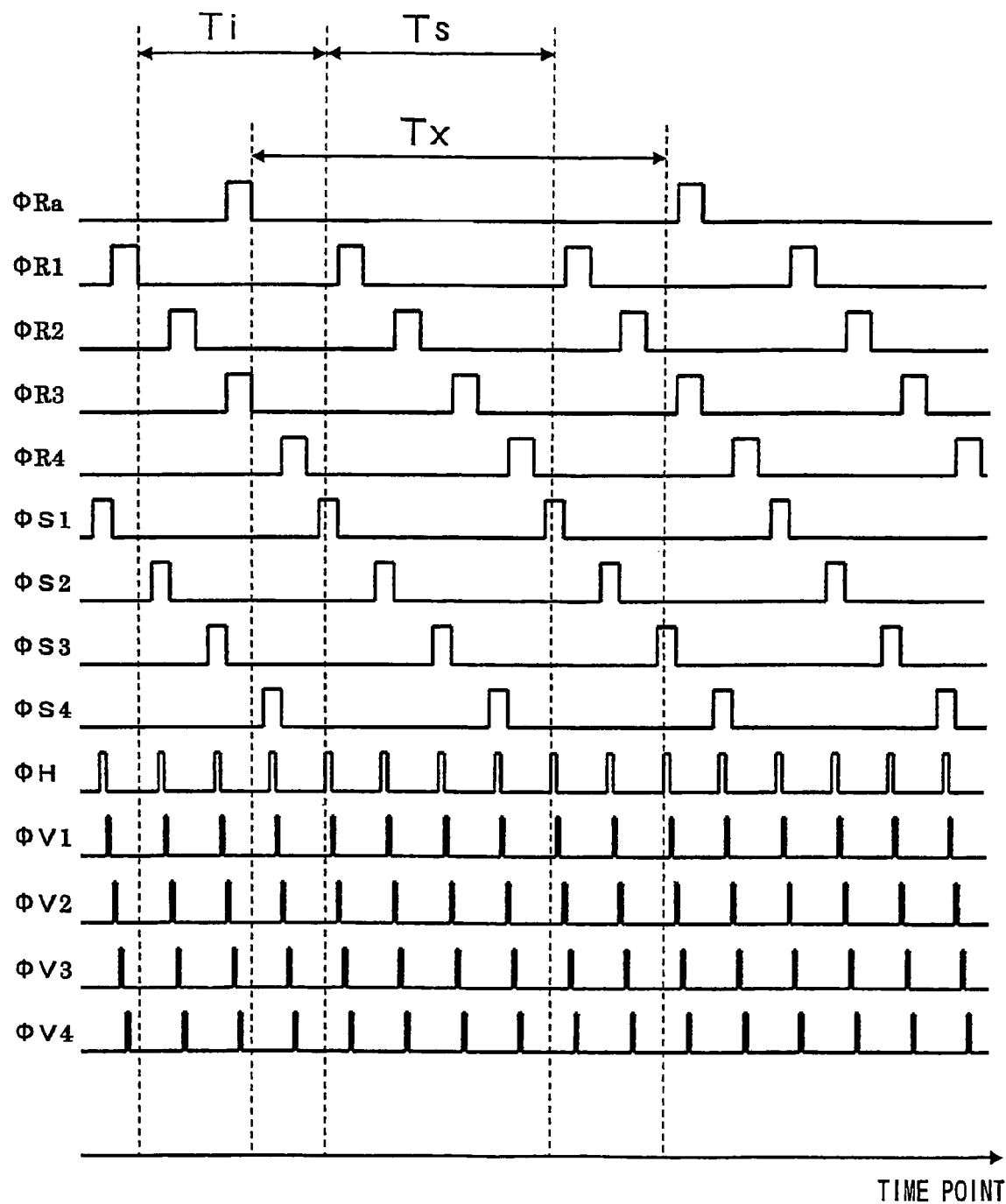
FIG. 20 is an operation timing chart pertaining to the image sensor shown in FIG. 18.

FIG. 20 is a timing chart of the operation executed in the image sensor shown in FIG. 18. The image-capturing pixels 310 in the first row are selected by the control signal ØS1 generated by the vertical scanning circuit 503 and the image signals from the selected image-capturing pixels 310 are output to the vertical signal lines 501. The image signals from the image-capturing pixels in the first row, having been output to the vertical signal lines 501, are temporarily held in the signal holding units 502 based upon the control signal ØH generated in synchronization with the control signal ØS1. The image signals from the image-capturing pixels 310 in the first row held in the signal holding units 502 are transferred to the output circuit 506 in response to the control signals ØV1~ØV4 generated sequentially from the horizontal scanning circuit 505. They are then amplified to the specific preset extent at the output circuit 506 before they are output to the outside.

As the transfer of the image signals at the image-capturing pixels 310 in the first row to the signal holding units 502 ends, the image-capturing pixels 310 in the first row are reset in response to the control signal ØR1 generated by the storage control circuit 504, and the subsequent charge storage starts at the image-capturing pixels 310 in the first row. As the output circuit 506 ends the output of the image signals from the image-capturing pixels 310 in the first row, the image-capturing pixels 310 in the second row are selected by the control signal ØS2 generated by the vertical scanning circuit 503 and the image signals from the selected image-capturing pixels 310 are output to the vertical signal lines 501. Subsequently, the image signals from the image-capturing pixels 310 in the second row are held, the image-capturing pixels 310 in the second row are reset and the image signals are output in a manner similar to that described above.

Next, the image signals from the image-capturing pixels 310 and the focus detection pixels 312 and 313 in the third row are held, the image-capturing pixels 310 are reset and the image signals from the image-capturing pixels 310 and the focus detection pixels 312 and 313 in the third row are output. Then, the image signals from the image-capturing pixels 310 in the fourth row are held, the image-capturing pixels 310 are reset and the image signals from the image-capturing pixels 310 in the fourth row are output. Subsequently, the image-capturing pixels in the first row are selected again and the operation described above is repeated.

Control is executed so that the cycle Ts, representing the length of time elapsing between the electrical charge hold timing with which the image signals from the image-capturing pixels 310 in the first row become held and the subsequent electrical charge hold timing with which the image signals from the image-capturing pixels 310 in the first row become held next remains constant. The electrical charge storage time Ti (exposure time) at the image-capturing pixels 310 matches the length of time elapsing between the time point at which the pixels are reset and the time point at which the image signals become held.

The focus detection pixels 312 and 313 are reset in response to the control signal ØRa instead of the control signal in ØR3 used to reset the image-capturing pixels in the third row and thus, the focus detection pixels 312 and 313 are not reset with the timing with which the image-capturing pixels 310 in the third row are reset. The charge storage time Tx (exposure time) at the focus detection pixels 312 and 313 is equal to the length of time elapsing between the time point at which the focus detection pixels 312 and 313 are reset in response to the control signal ØRa and the time point at which the image signals become held immediately before the control signal ØRa is generated next.

In the example presented in FIG. 20, the read cycle over which the image signals from the focus detection pixels 312 and 313 are read out is twice the length of the read cycle over which the image signals from the image-capturing pixels 310 are read out. Namely, while the image signals are read out from the image-capturing pixels 310, which are reset with the image signal read timing, through a destructive read, the image signals at the focus detection pixels 312 and 313 are read out through a non-destructive read, without resetting the focus detection pixels with the image signal read timing one time, so as to extend the charge storage time at the focus detection pixels.

In the example presented in FIG. 20, the image signals are read out from the image-capturing pixels 310 and the focus detection pixels 312 and 313 as the control signal ØS3 enters an ON state for the first time. As the control signal ØR3 and the control signal ØRa, which are generated immediately after the control signal ØS3, enter an ON state, the image-capturing pixel 310 and the focus detection pixels 312 and 313 become reset to start over the next charge storage. In this situation, the image signals or read out from both the image-capturing pixels 310 and the focus detection pixels 312 and 313 through a destructive read.

As the control signal ØS3 enters the ON state for the second time, the image signals are read out from the image-capturing pixels 310 and the focus detection pixels 312 and 313 as the control signal ØR3 generated immediately afterward enters an ON state, the image-capturing pixels 310 become reset to start the next charge storage. However, the control signal ØRa remains in the OFF state and thus, the focus detection pixels 312 and 313 are not reset and instead continue the ongoing charge storage. In this situation, while a destructive read is executed at the image-capturing pixels 310, anon-destructive read is executed for the focus detection pixels 312 and 313.

By allowing the focus detection pixels 312 and 313 to undergo the non-destructive read as described above, the charge storage time is extended so as to ensure that the electrical charges are stored to a sufficient extent.

It is to be noted that while the control signal ØRa enters the ON state every other time the control signal ØR3 enters the ON state in the example presented in FIG. 20, the control signal ØRa does not need to enter the ON state in synchronization with every other ON state of the control signal ØR3. The timing with which the image signals are read out from the image-capturing pixels 310 and the timing with which the image signals are read out from the focus detection pixels 312 and 313 are both determined in correspondence to the timing with which the control signal ØS3 enters the ON state. Accordingly, the timing with which the focus detection pixels 312 and 313 are reset to start the next charge storage should be determined so as to assure a sufficient level of image storage at the focus detection pixels 312 and 313 by counting back from the timing with which the control signal ØS3 enters the ON state for the second time (the timing with which the destructive read is executed at the focus detection pixels 312 and 313). It is to be noted that under these circumstances, the timing with which the stored electrical charges are reset at the focus detection pixels 312 and 313 through the destructive read at the focus detection pixels 312 and 313 will be slightly offset.

In addition, the timing with which the next electrical charge storage is started by resetting the focus detection pixels 312 and 313 may be adjusted by checking the preceding charge storage quantity. Namely, if the brightness of the subject is low and the previous charge storage quantity is less than a predetermined storage quantity, the charge storage time should be extended, whereas if the brightness of the subject is high and the previous charge storage quantity is greater than the predetermined storage quantity, the storage time should be shortened.

Since the image signal level will not have reached the optimal level for the focus detection calculation at the point in time at which the image signals at the focus detection pixels 312 and 313 are read out through the non-destructive read, the image sensor drive control circuit 214a (see FIG. 14) transmits information invalidating the image data from the focus detection pixels 312 and 313 to the body CPU 214d (see FIG. 14). The body CPU 214d only uses valid image data when executing focus detection calculation (see FIG. 15).

It is to be noted that invalid image data may also be read out to be used in the focus detection calculation. In addition, the body CPU 214d may read out invalid image data, detect the level of the image data, determine based upon the detected level whether or not to end the charge storage at the focus detection pixels in the next image-capturing pixel read cycle and issue an instruction for the image sensor drive control circuit 214a to continue or end the charge storage.

(Variations of the Embodiment)

Figure 21:
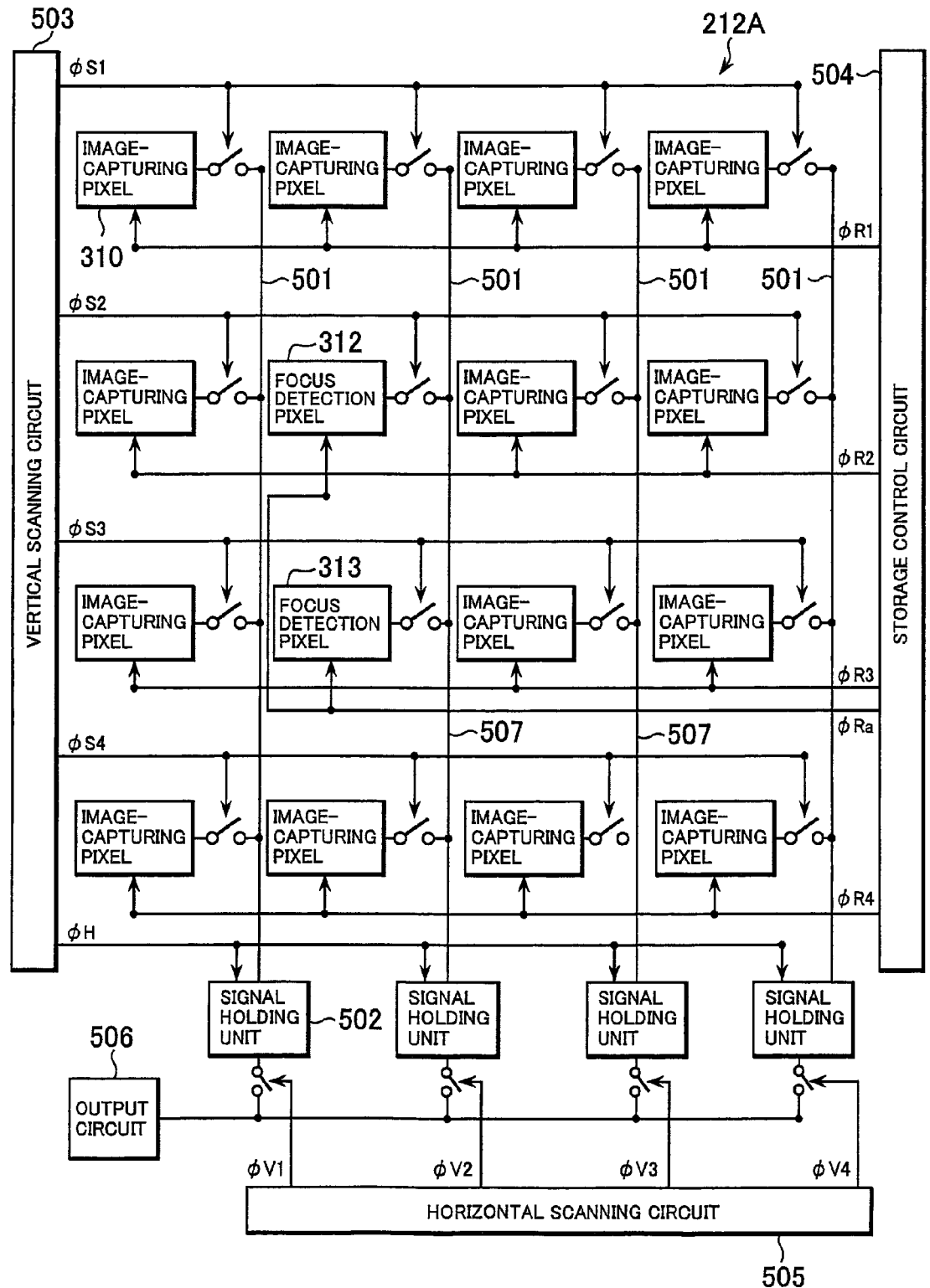
FIG. 21 shows the circuit structure adopted in an image sensor achieved in a variation.

FIG. 21 shows the circuit structure adopted in an image sensor 212A achieved in a variation. It is to be noted that the same reference numerals are assigned to elements similar to those shown in FIG. 18 and their explanation is omitted. While the focus detection pixels 312 and 313 are disposed side-by-side in a given row at the image sensor 212 in FIG. 18, the focus detection pixels 312 and 313 are set side by side in a given column (occupying the second row/second column position and the third row/second column position) in the image sensor 212A in the variation shown in FIG. 21. In other words, the pixels assume a positional arrangement obtained by rotating the pixel positional arrangement at the image sensor 212 in FIG. 3 by 90°. A common control signal ØRa is generated for the focus detection pixels 312 and 313 disposed side-by-side in the same column. In conjunction with this circuit structure, a focus detection area extending along the columnar direction can be set to execute operation through an operational flow similar to the operational flow shown in FIG. 20.

Figure 22:
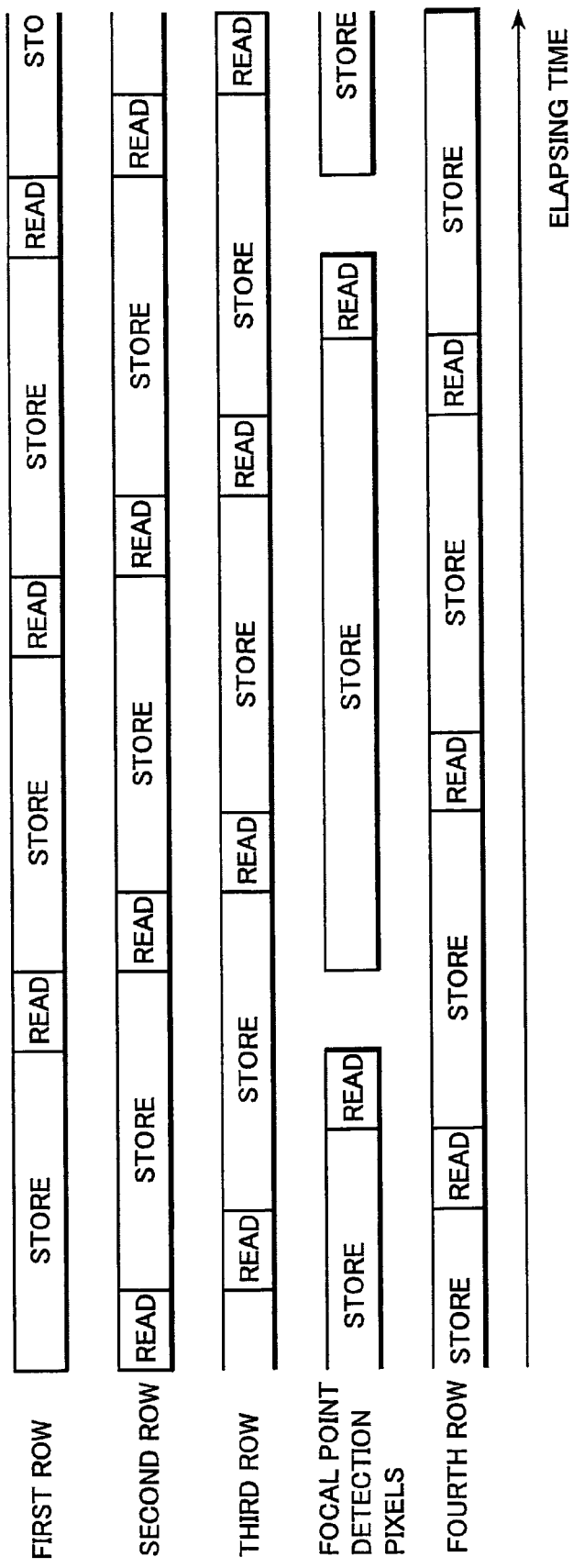
FIG. 22 is a conceptual diagram of the flow of operations executed at an image sensor in a variation.

FIG. 22 is a conceptual diagram of the operational flow of the operation executed in an image sensor achieved in a variation. In the operational flow shown in the conceptual diagram in FIG. 17, the image signals at the focus detection pixels are read out timing with which the image signals at the image-capturing pixels are also read out. In the operational flow shown in the conceptual diagram in FIG. 22, on the other hand, the image signals at the focus detection pixels are read out with different timing, although the focus detection pixel image signal read is executed in synchronization with the image-capturing pixel image signal read timing.

Namely, a blank period is allowed to elapse between the end of the image signal read from the image-capturing pixels in the fourth row and the start of the image signal read from the image-capturing pixels in the first row, the charge storage in the photoelectric conversion portions at the focus detection pixels is executed so that the charge storage ends in synchronization with the end of the image signal read from the image-capturing pixels in the fourth row and the image signals at the focus detection pixels are read out during the blank period. This operational flow allows a greater charge storage time to be set for the focus detection pixels compared to the charge storage time at the image-capturing pixels. Accordingly, the read cycle with which the image signals at the focus detection pixels are read out is set to an integral multiple of the read cycle with which the image signals at the image-capturing pixels are readout (twice the image signal read cycle set for the image-capturing pixels in the example presented in FIG. 22).

Through this operational sequence, image data achieving a level optimal for focus detection calculation can be obtained by allowing electrical charges to be stored at the focus detection pixels over a longer period of time than the charge storage time at the image-capturing pixels while reading out the image signals from the image-capturing pixels over a specific cycle. As a result, reliable focus detection is assured even when the brightness of the subject is low, while sustaining a constant refresh cycle at the EVF. When the brightness of the subject is high, the storage time can be reduced and thus, image signals may be read out from the image-capturing pixels and the focus detection pixels over equal read cycles.

Figure 23:
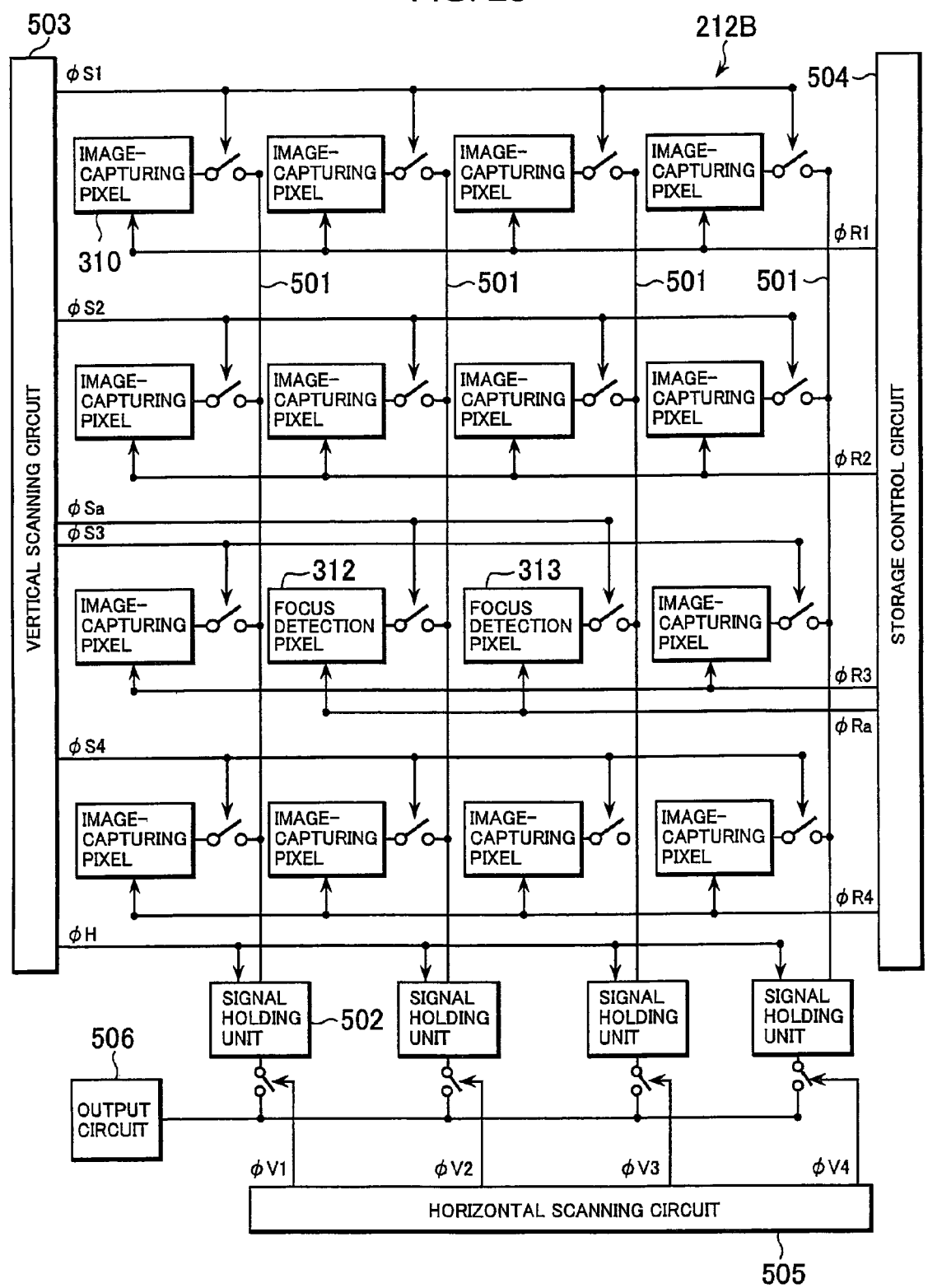
FIG. 23 is a conceptual diagram of the circuit structure adopted in the image sensor in the variation shown in FIG. 22.

FIG. 23 is a conceptual diagram of the circuit structure adopted in an image sensor 212B achieved in the variation in correspondence to the operational flow shown in FIG. 22. In FIG. 23, the same reference numerals are assigned to elements similar to those shown in FIG. 18 and their explanation is omitted. While the row selector MOS transistors for the focus detection pixels 312 and 313 and the image-capturing pixels 310 are controlled by the common control signal ØS3 in the image sensor 212 shown in FIG. 18, the row selector MOS transistors for the focus detection pixels 312 and 313 are controlled by a special control signal ØSa in the image sensor 212B shown in FIG. 22.

By providing different control signals for the row selector MOS transistors for the focus detection pixels 312 and 313 and the row selector MOS transistors for the image-capturing pixels 310, the image signals at the focus detection pixels 312 and 313 can be read out independently of the image signal read from the image-capturing pixels 310 in the third row. The output of the image signals from the focus detection pixels 312 and 313 is controlled by using the control signal ØSa generated by the vertical scanning circuit 503.

Figure 24:
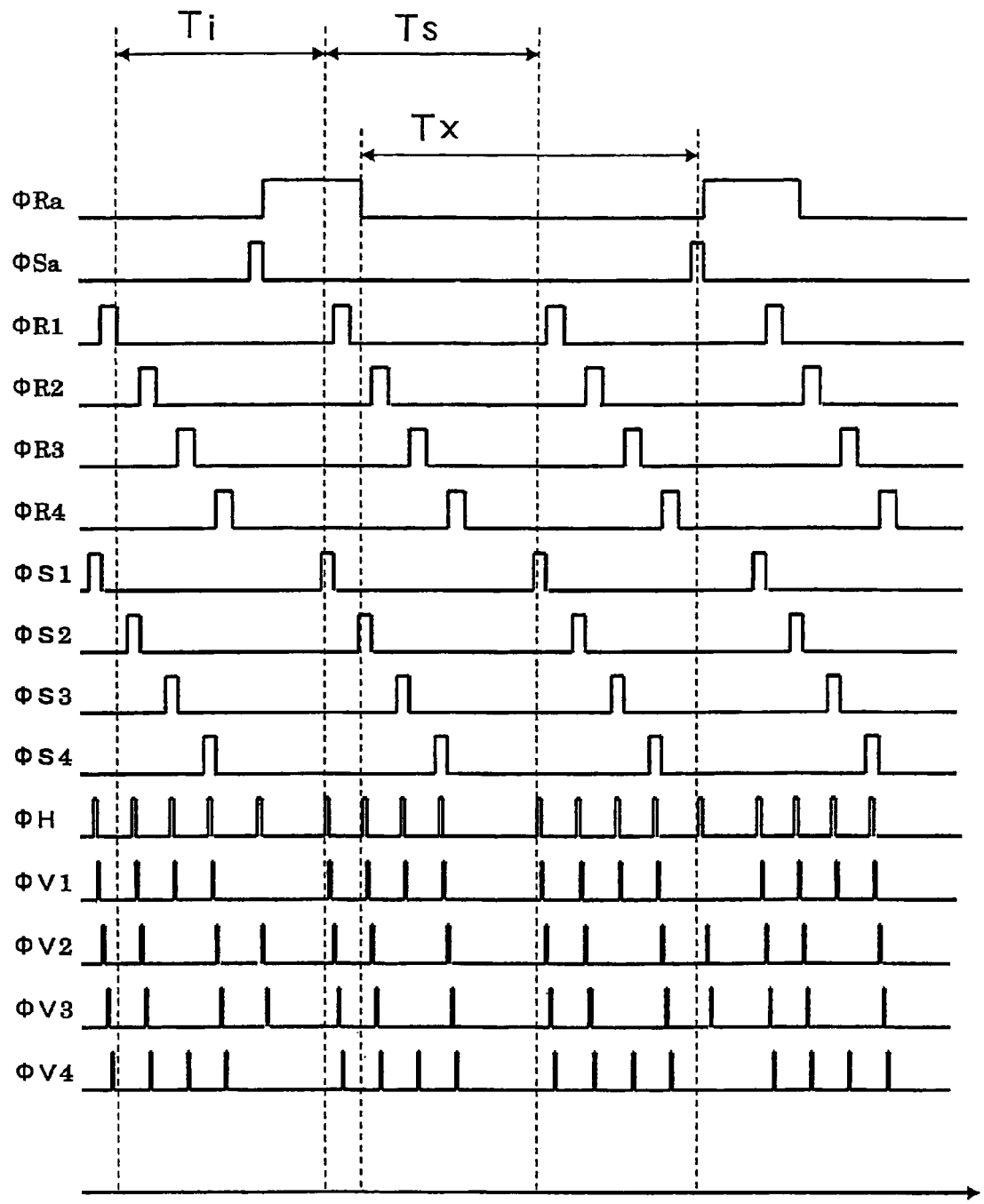
FIG. 24 is an operation timing chart pertaining to the image sensor in the variation shown in FIG. 23.

FIG. 24 presents a timing chart of the operation executed in the image sensor 212B shown in FIG. 23. The operation timing in FIG. 24 differs from the operation timing shown in FIG. 20 with regard to the operation of the image-capturing pixels 310 and the focus detection pixels 312 and 313 in the third row at the image sensor 212B. The image-capturing pixels 310 in the third row are selected by the control signal ØS3 generated by the vertical scanning circuit 503 and the image signals from the selected image-capturing pixels 310 are output to the vertical signal lines 501.

Based upon the control signal ØH generated in synchronization with the control signal ØS3, the image signals output from the image-capturing pixels 310 in the third row to the vertical signal lines 501 are temporarily held at the signal holding units 502. The image signals from the image-capturing pixels 310 in the third row held at the signal holding units 502 are then transferred to the output circuit 506 in conformance to the control signals ØV1 and ØV4 generated in sequence from the horizontal scanning circuit 505, are amplified to the preset degree at the output circuit 506 and are output to the outside.

As the transfer of the image signals at the image-capturing pixels 310 in the third row to the signal holding units 502 ends, the image-capturing pixels 310 in the third row are reset in response to the control signal ØR3 generated by the storage control circuit 504 and subsequent charge storage starts at the image-capturing pixels 310 in the third row. The blank period is allowed to elapse after the output of the image signals from the image-capturing pixels 310 in the fourth row ends until the output of the image signals from the image-capturing pixels 310 in the first row starts.

Control is executed so that the cycle Ts, representing the length of time elapsing between the electrical charge hold timing with which the image signals from the image-capturing pixels 310 in the first row become held and the subsequent electrical charge hold timing with which the image signals from the image-capturing pixels 310 in the first row become held next remains constant. The electrical charge storage time Ti (exposure time) at the image-capturing pixels 310 matches the length of time elapsing between the time point at which the pixels are reset and the time point at which the image signals become held.

The special control signals ØRa and ØSa are provided for the focus detection pixels 312 and 313 separately from the control signals ØR3 and ØS3 used to control the image-capturing pixels 310 in the third row. Thus, during the blank period elapsing following the end of the image signal output from the image-capturing pixels 310 in the fourth row until the image signal output from the image-capturing pixels 310 in the first row starts, the focus detection pixels 312 and 313 are selected by the control signal ØSa generated by the vertical scanning circuit 503 as necessary and the image signals from the selected image-capturing pixels 310 are output to the vertical signal lines 501.

Based upon the control signal ØH generated in synchronization with the control signal ØSa, the image signals output from the focus detection pixels 312 and 313 to the vertical signal lines 501 are temporarily held at the signal holding units 502. The image signals from the focus detection pixels 312 and 313 held at the signal holding units 502 are then transferred to the output circuit 506 in conformance to the control signals ØV2 and ØV3 generated in sequence from the horizontal scanning circuit 505, are amplified to the preset degree at the output circuit 506 and are output to the outside during the blank period.

As the transfer of the image signals at the focus detection pixels 312 and 313 to the signal holding units 502 ends, the focus detection pixels 312 and 313 in the third row are reset in response to the control signal ØRa generated by the storage control circuit 504 and the subsequent charge storage starts at the focus detection pixels 312 and 313. By adjusting the length of the reset period (the L period) during which the focus detection pixels are reset in response to the control signal ØRa, the length of charge storage time at the focus detection pixels 312 and 313 can be controlled.

The electrical charge storage time Tx (exposure time) at the focus detection pixels 312 and 313 elapses between the time at which the reset of the focus detection pixels 312 and 313 by the control signal ØRa becomes ended and the time at which the next image signals become held (by the control signals ØSa and ØH). In the example presented in FIG. 24, the image signals are read out from the focus detection pixels 312 and 313 over a cycle twice the image signal read cycle of the image-capturing pixels 310.

In this operation mode, the image signals are cyclically read out from the image-capturing pixels 310 and a blank period is included in the image signal read sequence through which the image signals are cyclically read from the image-capturing pixels 310 so as to read out the image signals from the focus detection pixels 312 and 313 as necessary during the blank period.

Figure 25:
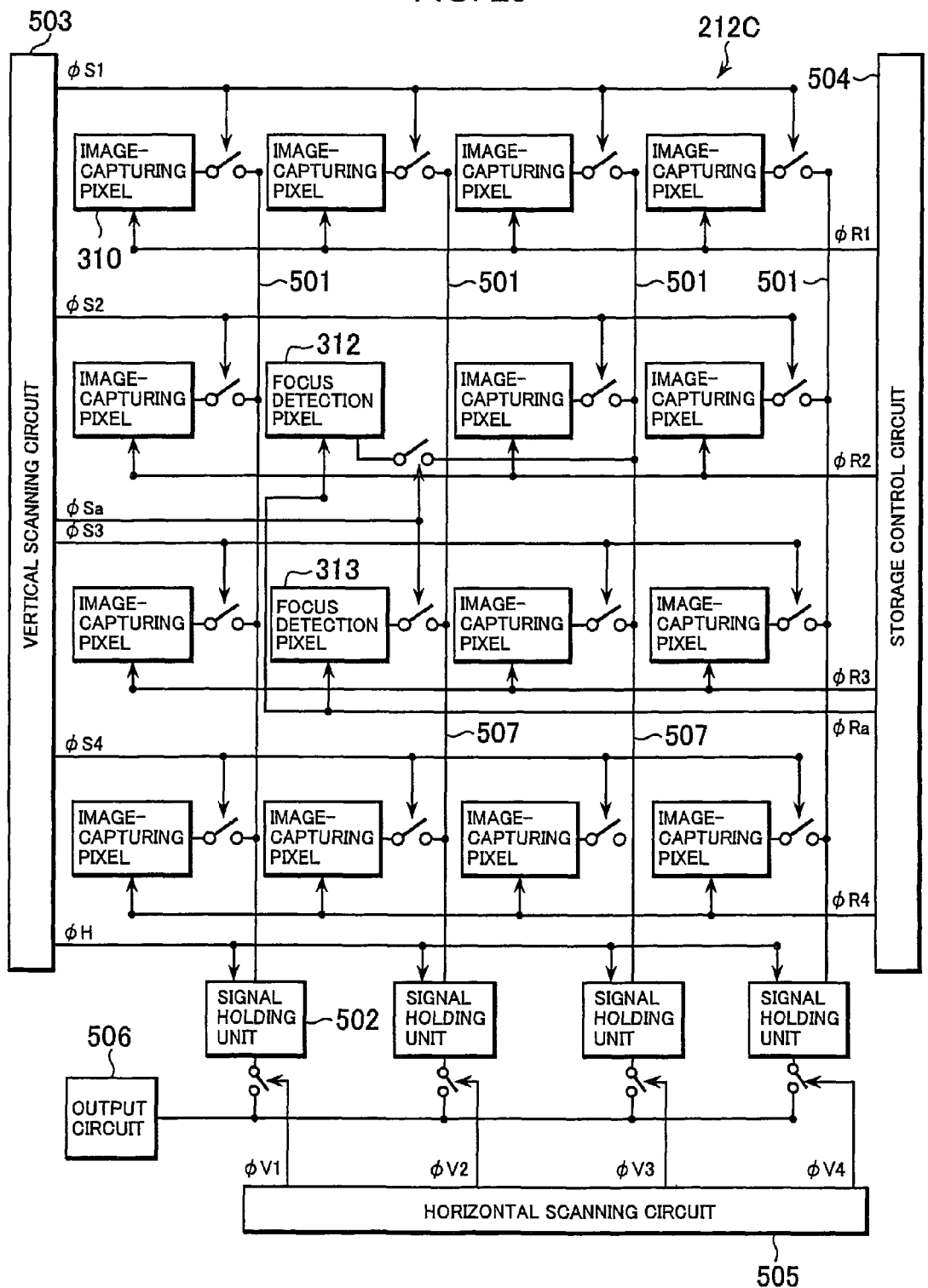
FIG. 25 is a conceptual diagram of the circuit structure of an image sensor achieved in a variation.

FIG. 25 is a conceptual diagram showing the circuit structure adopted in an image sensor 212C achieved in a variation. In FIG. 25, the same reference numerals are assigned to elements similar to those shown in FIG. 18 and their explanation is omitted. While the focus detection pixels 312 and 313 are disposed side-by-side in a given row at the image sensor 212B in FIG. 23, the focus detection pixels 312 and 313 are set side by side in a given column (occupying the second row/second column position and the third row/second column position) in the image sensor 212C in FIG. 25. In other words, the pixels assume a positional arrangement obtained by rotating the pixel positional arrangement at the image sensor 212 in FIG. 3 by 90°. A common control signal ØRa is provided for the focus detection pixels 312 and 313 disposed side-by-side in the same column. The outputs from the focus detection pixels 312 and 313 are respectively connected to the third column and the second column output lines 501. In conjunction with this circuit structure, a focus detection area extending along the columnar direction can be set to execute operation through an operational flow similar to the operational flow shown in FIG. 24.

Figure 26:
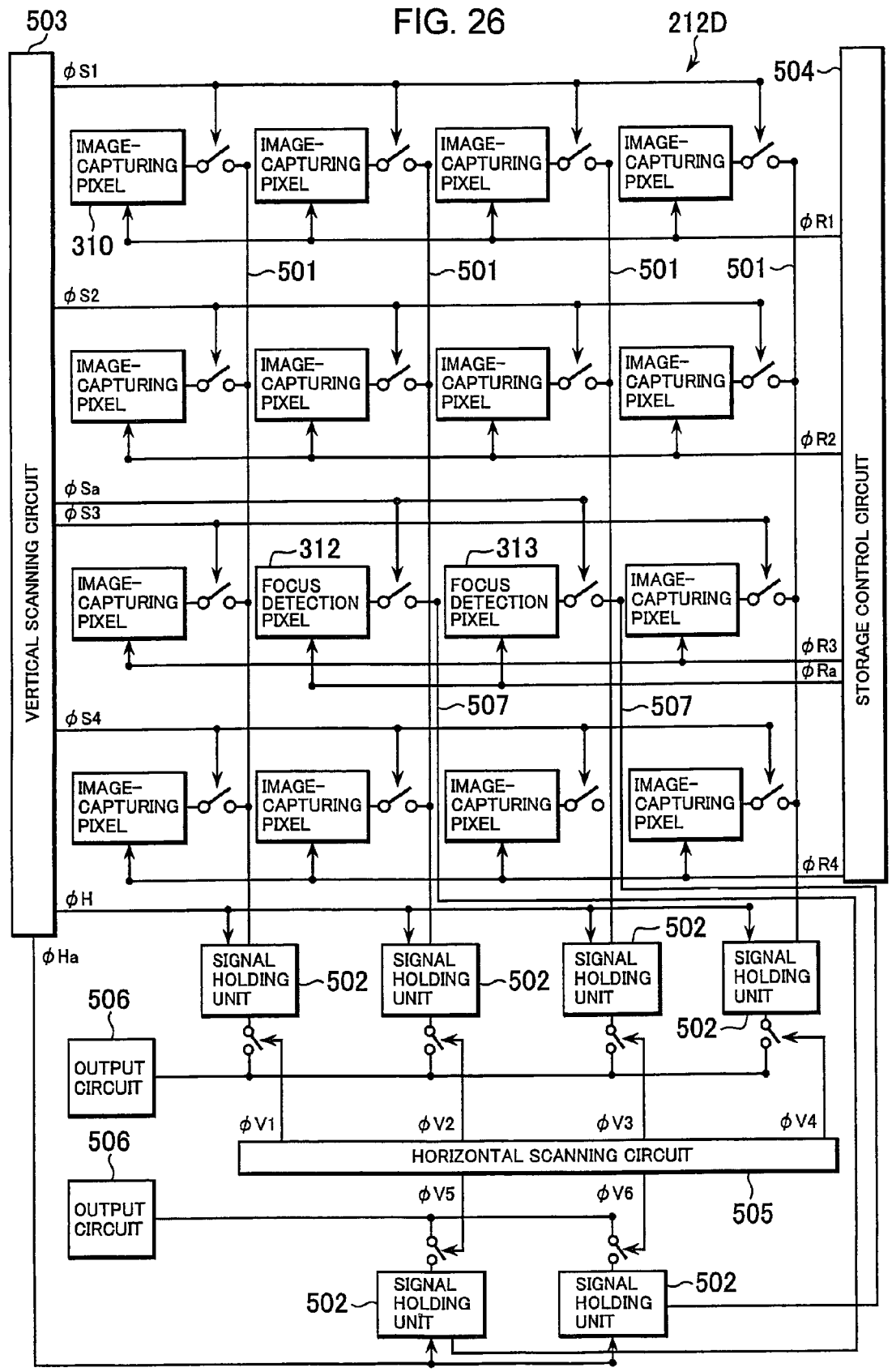
FIG. 26 is a conceptual diagram of the circuit structure of an image sensor in the variation.

FIG. 26 is a conceptual diagram showing the circuit structure adopted in an image sensor 212D achieved in a variation. In FIG. 26, the same reference numerals are assigned to elements similar to those shown in FIG. 18 and their explanation is omitted. While the signal holding units 502 and the output circuit 506 are shared by the image-capturing pixels 310 and the focus detection pixels 312 and 313 in the image sensor 212B shown in FIG. 23, the image sensor 212D in FIG. 26 includes an additional set of signal holding units 502 and an output circuit 506 to be exclusively used in conjunction with the focus detection pixels.

This structure eliminates the need to read out the image signals from the focus detection pixels 312 and 313 in synchronization with the image signal read cycle over which the image signals at the image-capturing pixels 310 are read out and thus, the electrical charge storage and the image signal read operation at the focus detection pixels 312 and 313 can be executed completely independently of the charge storage and the image signal read operation executed at the image-capturing pixels 310. The output of the image signals from the focus detection pixels 312 and 313 is controlled by using the control signal ØSa generated by the vertical scanning circuit 503.

The signal holding units 502 used exclusively in conjunction with the focus detection pixels function as buffers for temporarily holding the image signals from the focus detection pixels 312 and 313 by latching the image signals output to vertical signal lines 507 provided to be exclusively used in conjunction with the focus detection pixels, in response to a control signal ØHa generated by the vertical scanning circuit 503. The image signals held in the signal holding units 502 exclusive to the focus detection pixels are transferred sequentially to the output circuit 506 exclusive to the focus detection pixels in response to a control signal ØV5 and a control signal ØV6 generated by the horizontal scanning circuit 505, are amplified to the preset degree at the output circuit 506 and are output to the outside. The electrical charge storage at the focus detection pixels 312 and 313 is controlled based upon the control signal ØRa generated by the storage control circuit 504.

Figure 27:
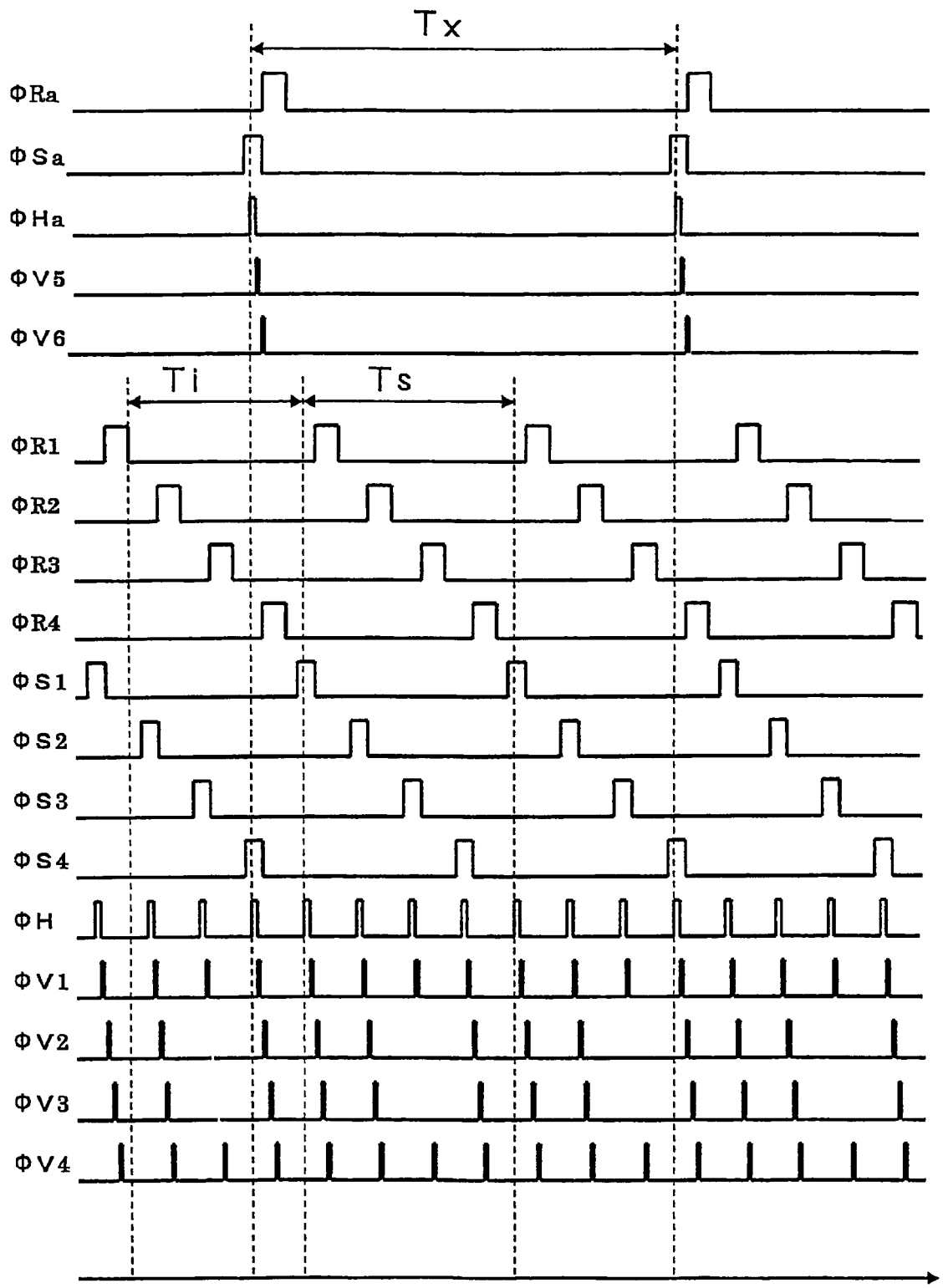
FIG. 27 is an operation timing chart pertaining to the image sensor in the variation shown in FIG. 26.

FIG. 27 presents a timing chart of the operation executed in the image sensor 212D shown in FIG. 26. While the image-capturing pixels 310 operates with operation timing similar to that shown in FIG. 24, the operational flow in FIG. 26 does not include any blank period between the time point at which the image signal output from the image-capturing pixels 310 in the fourth row ends and the time point at which the image signal output from the image-capturing pixels 310 in the first row starts.

The special control signals ØRa and ØSa, provided exclusively for the focus detection pixels 312 and 313 separately from the control signals ØR3 and ØS3 used to control the image-capturing pixels 310 in the third row are generated completely independently of the control signals for the image-capturing pixels 310. The focus detection pixels 312 and 313 are selected by the control signal ØSa generated by the vertical scanning circuit 503, and the image signals from the focus detection pixels 312 and 313 having been selected are output to the exclusive vertical signal lines 507.

Based upon the control signal ØHa generated by the vertical scanning circuit 503 in synchronization with the control signal ØSa, the image signals output from the focus detection pixels 312 and 313 to the vertical signal lines 507 are temporarily held at the signal holding units 502 exclusive to the focus detection pixels. The image signals from the focus detection pixels 312 and 313 held at the signal holding units 502 exclusive to the focus detection pixels are then transferred to the output circuit 506 exclusive to the focus detection pixels in conformance to the control signals ØV5 and ØV6 generated in sequence from the horizontal scanning circuit 505, are amplified to the preset degree at the output circuit 506 and are output to the outside.

As the transfer of the image signals at the focus detection pixels 312 and 313 to the signal holding units 502 ends, the focus detection pixels 312 and 313 in the third row are reset in response to the control signal ØRa generated by the storage control circuit 504 and the subsequent charge storage starts at the focus detection pixels 312 and 313. By adjusting the length of the reset period (the L period) during which the focus detection pixels are reset in response to the control signal ØRa, the length of charge storage time at the focus detection pixels 312 and 313 can be controlled.

The electrical charge storage time Tx (exposure time) at the focus detection pixels 312 and 313 elapses between the time at which the reset of the focus detection pixels 312 and 313 by the control signal ØRa becomes ended and the time at which the next image signals become held (by the control signals ØSa and ØHa). In the operation mode described above, the image signals are cyclically readout from the image-capturing pixels 310 and the electrical storage and the image signal read operation at the focus detection pixels 312 and 313 are executed completely independently of the image signal read cycle at the image-capturing pixels.

Figure 28:
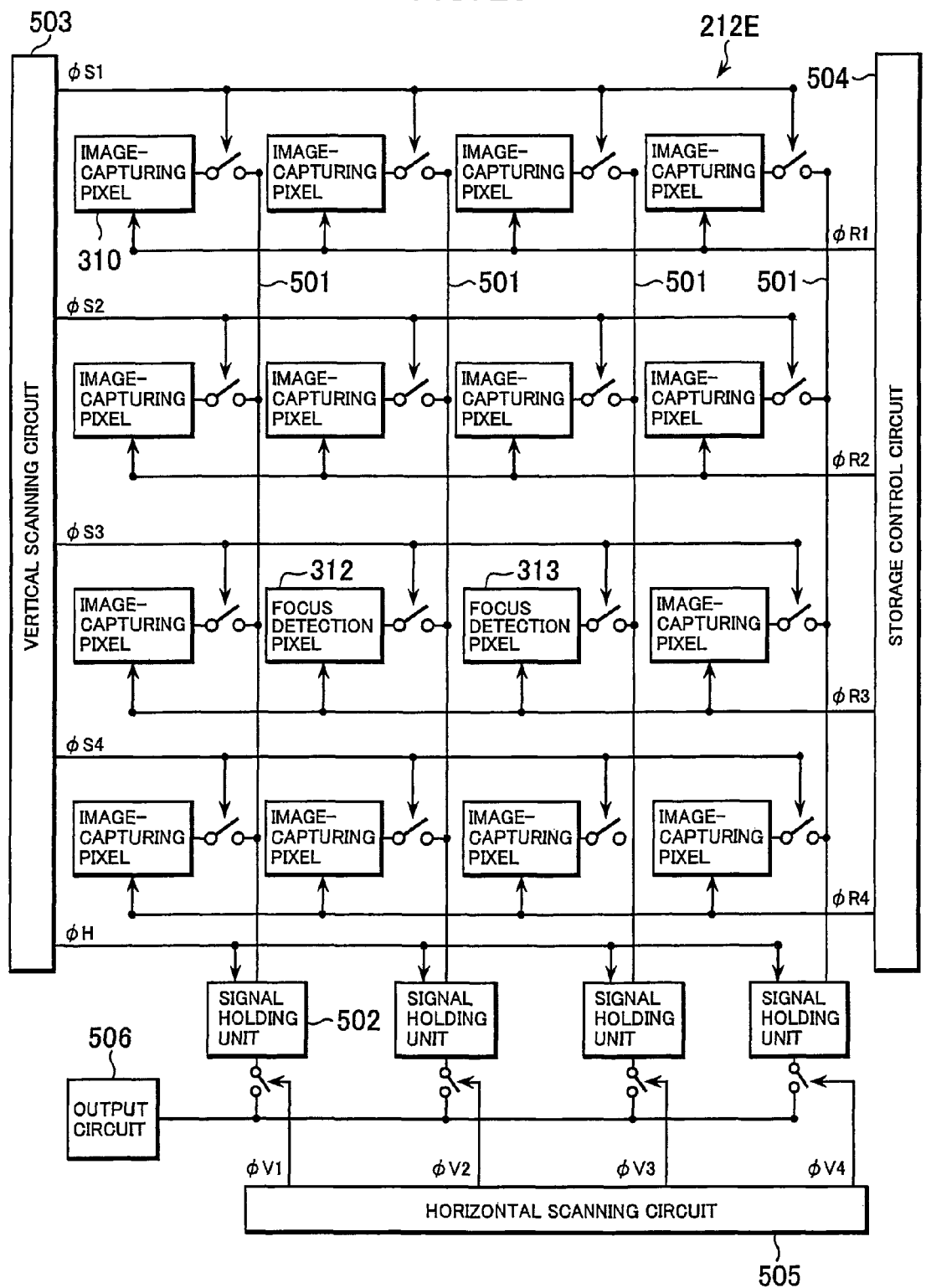
FIG. 28 is a conceptual diagram of the circuit structure of an image sensor achieved in a variation.

FIG. 28 is a conceptual diagram showing the circuit structure adopted in an image sensor 212E achieved in a variation. In FIG. 28, the same reference numerals are assigned to elements similar to those shown in FIG. 18 and their explanation is omitted. In the image sensor 212 shown in FIG. 18, the reset MOS transistors for the focus detection pixels 312 and 313 and the image-capturing pixels 310 in the third row are controlled by different control signals, i.e., the control signals ØRa and ØR3 respectively. In the image sensor 212E shown in FIG. 28, on the other hand, the reset MOS transistors for the focus detection pixels 312 and 313 are also controlled by the control signal ØR3 used to control the reset MOS transistors for the image-capturing pixels 310. By using the common control signal to control the reset MOS transistors for the focus detection pixels 312 and 313 and the image-capturing pixels 310, the wiring at the image sensor 212E is simplified to achieve a simpler circuit structure and allow the photoelectric conversion portions to take up a greater area.

The focus detection pixels 312 and 313 in the image sensor structured as described above are exposed over a charge storage time during which electrical charges are also stored at the image-capturing pixels 310 and the image signals at the focus detection pixels are read out with read timing matching and over a read cycle matching the timing and the read cycle over which the image signals at the image-capturing pixels 310 are read out. The signal level of the image signals thus read out from the focus detection pixels 312 and 313 may not be high enough to enable optimal focus detection calculation and accordingly, the body CPU 214d (see FIG. 14) adds up a plurality of sets of image data from the focus detection pixels 312 and 313 by reading them out from the internal memory 214c and executes focus detection calculation based upon the sum of the outputs. The data used for the focus detection calculation can be updated each time the image data are updated by adding up the plurality of sets of most recent data (e.g., two set of the current set of image data and the preceding set of image data) so as to shorten the focus detection calculation cycle to match the image signal read cycle at the image-capturing pixels.

In addition, the body CPU 214d (see FIG. 14) may provide the image sensor drive control circuit 214a with amplification degree information to control the degree to which image signals are amplified at the output circuit 506 in the image sensor. In this case, the degree of amplification for the image signals from the focus detection pixels 312 and 313 may be adjusted so that they are amplified to a greater degree at the output circuit relative to the degree of amplification for the image signals from the image-capturing pixels 310, thereby ensuring that the level of the image signals from the focus detection pixels 312 and 313 obtained through a single electrical charge storage is high enough to enable optimal focus detection calculation.

Figure 29:
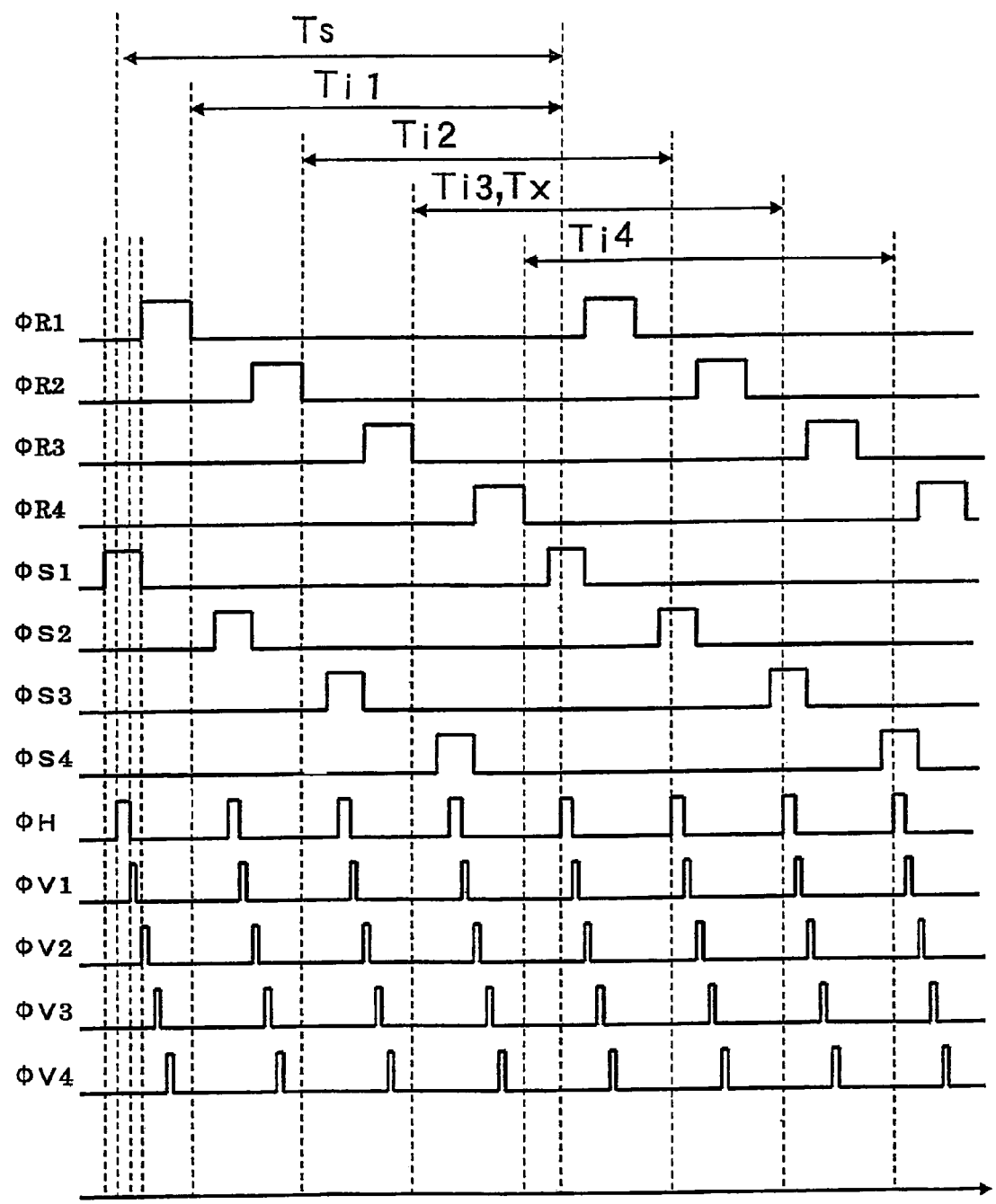
FIG. 29 is an operation timing chart pertaining to the image sensor in a variation shown in FIG. 28.

FIG. 29 presents a timing chart of the operation executed in the image sensor 212E shown in FIG. 28. Except that the focus detection pixels are reset in response to the control signal ØR3 instead of the control signal ØRa in this operation timing chart, the operation is executed with operation timing similar to that shown in the operation timing chart presented in FIG. 20. While the lengths of the charge storage time Ti1, Ti2, Ti3 and Ti4 at the image-capturing pixels in the first row, the second row, the third row and the fourth row and the length of electrical charge storage time Tx at the focus detection pixels are all equal, timing with which the electrical charges are stored is sequentially offset for the first row, the second row, the third row and the fourth row (rolling shutter). The read cycle Ts with which the image signals are read out from the image-capturing pixels remains constant and is equal to the length of time representing the sum of the charge storage time and the length of time required to read out the image signals in a given row.

Figure 30:
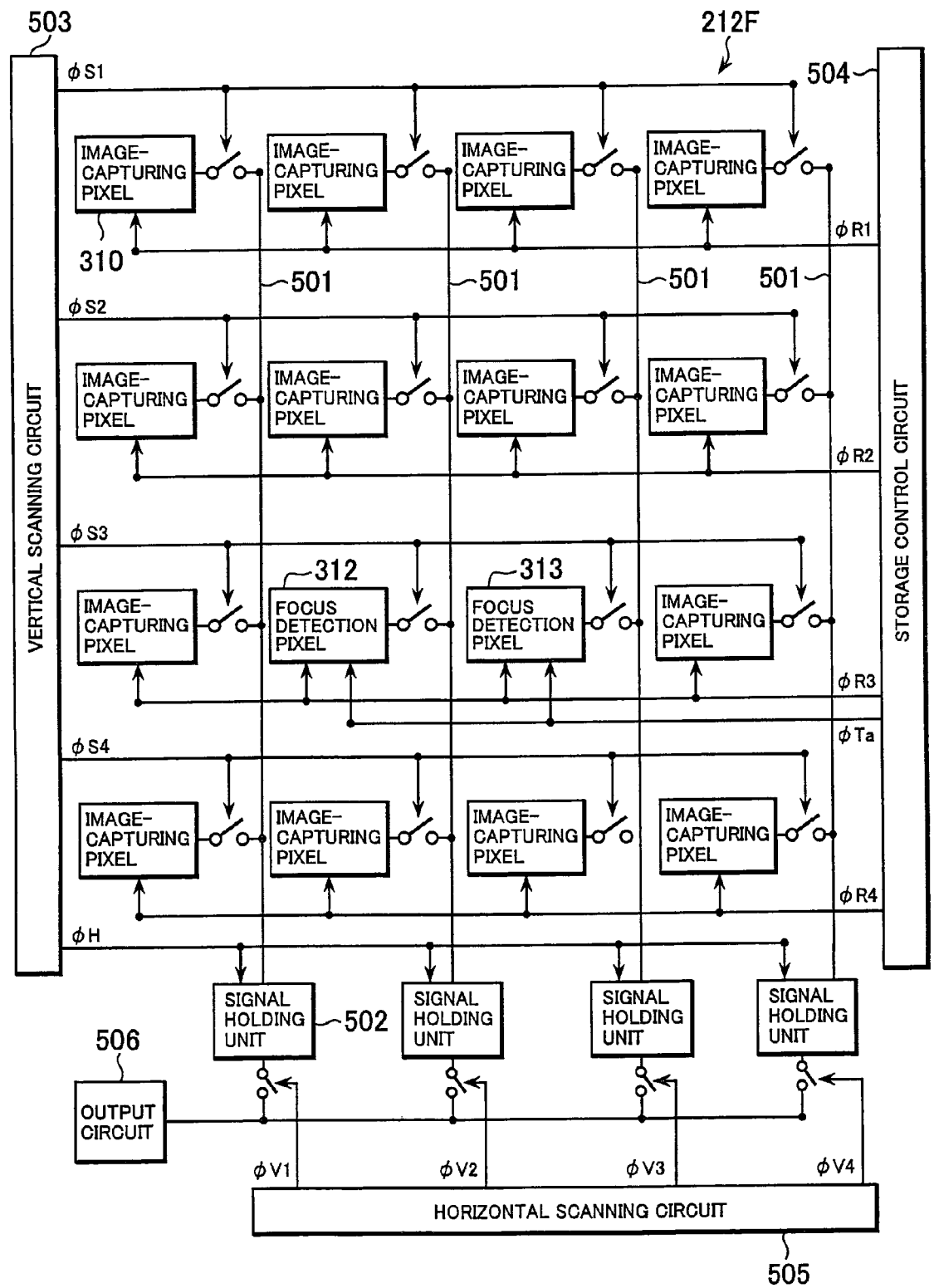
FIG. 30 is a conceptual diagram of the circuit structure of an image sensor achieved in a variation.

FIG. 30 is a conceptual diagram showing the circuit structure adopted in an image sensor 212F achieved in a variation. In FIG. 30, the same reference numerals are assigned to elements similar to those shown in FIG. 18 and their explanation is omitted. In the image sensor 212 shown in FIG. 18, a reset operation for the focus detection pixels 312 and 313 is controlled by using the exclusive control signal ØRa. In the image sensor 212F in the variation shown in FIG. 30, the reset operation for the focus detection pixels 312 and 313 is controlled by using the common control signal ØR3 also used to control the reset operation for the image-capturing pixels 310 and the timing with which the charge storage at the focus detection pixels 312 and 313 ends is controlled based upon a control signal ØTa. This structure allows the charge storage timing for the focus detection pixels 312 and 313 to be controlled independently of the charge storage timing for the image-capturing pixels 310 and ultimately allows the charge storage time at the focus detection pixels 312 and 313 to be controlled independently of the charge storage time at the image-capturing pixels 310.

Figure 31:
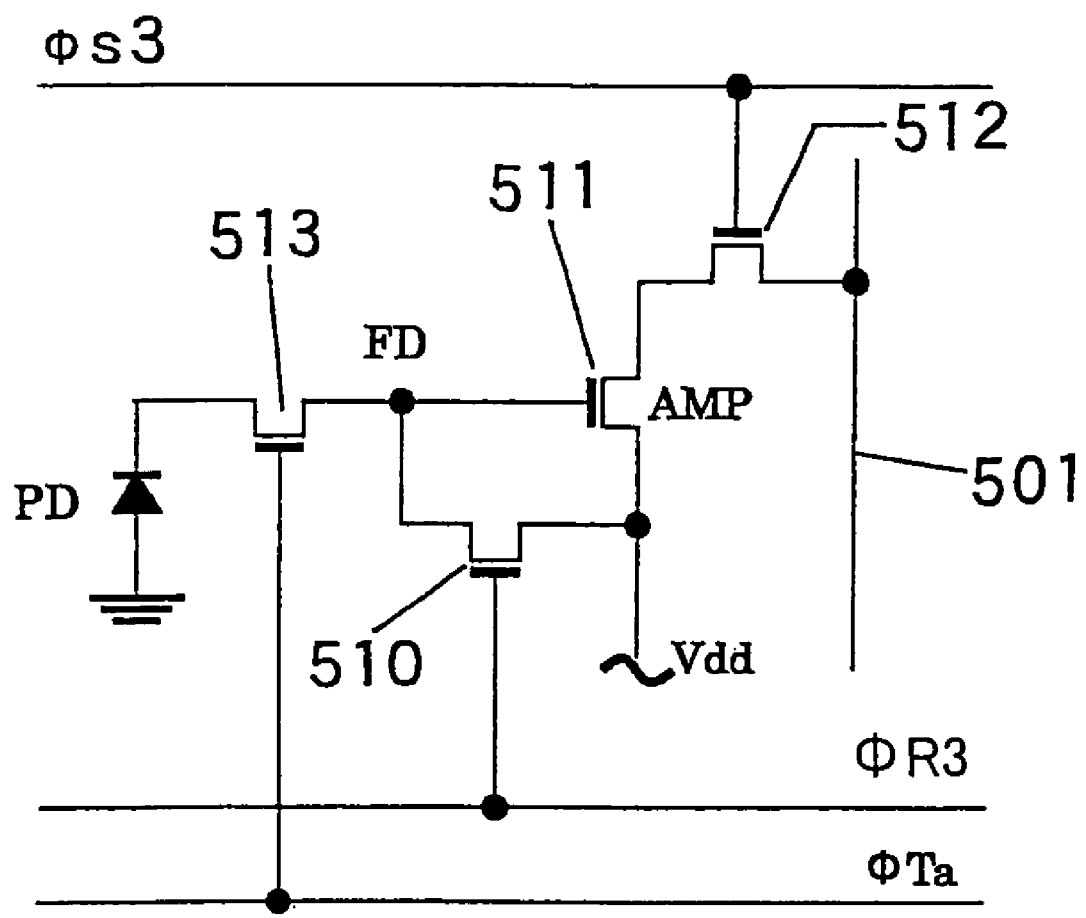
FIG. 31 is a detailed circuit diagram pertaining to the focus detection pixels shown in FIG. 30.

FIG. 31 is a detailed circuit diagram showing the circuit structure adopted in the focus detection pixels 312 and 313 in FIG. 30. It is to be noted that the same reference numerals are assigned to elements similar to those shown in FIG. 19 and their explanation is omitted. While the circuit structure is basically similar to that shown in FIG. 19, it differs from the circuit in FIG. 19 in that a transfer MOS transistor 513 is disposed between the PD and the FD and that the electrical charge stored in the PD is transferred to the FD as the transfer MOS transistor 513 is turned on by the control signal ØTa.

Figure 32:
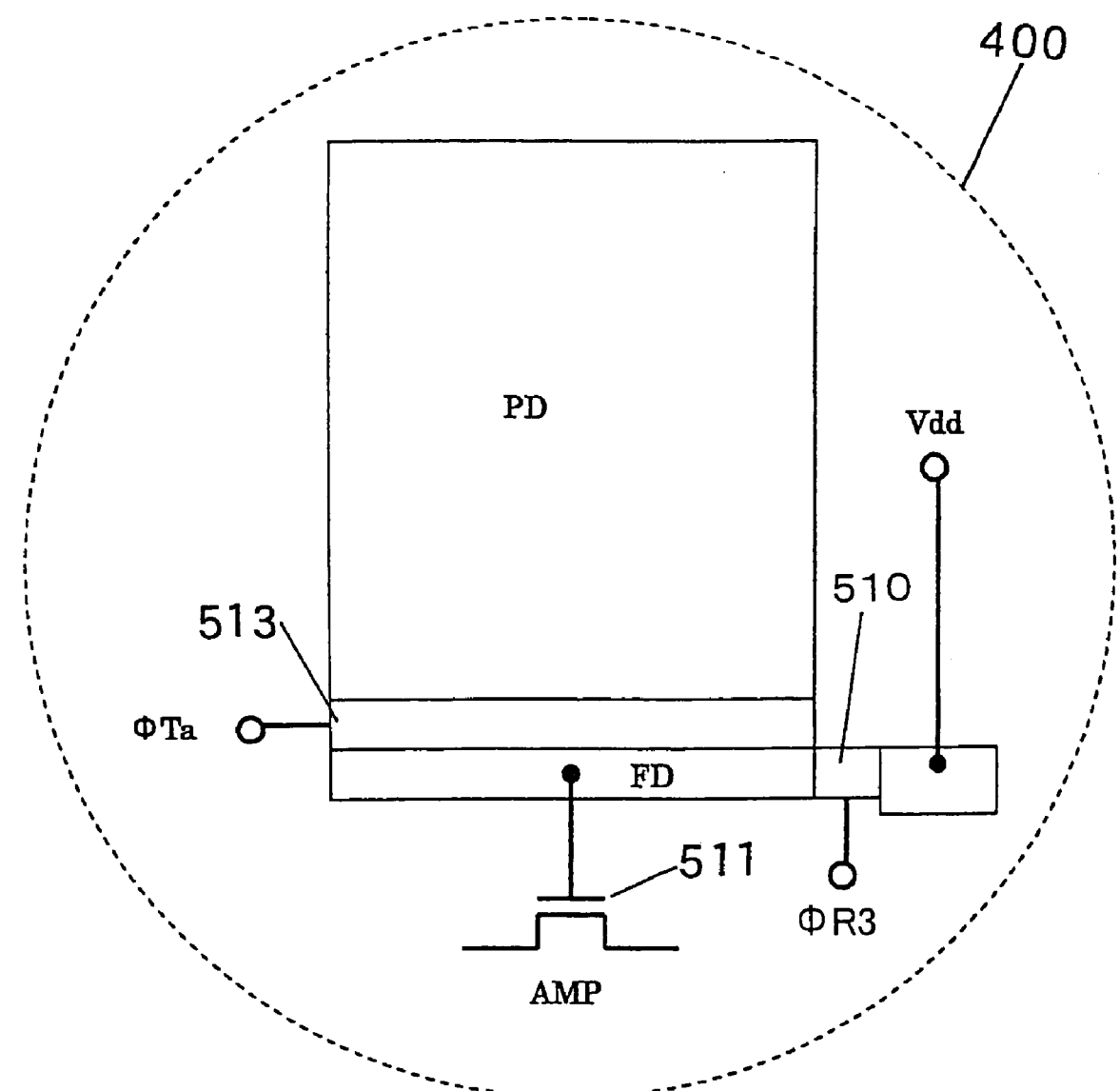
FIG. 32 shows the positional arrangement assumed for the focus detection pixels 312 and 313 in FIG. 30, viewed from the micro lens side.

FIG. 32 shows the positional arrangement assumed in the focus detection pixels 312 and 313 in FIG. 30, in a view taken from the micro-lens side. The photodiode PD is disposed under a micro-lens 400. The transfer MOS transistor 513 is installed in order to transfer the electrical charge at the PD, and the operation of the transfer MOS transistor 513 is controlled by the control signal ØTa. The charge transferred from the PD by the transfer MOS transistor 513 is received at the floating diffusion portion FD.

The FD is connected to the gate of the amplifier MOS transistor (AMP), which outputs a signal indicating a level corresponding to the quantity of the electrical charge having been received at the FD. The FD is connected via the reset MOS transistor 510 to the source voltage Vdd and thus, the electrical charge received at the FD is discharged as the reset MOS transistor 510 enters an ON state and the potential at the FD is reset to the source voltage Vdd.

The PD is reset to the source voltage Vdd by turning on the reset MOS transistor 510 and the transfer MOS transistor 513 at the same time with the control signals ØR3 and ØTa.

Figure 33:
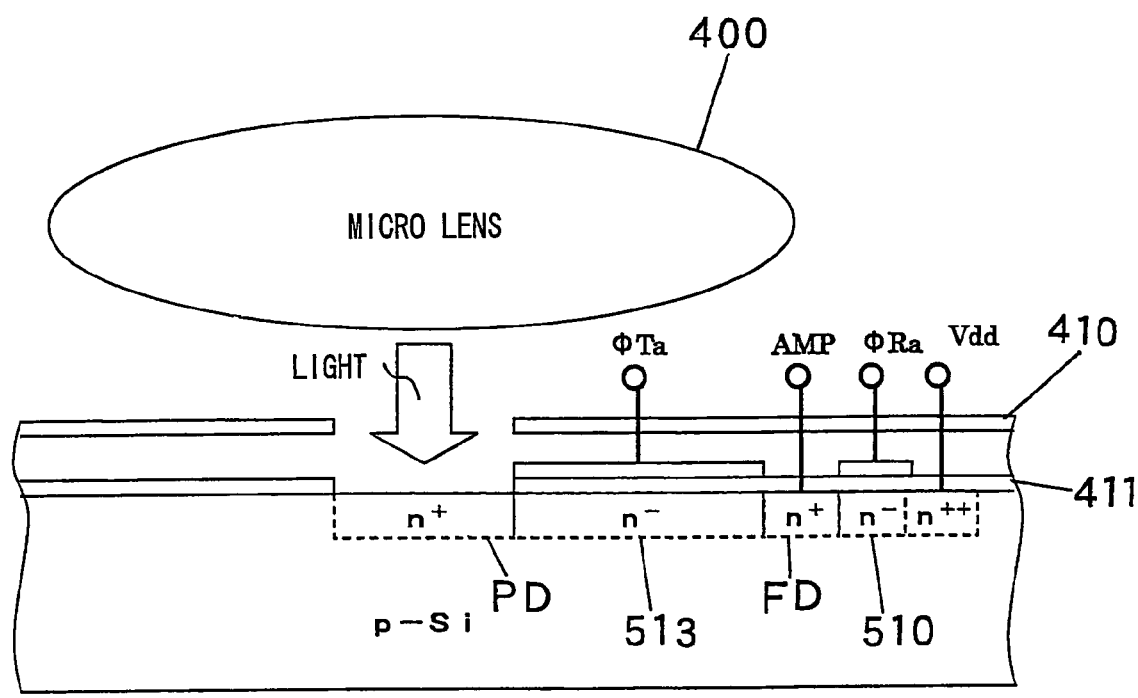
FIG. 33 shows the structure of the focus detection pixels in FIG. 30 in a sectional view through the PD and the FD.

FIG. 33 shows the structure assumed in the focus detection pixels 312 and 313 in FIG. 30 in a sectional view taken through the PD and the FD. The focus detection pixels 312 and 313 are each constituted with the micro-lens 400, an aluminum shielding film 410, wiring and electrodes, an insulating layer 411 (silicon oxide film) and a silicon semiconductor substrate (P-type silicon), disposed in this order starting on the light entry side. Rays of light condensed at the micro-lens 400 pass through openings formed at the light shielding film 410 and the insulating layer 411 to enter the semiconductor substrate. An n+ area formed at the surface of the semiconductor where the light enters constitutes the photodiode PD.

An n– area is formed adjacent to the PD and this n– area, together with an electrode, disposed on the other side of the insulating layer 411 to which the control signal ØTa is applied, constitutes the transfer MOS transistor 513. Adjacent to the n– area constituting the transfer MOS transistor 513, an n+ area, which constitutes the floating diffusion FD, is formed. The FD is connected to the gate of the AMP. Adjacent to the FD, an n– area is formed and this n– area, together with an electrode disposed on the other side of the insulating layer 411, to which the control signal ØR3 is applied, constitutes the reset MOS transistor 510. An n++ area is formed adjacent to the n– area constituting the reset MOS transistor 510, and the source voltage Vdd is connected to this n++ area.

Figure 34:
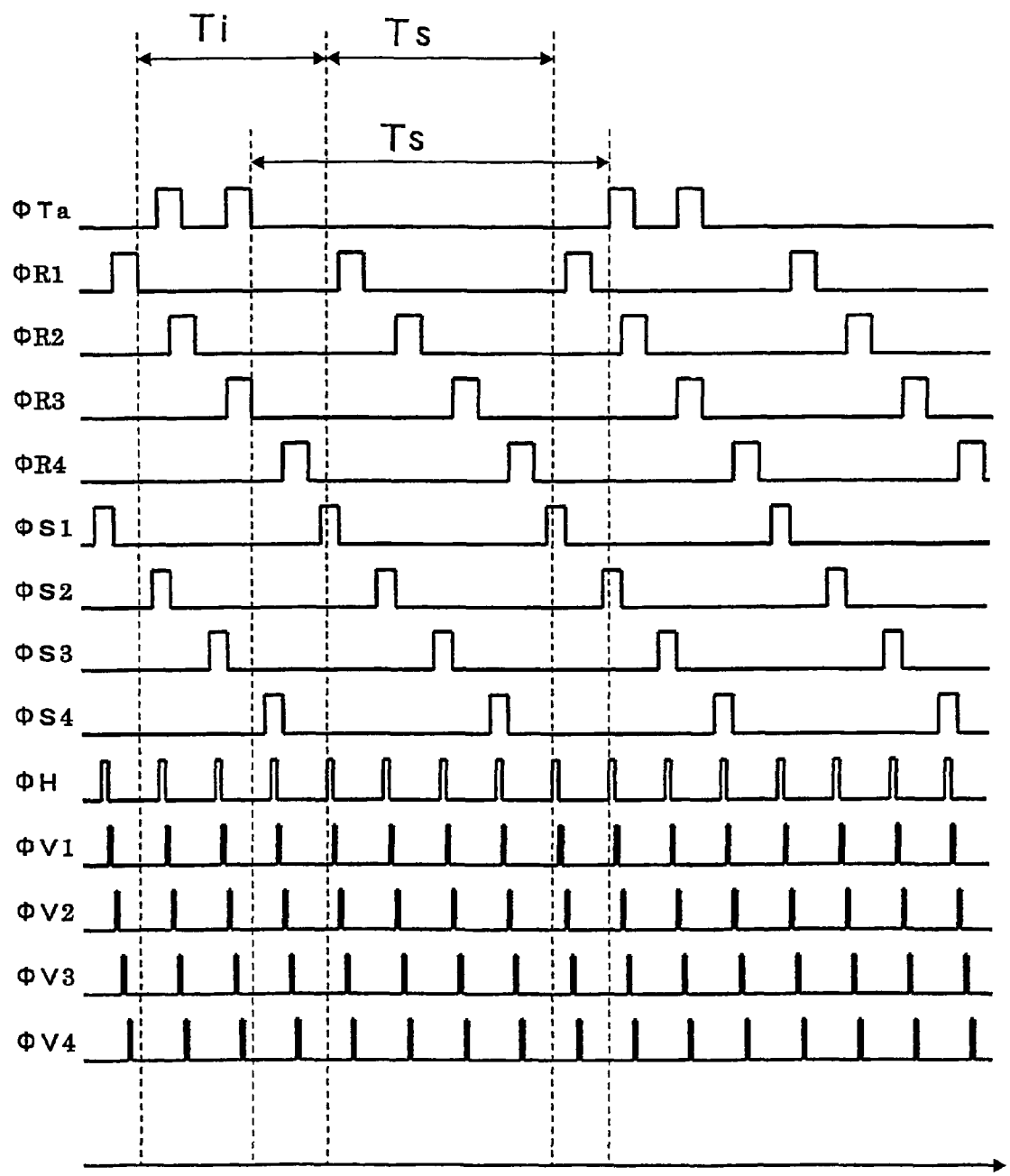
FIG. 34 is an operation timing chart pertaining to the image sensor in the variation shown in FIG. 30.

FIG. 34 is a timing chart of the operation executed in the image sensor 212F achieved in the variation shown in FIG. 30. The operation timing shown in FIG. 34 differs from that shown in FIG. 20 with regard to the operation of the focus detection pixels. The electrical charge storage at the focus detection pixels 312 and 313 ends with desired charge storage end timing in response to the control signal ØTa generated by the storage control circuit 504 before the control signal ØS3 used to select the image-capturing pixels 310 and the focus detection pixels 312 and 313 in the third row is generated. The electrical charges having been stored in the PDs at the focus detection pixels 312 and 313 are then transferred to the respective FDs.

As the third row is selected by the control circuit ØS3, the image signals at the image-capturing pixels 310 and the focus detection pixels 312 and 313 in the third row are output to the vertical signal lines 501. Based upon the control signal ØH generated in synchronization with the control signal ØS3, the image signals output from the focus detection pixels 312 and 313 to the vertical signal lines 501 are temporarily held at the signal holding units 502. The image signals from the focus detection pixels 312 and 313 held at the signal holding units 502 are then transferred to the output circuit 506 in conformance to the control signals ØV1~ØV4 generated in sequence from the horizontal scanning circuit 505, are amplified to the preset degree at the output circuit 506 and are output to the outside.

As the transfer of the image signals at the image-capturing pixels 310 and the focus detection pixels 312 and 313 in the third row to the signal holding units 502 ends, the image-capturing pixels 310 in the third row are reset in response to the control signal ØR3 generated by the storage control circuit 504 and, at the same time, the focus detection pixels 312 and 313 are reset in response to the control signal ØR3 and the control signal ØTa generated with the same timing as the control signal ØR3, thereby starting the next electrical charge storage. It is to be noted that the control signal ØTa is not always generated with the same timing as the control signal ØR3 and that as the control signal ØTa is generated at a rate of once per multiple outputs of the control signal ØR3, the charge storage time at the focus detection pixels is extended.

The charge storage time Tx (exposure time) at the focus detection pixels 312 and 313 extends over the length of time elapsing between the time point at which the focus detection pixels are reset in response to the control signal ØTa generated in synchronization with the control signal ØR3 and the time point at which the electrical charge storage ends in response to the control signal ØTa generated independently of the control signal ØR3.

Figure 35:
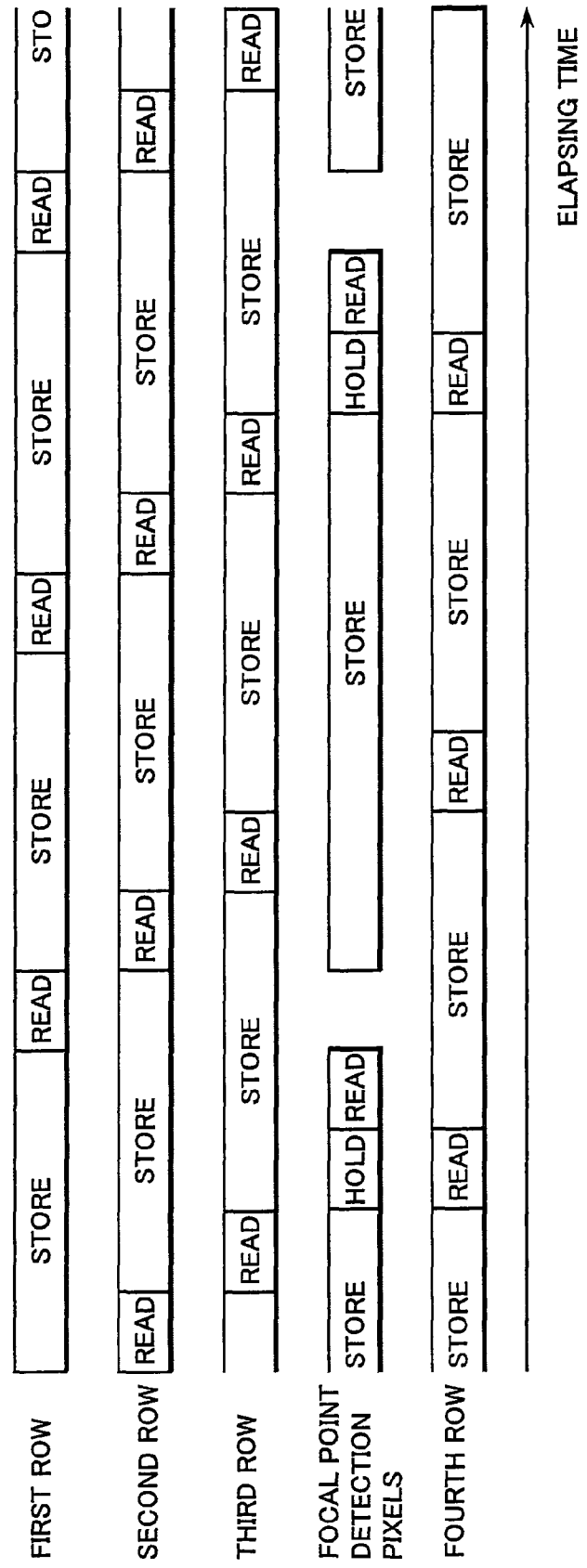
FIG. 35 is a conceptual diagram of the flow of operations executed at an image sensor achieved in a variation.

FIG. 35 is a conceptual diagram of the flow of the operation executed in an image sensor achieved in a variation. In the operational flow shown in the conceptual diagram in FIG. 22, the image signals at the focus detection pixels are read out during the blank period in which no image signals at the image-capturing pixels are read out. In this case, the charge storage ends with the timing matching the timing with which the signal holding units latch the image signals and for this reason, the charge storage end timing cannot easily be controlled.

Accordingly, in the operational flow shown in the conceptual diagram in FIG. 35, the charge storage end at the focus detection pixels and the image signal output are allowed to occur independently of each other in time, the electrical charges having been stored up to the charge storage end point are temporarily held within the pixels and signals corresponding to the quantities of stored charges held in the pixels are read out as the image signals. The basic operation executed in this operational flow is similar to the operation executed in the operational flow shown in FIG. 22, but it is different in that the stored charge holding operation is executed during the time elapsing between the charge storage and the image signal read at the focus detection pixels.

By engaging the image sensor in operation through this operational sequence, the charge storage end timing with which the charge storage at the focus detection pixels ends can be set independently of and separately from the image signal read timing. As a result, the charge storage can be executed at the focus detection pixels in a plurality of focus detection areas with matching timing (at a matching time point corresponding to the midpoint of the charge storage time) so as to assure simultaneity in the focus detection executed for a moving subject.

Figure 36:
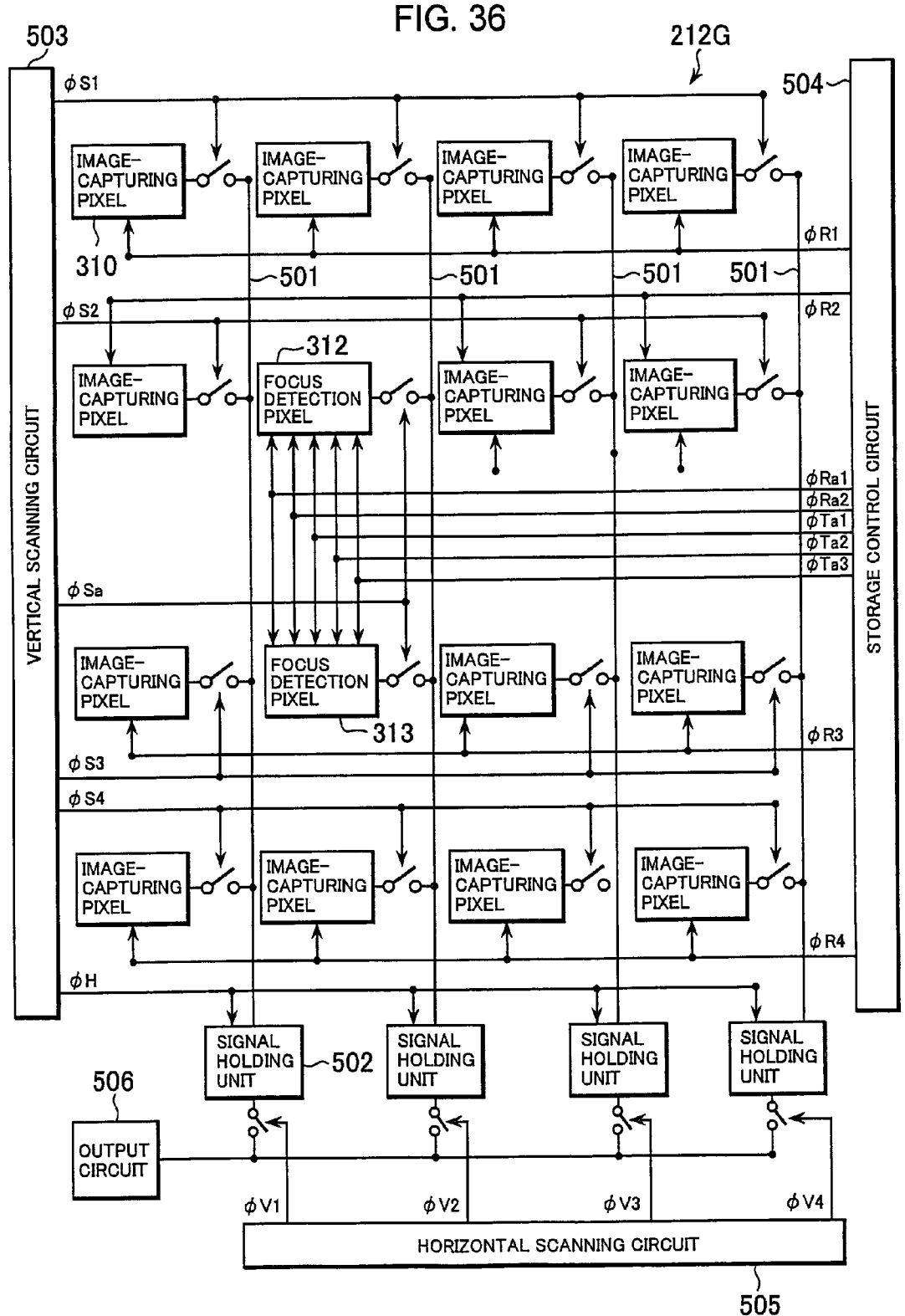
FIG. 36 is a conceptual diagram of the circuit structure of an image sensor achieved in a variation.

FIG. 36 is a conceptual diagram showing the circuit structure adopted in an image sensor 212G achieved in a variation. In FIG. 36, the same reference numerals are assigned to elements similar to those shown in FIG. 18 and their explanation is omitted. In the image sensor 212F shown in FIG. 30, the row selector MOS transistors for the focus detection pixels 312 and 313 and the image-capturing pixels 310 are controlled by the common control signal ØS3. In the image sensor 212G shown in FIG. 36, the row selector MOS transistors for the focus detection pixels 312 and 313 are controlled by a special control signal ØSa exclusive to the focus detection pixels and the control signal ØTa is divided into control signals ØTa1, ØTa2 and ØTa3. In addition, control signals ØRa1 and ØRa2 are provided to be exclusively used to reset the focus detection pixels 312 and 313 respectively.

This structure allows the image signals at the focus detection pixels 312 and 313 to be read out independently of the image signals at the image-capturing pixels 310 in the third row and, at the same time, the timing with which the electrical charge storage at the focus detection pixels 312 and 313 starts and ends can be controlled independently of the charge storage start/end timing for the image-capturing pixels.

Figure 37:
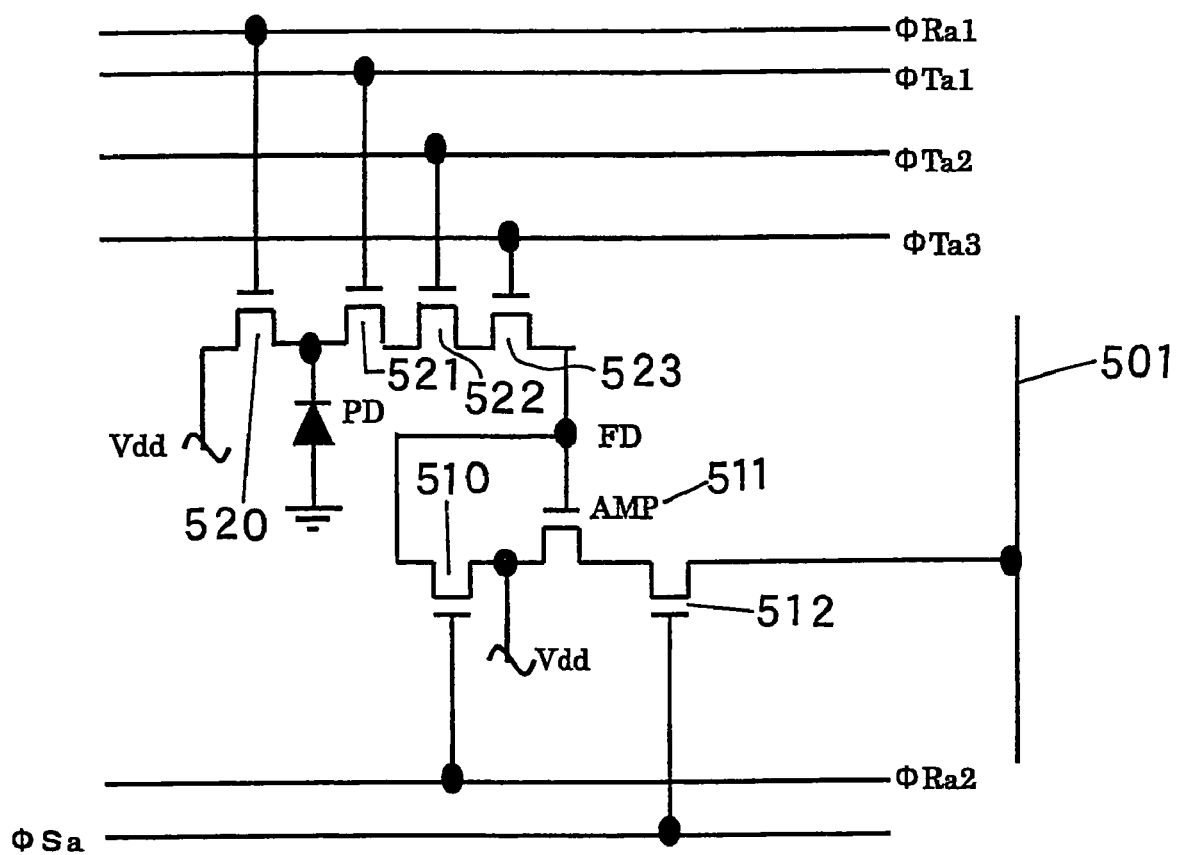
FIG. 37 is a detailed circuit diagram pertaining to the focus detection pixels shown in FIG. 36.

FIG. 37 is a detailed circuit diagram showing the circuit structure adopted in the focus detection pixels 312 and 313 in FIG. 36. It is to be noted that the same reference numerals are assigned to elements similar to those shown in FIG. 19 and their explanation is omitted. While the circuit adopts a structure basically similar to that shown in FIG. 19, it differs from the circuit structure in FIG. 19 in the following aspects. The control signal ØSa used to select the focus detection pixels 312 and 313 is connected to the gate of the row selector MOS transistors 512 at each pixel. In addition, a reset MOS transistor 520 used exclusively to reset the PD is provided.

In addition, the signal ØR3 used to reset the focus detection pixels 312 and 313 is divided into the control signal ØRa2 used to reset the FDs and the control signal ØRa1 used to reset the PDs and these signals are respectively provided to the gates of the reset MOS transistors 520 and 510. The focus detection pixels are each equipped with a transfer MOS transistor 521, a hold MOS transistor 522 and a transfer MOS transistor 523, disposed in this order between the PD and the FD, with the control signals ØTa1, ØTa2 and ØT3 provided to the gates of the respective MOS transistors.

Figure 38:
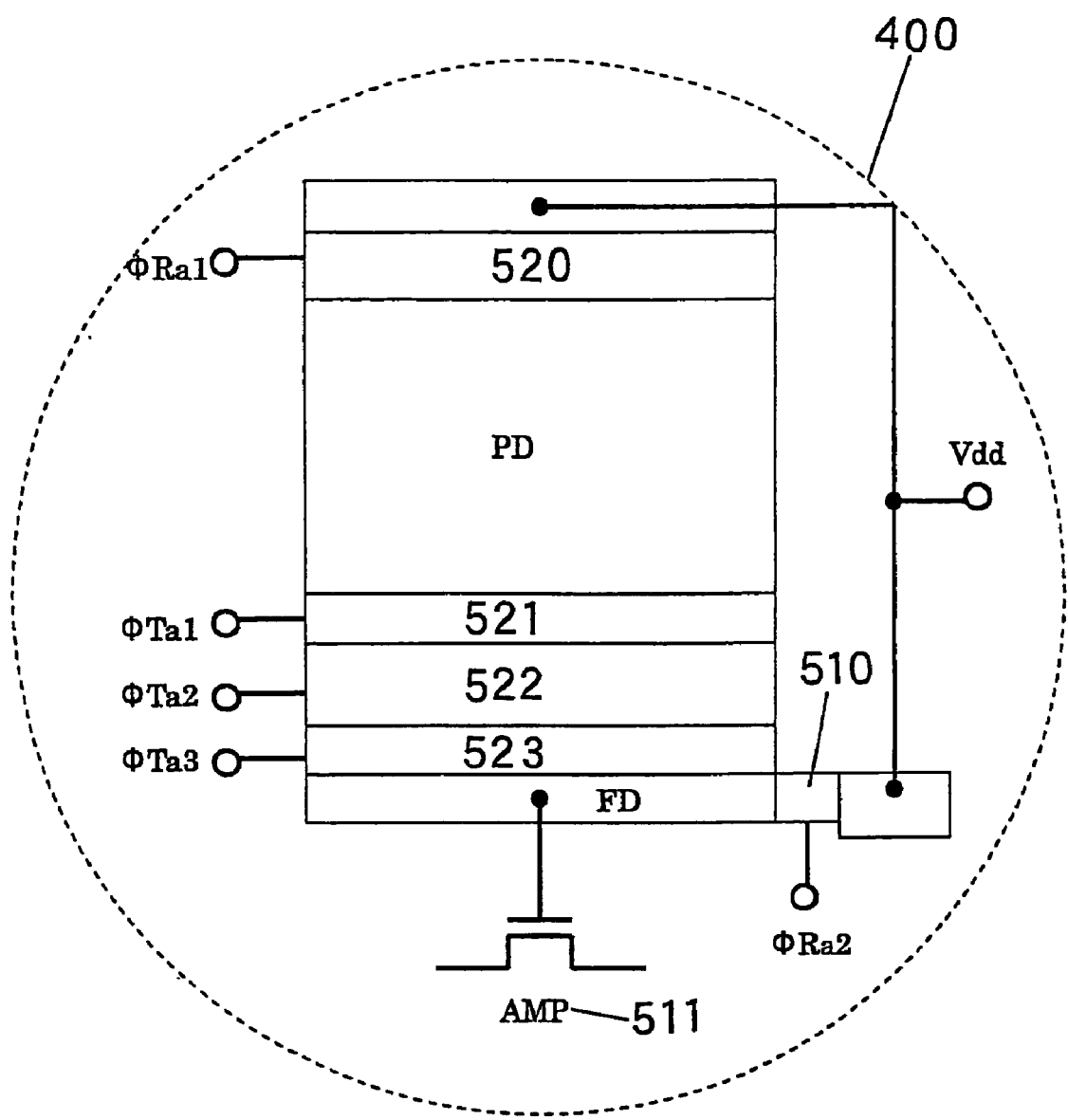
FIG. 38 shows the positional arrangement assumed for the focus detection pixels in FIG. 36, viewed from the micro lens side.

FIG. 38 shows the positional arrangement assumed in the focus detection pixels in FIG. 36, in a view taken from the micro-lens side. The photodiode PD is disposed under the micro-lens 400. In order to discharge the electrical charge generated in the PD outside the charge storage time, the reset MOS transistor 520, connected to the source voltage Vdd, is provided. The operation of the reset MOS transistor 520 is controlled by the control signal ØRa1. The transfer MOS transistor 521 is provided in order to transfer the electrical charge generated in the PD during the charge storage time and the operation of the transfer MOS transistor 521 is controlled by the control signal ØTa1.

The electrical charge transferred from the PD via the transfer MOS transistor 521 is temporarily held in the hold MOS transistor 522, the operation of which is controlled by the control signal ØTa2. The electrical charge temporarily accumulated and held in the hold MOS transistor 522 is then transferred by the transfer MOS transistor 523, the operation of which is controlled by the control signal ØTa. The electrical charge from the PD, transferred by the transfer MOS transistor 523 via the hold MOS transistor 522, is then received at the floating diffusion portion FD.

The FD is connected to the gate of the amplifier MOS transistor AMP 511, which then outputs a signal indicating a level corresponding to the quantity of the electrical charge having been received at the FD. The reset MOS transistor 510 connected to the source voltage Vdd is provided to discharge the electrical charge received at the FD. The operation of the reset MOS transistor 510 is controlled by using the control surface ØR2.

Figure 39:
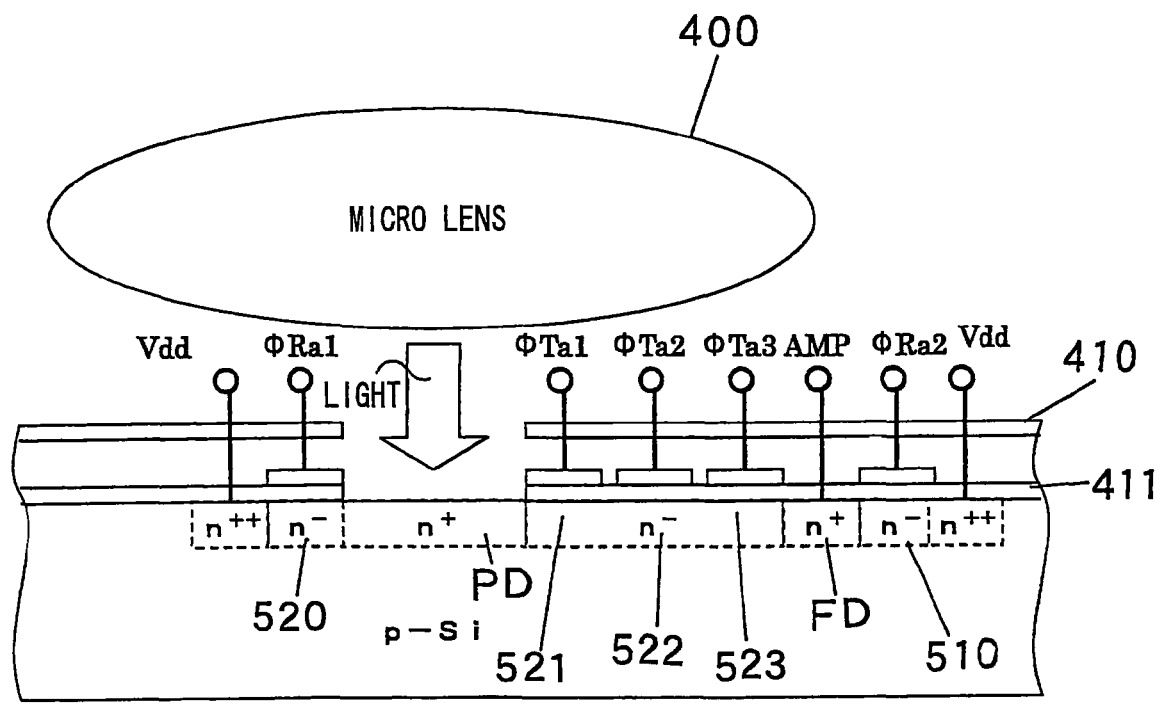
FIG. 39 shows the structure of the focus detection pixels in FIG. 36 in a sectional view through the PD and the FD.

FIG. 39 shows the structure assumed in the focus detection pixels in FIG. 36 in a sectional view taken through the PD and the FD. The focus detection pixels adopt a basic structure similar to that shown in FIG. 33. An n− area is formed adjacent to the PD and this n− area, together with an electrode disposed on the other side of the insulating layer 411 to which the control signal ØRa1 is applied, constitutes the reset MOS transistor 520. Adjacent to the n− area constituting the reset MOS transistor 520, an n++ area is formed, and the source voltage Vdd is connected to this n++ area.

An n− area is formed adjacent to the PD and this n− area, together with an electrode disposed on the other side of the insulating layer 411 to which the control signal ØTa1 is applied, an electrode disposed on the other side of the insulating layer 411, to which the control signal ØTa2 is applied, and an electrode disposed on the other side of the insulating layer 411, to which the control signal ØTa3 is applied, constitutes the transfer MOS transistor 521, the hold MOS transistor 522 and the transfer MOS transistor 523. Adjacent to the n− area constituting the transfer MOS transistor 523, an n+ area, which is to constitute the floating diffusion FD, is formed. The FD is connected to the gate of the AMP.

Adjacent to the FD, an n− area is formed and this n− area, together with an electrode disposed on the other side of the insulating layer 411, to which the control signal ØRa2 is applied, constitutes the reset-MOS transistor 510. An n++ area is formed adjacent to the n− area constituting the reset MOS transistor 510, and the source voltage Vdd is connected to this n++ area.

Figure 40:
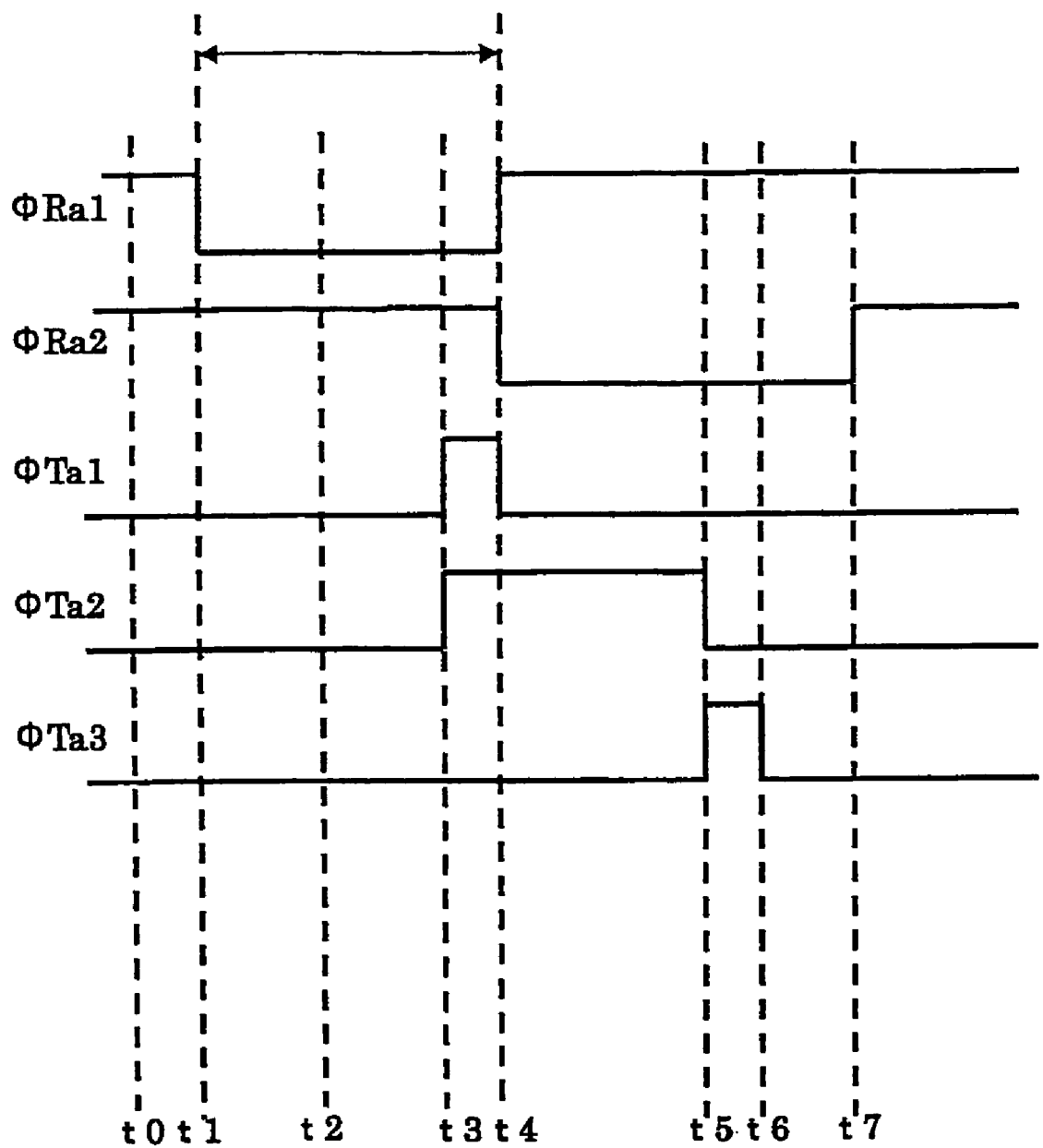
FIG. 40 is a timing chart of the control signals based upon which the focus detection pixels in FIG. 36 are controlled.

FIG. 40 is a timing chart of the control signals used to control the focus detection pixels shown in FIG. 36. FIG. 41 is a potential diagram pertaining to the charge storage and signal output operations executed at the focus detection pixels shown in FIG. 36. At a time point T0 (see FIG. 41A), the PD and the FD at each focus detection pixel are in the reset state (standby state=non-charge storage state), the control signals ØRa1 and ØRa2 are at high (H; ON), the control signals ØTa1, ØTa2 and ØTa3 are at low (L; OFF) and the electrical charge generated in the PD is discharged to the source voltage Vdd. In addition, the residual electrical charge at the FD, too, is discharged to the source voltage Vdd (reset).

At a time point t1, the charge storage starts at the PD. As the control signal ØRa1 shifts to L level, the charge having been generated in the PD starts to accumulate in the PD. At a time point t2 (see FIG. 41B), the PD is in the charge storage-in-progress state. While the control signal ØRa1 remains at L level, the electrical charges having been generated at the PD, i.e., the PD at each of the focus detection pixels is continuously accumulated in the PD. At a time point t3 (see FIG. 41C), the transfer of the electrical charge having been stored in the PD starts. As the control signals ØTa1 and ØTa2 are switched to H level, the transfer of the electrical charge having been stored in the PD starts. The electrical charge having been stored in the PD is transferred to a potential well formed under the electrode to which the control signal ØTa2 is connected.

The charge storage at the PD and the stored charge transfer from the PD end at a time point t4 (see FIG. 41D). Concurrently as the charge storage at the PD ends in response to the switchover of the control signal ØRa1 to H level and the switchover of the control signal ØTa1 to L level, the stored charge transfer also ends. In addition, the control signal ØRa2 is switched to L to end the reset operation for the FD so as to ensure that it is ready to receive the charges having been accumulated in the PD. At a time point t5 (see FIG. 41E), the transfer of the stored charge having been temporarily held in the potential well at the PD starts. As the control signal ØTa2 is switched to L level and the control signal ØTa3 is switched to H level, the transfer of the stored electrical charge at the potential well to the FD starts.

At a time point t6 (see FIG. 41F), the transfer of the stored charge in the PD, having been temporarily held in the potential well, ends. As the control signal ØTa3 is switched to L level, the transfer of the stored electrical charge in the potential well to the FD ends. During the time elapsing between the time point t6 and a time point t7, a signal indicating a level corresponding to the quantity of the electrical charge having been transferred to the FD (electrical charge having been stored in the PD) is output from the pixel via the AMP. At the time point t7 (see FIG. 41G), an FD reset operation starts. The FD reset operation is started by switching the control signal ØRa2 to H level, so as to ready the FD to receive the next stored charge. The electrical charges having been stored in the PD and received at the FD is then discharged to the source voltage Vdd (reset). Subsequently, the operation enters the next charge storage and signal output cycle.

Figure 42:
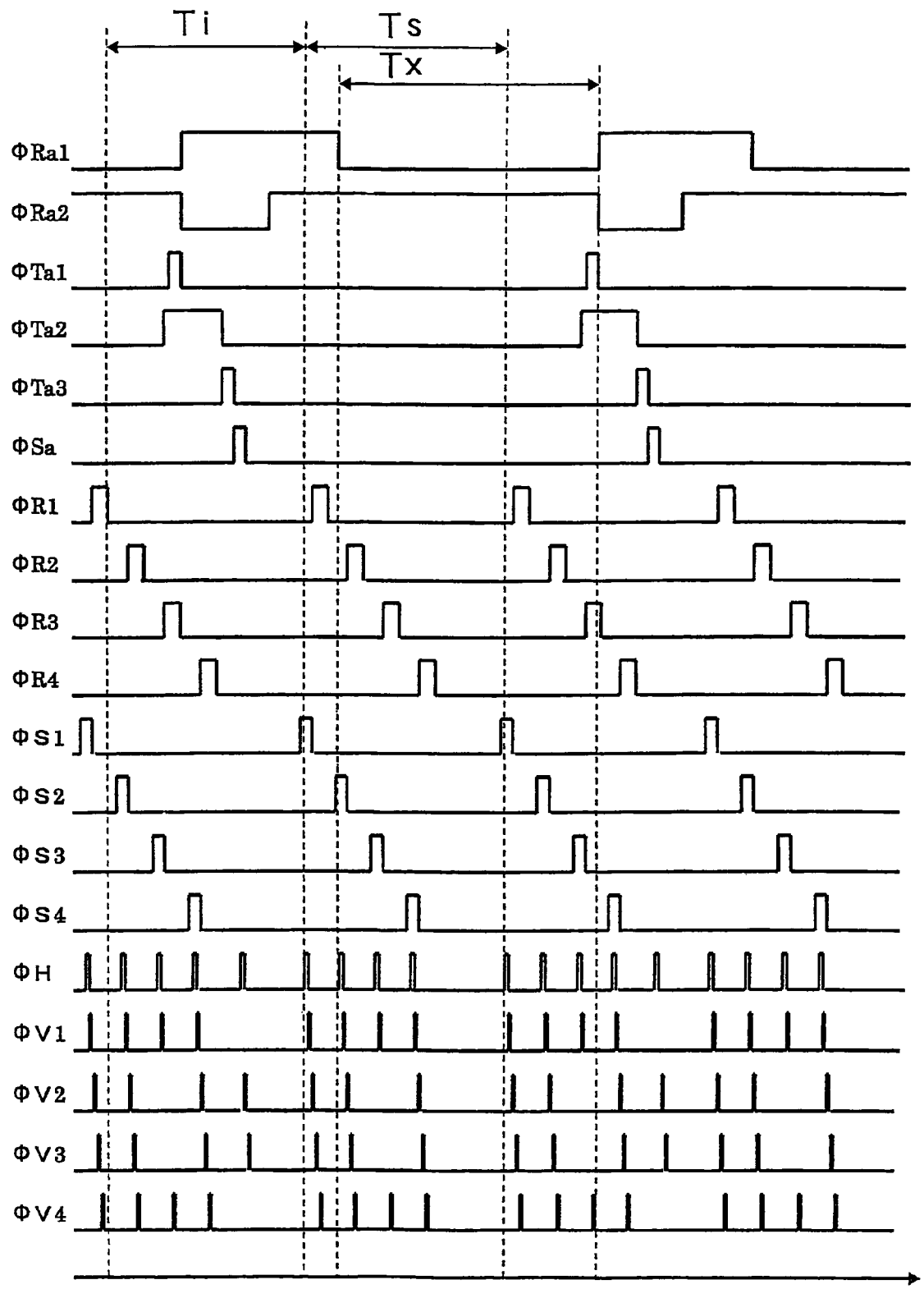
FIG. 42 is an operation timing chart pertaining to the image sensor in the variation shown in FIG. 36.

FIG. 42 presents a timing chart of the operation executed in the image sensor 212G in the variation shown in FIG. 36. The operation timing in the figure differs from that shown in FIG. 24 with regard to the operation of the focus detection pixels 312 and 313. The control signals ØRa1, ØRa2, ØTa1, ØTa2 and ØTa3 are generated with the timing indicated in FIG. 40 to control the focus detection pixels 312 and 313. The operational sequence through which the electrical charge storage at the focus detection pixels 312 and 313 starts and ends, and the stored electrical charges are transferred and temporarily held at the focus detection pixels 312 and 313 controlled based upon the control signals ØRa1, ØRa2, ØTa1 and ØTa2 is completely independent of the operational sequence (charge storage and read) at the image-capturing pixels 310. The operational sequence through which the temporarily held charges are transferred to the FDs and the image signals are read out based upon the control signals ØTa2, ØTa3 and ØSa, on the other hand, is executed in synchronization with the operational sequence (read) at the image-capturing pixels.

During the blank period elapsing between the end of the image signal output from the image-capturing pixels 310 in the fourth row and the start of the image signal output from the image-capturing pixels 310 in the first row, the focus detection pixels 312 and 313 are selected by the control signal ØSa generated as necessary by the vertical scanning circuit 503 and the image signals at the selected focus detection pixels 312 and 313 are output to the vertical signal lines 501. Before the control signal ØSa is generated, the electrical charges having been held temporarily are transferred to the FDs in response to the control signals ØTa2 and ØTa3.

In response to the control signal ØH generated in synchronization with the control signal ØSa, the image signals output to the vertical signal lines 501 from the focus detection pixels 312 and 313 are temporarily held in the signal holding units 502. The image signals from the focus detection pixels 312 and 313, held in the signal holding units 502, are then transferred to the output circuit 506 in response to the control signals ØV2 and ØV3 generated in sequence from the horizontal scanning circuit 505, are amplified to the preset degree at the output circuit 506 and are output to the outside during the blank period.

At the time point at which the transfer of the image signals from the focus detection pixels 312 and 313 to the signal holding units 502 ends, the reset operation for resetting the FDs at the focus detection pixels 312 and 313 is started in response to the control signal ØRa2 generated by the storage control circuit 504. In addition, the control signal ØRa1 is switched to L level with desired timing to start the next charge storage at the focus detection pixels 312 and 313. The charge storage time Tx (exposure time) at the focus detection pixels 312 and 313 extends over the length of time elapsing between the time point at which the reset operation for the focus detection pixels 312 and 313, executed in response to the control signal ØRa1, ends and the time point at which the stored electrical charges are transferred (in response to the control signal ØTa1).

In the example presented in the figure, the image signals at the focus detection pixels 312 and 313 are read out with a cycle twice as long as the image signal read cycle set for the image-capturing pixels 310. In this operation mode, the image signals are cyclically read out from the image-capturing pixels 310 and the blank period is included in the image signal read sequence through which the image signals are cyclically read from the image-capturing pixels 310 so as to read out the image signals from the focus detection pixels 312 and 313 as necessary during the blank period. In addition, the charge storage time at the focus detection pixels 312 and 313 can be set completely independently from the operational sequence of the image-capturing pixels 310.

Figure 43:
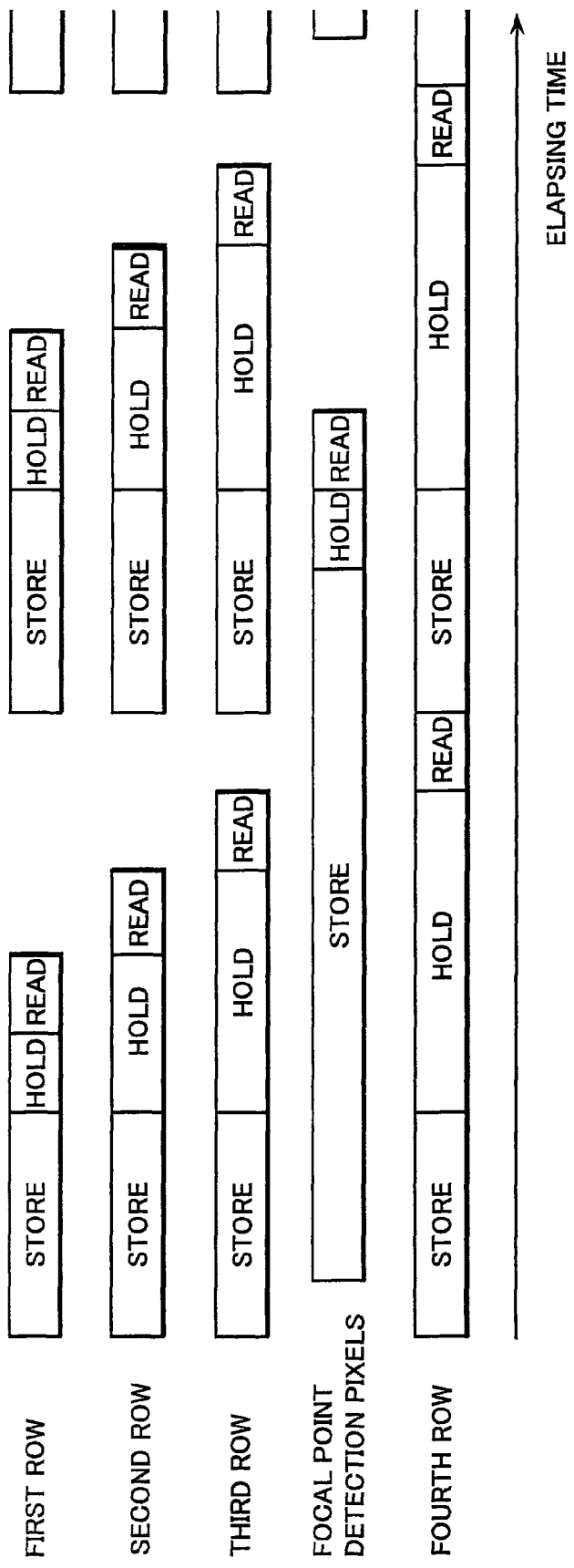
FIG. 43 is a conceptual diagram of the flow of operations executed at an image sensor achieved in a variation.

FIG. 43 is a conceptual diagram of the flow of the operation executed in an image sensor achieved in a variation. While the charge storage at the image-capturing pixels 310 in the image sensor 212D shown in FIG. 26 is executed by adopting the rolling shutter system (electrical charges are stored simultaneously at the image-capturing pixels in a given row but the charge storage timing for each row is offset from the charge storage timing for the preceding row), electrical charges may be stored simultaneously at all the image-capturing pixels, as shown in FIG. 43, instead. The simultaneous charge storage is achieved by adopting a structure similar to that of the focus detection pixels shown in FIG. 37 for the image-capturing pixels, and after the electrical charges are stored simultaneously at all the pixels, the electrical charge having been stored in each image-capturing pixel is temporarily held in the image-capturing pixel. The electrical charges temporarily held in the image-capturing pixels are read out in the order of; the first row, the second row, the third row and the fourth row. The operational cycle of the image-capturing pixels is equal to the sum of the charge storage time and the read times set for the first through fourth rows.

As the operation is executed through this operational sequence, the image signals resulting from the simultaneous charge storage executed at all the image-capturing pixels can be cyclically read and also, the storage time at the focus detection pixels, the charge storage start/end timing at the focus detection pixels and the image signal read from the focus detection pixels can be controlled completely independently of the operational sequence of the image-capturing pixels.

Figure 44:
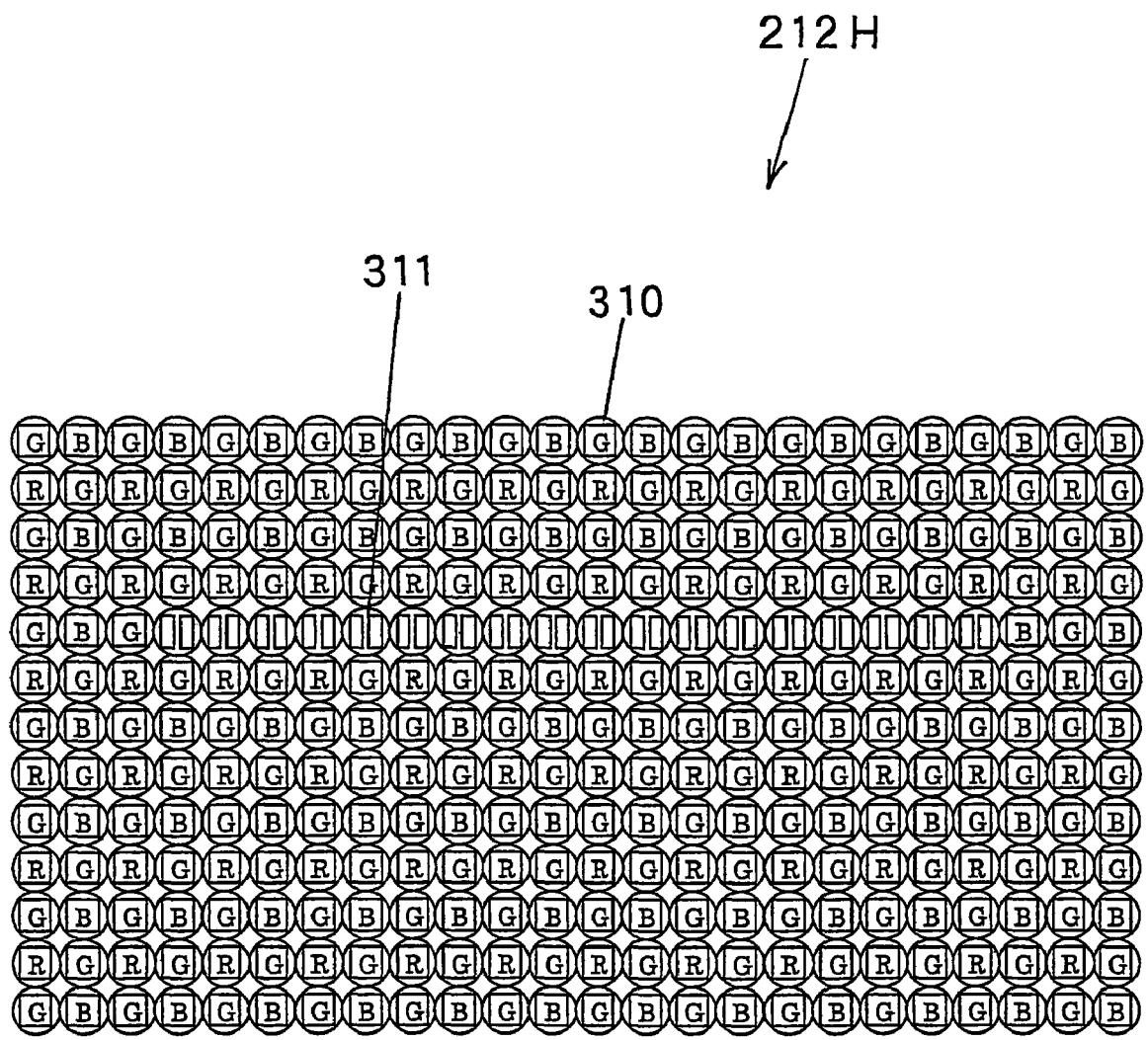
FIG. 44 is a detailed front view of the structure of an image sensor achieved in a variation.

FIG. 44 is a front view showing in detail the structure adopted in an image sensor 212H achieved in a variation. It is to be noted that FIG. 44 shows the vicinity of one of the focus detection areas set on the image sensor 212H in an embodiment and that the lengthwise direction and the widthwise direction assumed in the figure correspond to the lengthwise range and the widthwise range of the photographic image plane in FIG. 2. In the image sensor 212 shown in FIG. 3, each pair of focus detection pixels 312 and 313 respectively shown in FIGS. 5B and 5A works as a unit. Focus detection pixels 311 in the image sensor 212H shown in FIG. 44, on the other hand, each include a pair of photoelectric conversion portions disposed under a single micro-lens.

Figure 45:
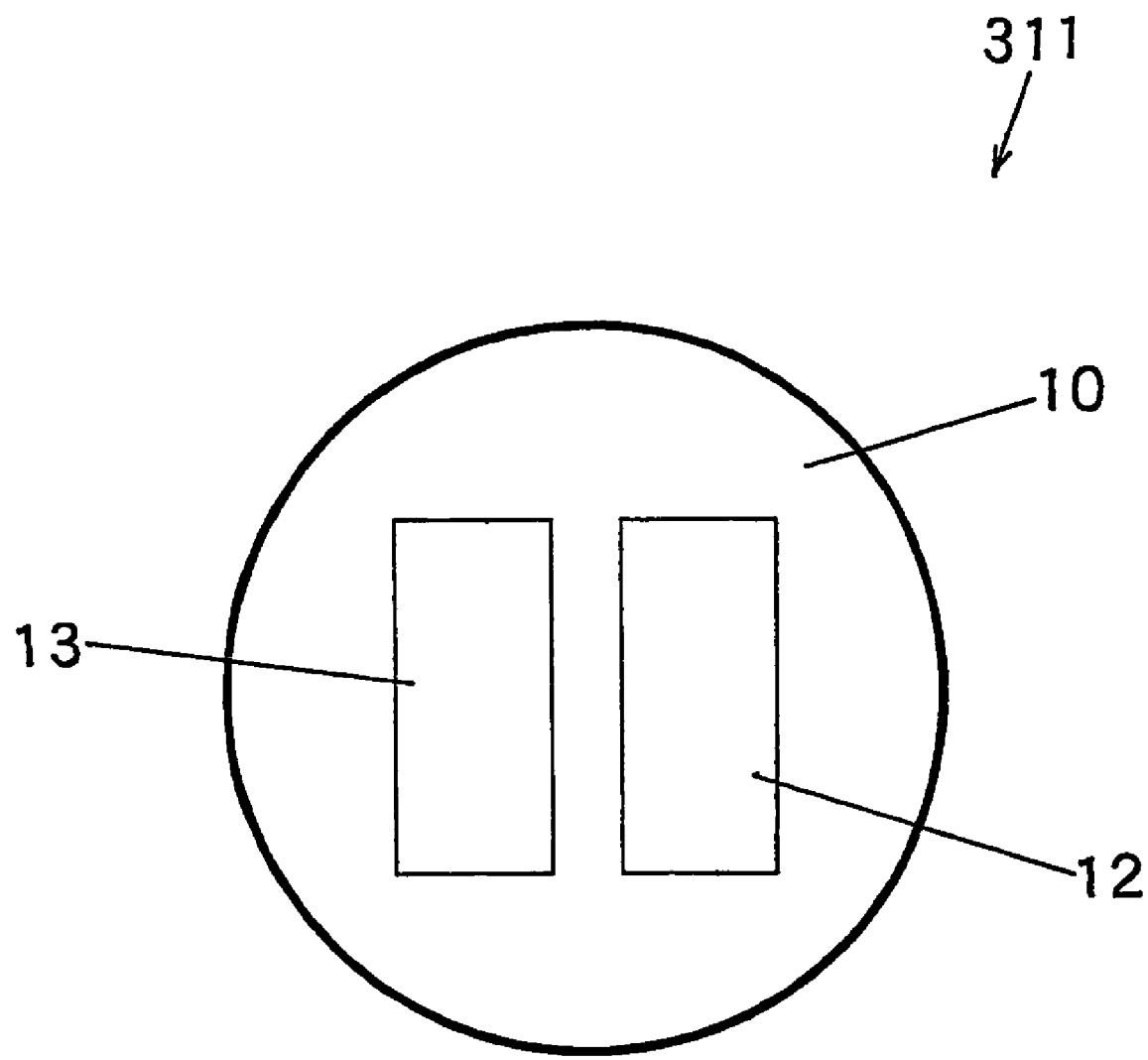
FIG. 45 shows the structure of the focus detection pixels in the image sensor in the variation shown in FIG. 44.

The image sensor 212H comprises image-capturing pixels 310 engaged in image-capturing operation and focus detection pixels 311 engaged in focus detection. As shown in FIG. 45, the focus detection pixels 311 are each constituted with a micro-lens 10 and a pair of photoelectric conversion portions 12 and 13. The photoelectric conversion portions 12 and 13 at the focus detection pixel 311 are designed in a shape that allows the photoelectric conversion portions to receive all the light fluxes passing through specific areas, (e.g., F 2.8) at the exit pupil of the exchangeable lens, via the micro-lens 10.

Figure 46:
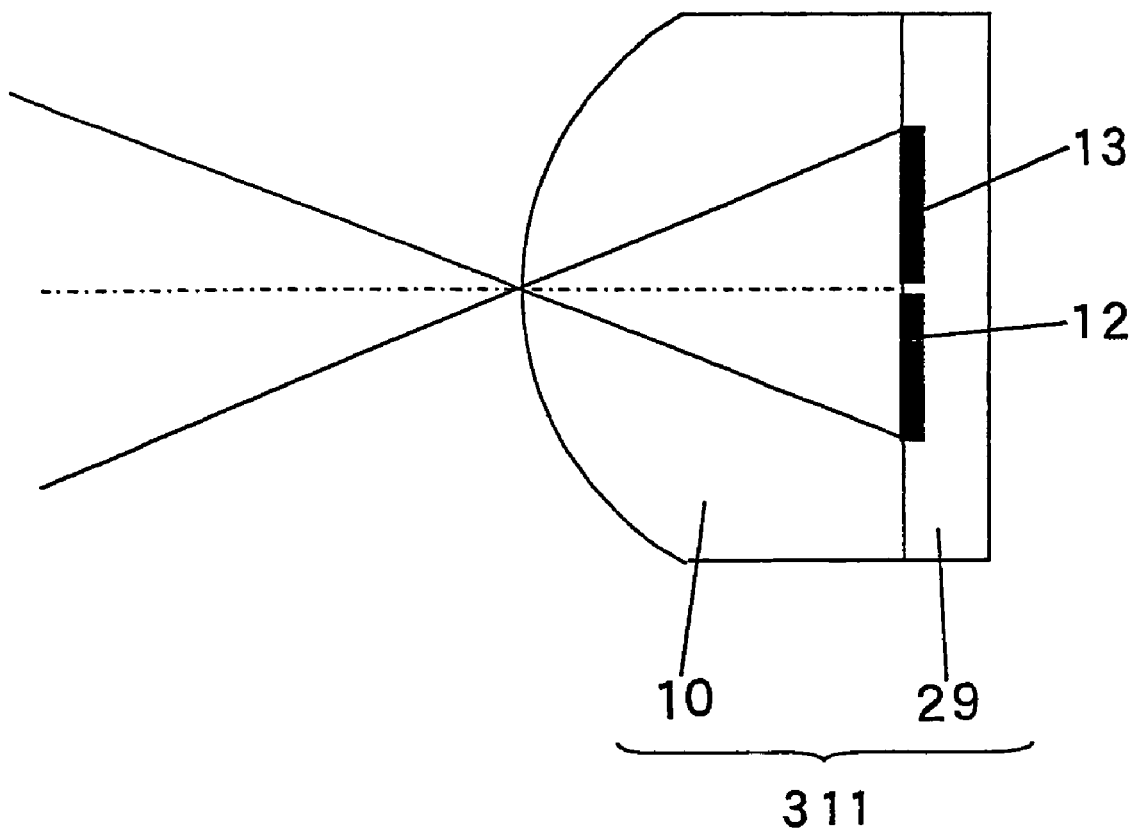
FIG. 46 is a sectional view of a focus detection pixel in the image sensor in the variation shown in FIG. 44.

FIG. 46 is a sectional view of the focus detection pixel 311 shown in FIGS. 44 and 45. In the focus detection pixel 311, the micro-lens 10 is disposed to the front of the photoelectric conversion portions 12 and 13 used for focus detection and thus, images of the photoelectric conversion portions 12 and 13 are projected frontward via the micro-lens 10. The photoelectric conversion portions 12 and 13 are formed on the semiconductor circuit substrate 29.

Figure 47:
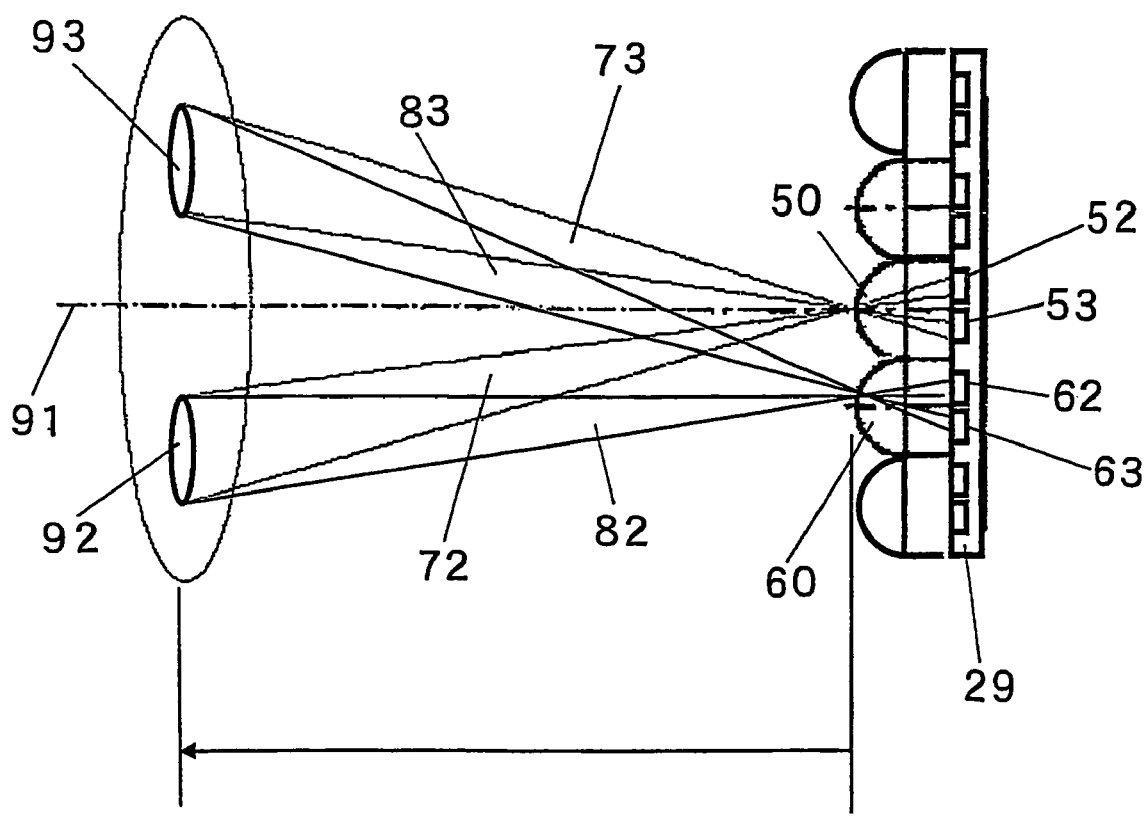
FIG. 47 illustrates focus detection executed by adopting a split-pupil method in conjunction with the use of micro lenses.

FIG. 47 illustrates focus detection executed by adopting a split-pupil method in conjunction with the use of micro-lenses. It is to be noted that its basic principle is similar to that shown in FIG. 10. While the figure schematically illustrates a focus detection pixel disposed on the optical axis 91 (constituted with a micro-lens 50 and a pair of photoelectric conversion portions 52 and 53) and an adjacent focus detection pixel (constituted with a micro-lens 60 and a pair of photoelectric conversion portions 62 and 63), the pair of photoelectric conversion portions at each of the other focus detection pixels receives light fluxes arriving at the corresponding micro-lens from the pair of range-finding pupils. The focus detection pixels are disposed along the direction in which the pair of range-finding pupils 92 and 93 are set side-by-side, i.e., along the direction in which the photoelectric conversion portions in each pair are set side-by-side.

The micro-lenses 50 and 60 are set near the predetermined imaging plane of the exchangeable lens. The shapes of the pair of photoelectric conversion portions 52 and 53 disposed behind the micro-lens 50 are projected via the micro-lens 50 set on the optical axis 91 onto the exit pupil 90 set apart from the micro-lenses 50 and 60 by the projection distance d, and the projected shapes define range-finding pupils 92 and 93. The shapes of the pair of photoelectric conversion portions 62 and 63 disposed behind the micro-lens 60 are projected via the micro-lens 60 set off the optical axis 91 onto the exit pupil 90 set apart by the projection distance d, and the projected shapes define the range-finding pupils 92 and 93.

Namely, the projecting direction for each pixel is determined so that the projected shapes (range-finding pupils 92 and 93) of the photoelectric conversion portions in the individual pixels are aligned on the exit pupil 90 set over the projection distance d. The photoelectric conversion portion 52 outputs a signal corresponding to the intensity of an image formed on the micro-lens 50 with a focus detection light flux 72 having passed through the range-finding pupil 92 and having advanced toward the micro-lens 50. The photoelectric conversion portion 53 outputs a signal corresponding to the intensity of an image formed on the micro-lens 50 with a focus detection light flux 73 having passed through the range-finding pupil 93 and having advanced toward the micro-lens 50. Also, the photoelectric conversion portion 62 outputs a signal corresponding to the intensity of an image formed on the micro-lens 60 with a focus detection light flux 82 having passed through the range-finding pupil 92 and having advanced toward the micro-lens 60. The photoelectric conversion portion 63 outputs a signal corresponding to the intensity of an image formed on the micro-lens 60 with a focus detection light flux 83 having passed through the range-finding pupil 93 and having advanced toward the micro-lens 60.

Numerous focus detection pixels each structured as described above are arranged in a straight row and the outputs from the pairs of photoelectric conversion portions at the individual pixels are integrated into output groups each corresponding to one of the two range-finding pupils 92 and 93. Thus, information related to the intensity distribution of the pair of images formed on the focus detection pixel row with the individual focus detection light fluxes passing through the pair of range-finding pupils 92 and 93 is obtained.

Figure 48:
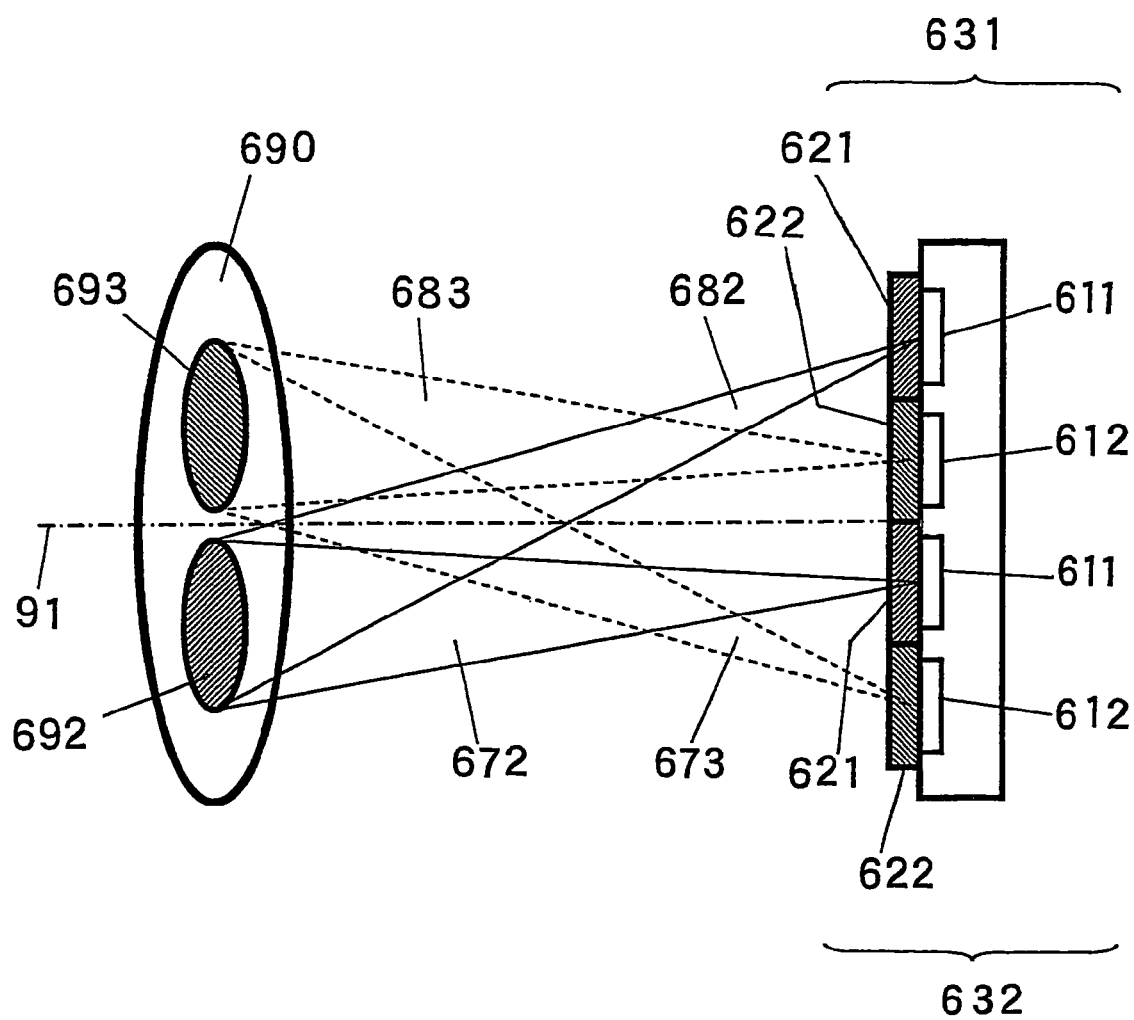
FIG. 48 illustrates a split-pupil method achieved in conjunction with the use of polarization filters.

FIG. 48 illustrates the concept of a split-pupil method achieved in conjunction with polarization filters. The split-pupil method may be adopted in conjunction with polarization filters such as those shown in FIG. 48 as well as in conjunction with micro-lenses. It is to be noted that FIG. 48 schematically shows four pixels adjacent to one another. Reference numeral 690 in the figure indicates a polarization filter holding frame disposed near the aperture of the exchangeable lens, with the area that is not taken up by the polarization filters shielded from light. Reference numeral 692 indicates a polarization filter, and reference numeral 693 indicates a polarization filter with a polarizing direction perpendicular to that of the polarization filter 692. It is to be noted that the range-finding pupils are defined in correspondence to the positions and the shape of the filters 692 and 693. Reference numeral 91 indicates the optical axis of the exchangeable lens. Reference numeral 621 indicates a polarization filter, the polarizing direction of which matches that of the polarization filter 692. Reference numeral 622 indicates a polarization filter, the polarizing direction of which matches that of the polarization filter 693. Reference numerals 611 and 612 each indicate a photoelectric conversion portion. Reference numeral 631 and 632 indicate pixels and reference numerals 672, 673, 682 and 683 each indicate a light flux.

The pixel 631, where the light flux having passed through the range-finding pupil formed by the polarization filter 692 is received at the photoelectric conversion portion 611 through the polarization filter 621, outputs a signal indicating the intensity of the image formed with the light flux 672 or 682. The pixel 632, where a light flux having passed through the range-finding pupil formed by the polarization filter 693 is received at the photoelectric conversion portion 612 through the polarization filter 622, outputs a signal indicating the intensity of the image formed with the light flux 673 or 683.

By disposing numerous pixels 631 and 632 equipped with polarization filters as described above in a two-dimensional array and integrating the outputs from the photoelectric conversion portions of the individual pixels into output groups each corresponding to one of the range-finding pupils, information related to the distribution of the intensity of the pair of images formed on the pixel row with focus detection light fluxes passing through the two range-finding pupils can be obtained. By executing image shift detection calculation processing (correlation arithmetic processing and phase-difference detection processing) on this information, the extent of image shift manifested by the pair of images can be detected through the split-pupil phase-difference detection method.

Figure 49:
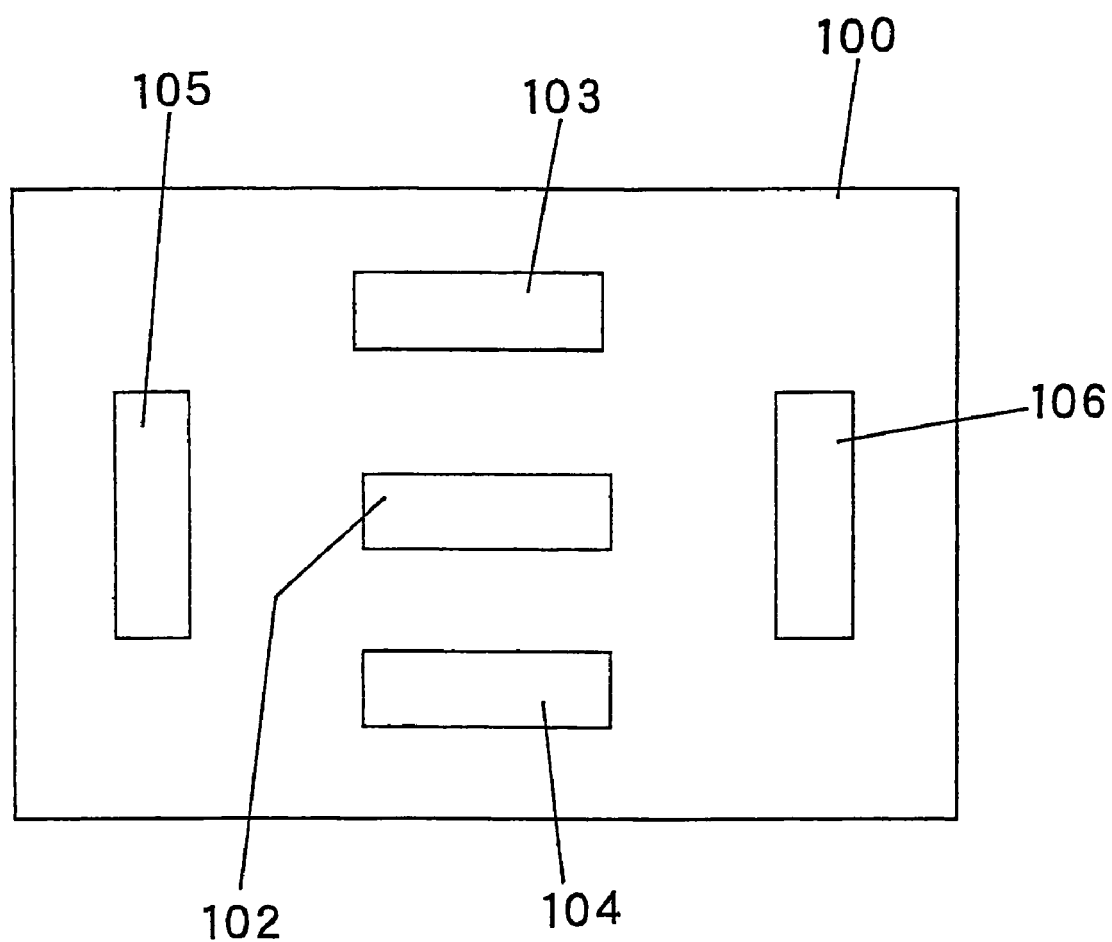
FIG. 49 presents an example of a variation of focus detection positions that may be assumed on the photographic image plane.

The present invention may be also adopted in conjunction with focus detection areas other than the particular focus detection area assuming the specific position in FIG. 2. For instance, the present invention may be adopted in conjunction with the focus detection areas set as shown in FIG. 49. FIG. 49 presents an example of areas (focus detection areas, focus detection positions) at which the image may be sampled on the image plane during focus detection executed over focus detection pixel rows as detailed later. Five focus detection areas 102~106 are set on an image plane 100. Focus detection pixels are disposed in a straight line along the longer side of each focus detection area assuming a rectangular shape. The user may manually select a specific focus detection area among the plurality of focus detection areas by operating an operation member (not shown) in correspondence to the image composition, or all the focus detection areas may be selected and the optimal set of focus detection results among the plurality of sets of focus detection results obtained through the focus detection operation may be automatically selected.

When the operation is executed simultaneously over all the focus detection areas in the embodiment described above, the captured image displayed at the EVF is cyclically refreshed and the length of the charge storage time to elapse at the focus detection pixel in each focus detection area is individually set. Thus, even if there is a significant difference among the levels of brightness in the various focus detection areas, the level of the image data used for the focus detection in each focus detection area can be maintained at an optimal level to enable successful focus detection in all the focus detection areas.

Figure 50:
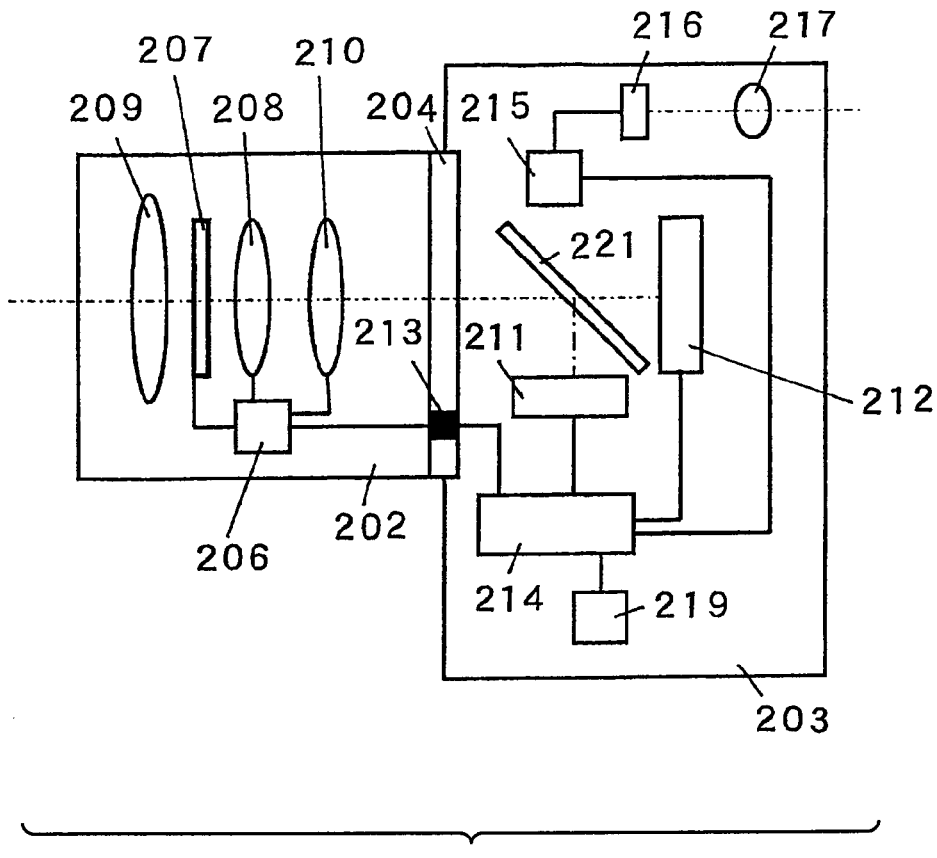
FIG. 50 shows the structure of an image-capturing device achieved in a variation.

FIG. 50 shows the structure adopted in an image-capturing device achieved in a variation. While the image sensor 212 is used both for focus detection and for image-capturing operation in the image-capturing device shown in FIG. 1, an image sensor 212 to be exclusively used for image-capturing operation may be installed as shown in FIG. 50. In such a case, the image sensor 211 according to the present invention may be utilized for focus detection and electronic viewfinder display alone. FIG. 50 shows a half mirror 221, at which a photographic light flux is split, mounted at the camera body 203. The image sensor 212 exclusively used for image-capturing operation is disposed on the transmission side, whereas the image sensor 211 utilized for focus detection and electronic viewfinder display is disposed on the reflection side.

Prior to a photographing operation, focus detection and electronic viewfinder display are executed based upon the output from the image sensor 211. As the shutter is released, image data corresponding to the output from the image-capturing-exclusive image sensor 212 are generated. Instead of the half mirror 221, a total reflection mirror may be used and in such a case, the mirror should be made to retreat from the photographic optical path during the photographing operation. The image processing according to the present invention will be executed entirely for purposes of electronic viewfinder display in this case. It is to be noted that the positional arrangement assumed for the image sensor 211 and the image sensor 212 may be reversed, i.e., the image-capturing exclusive image sensor 212 may be disposed on the reflection side and the image sensor 211 utilized for focus detection and electronic viewfinder display may be disposed on the transmission side.

While the image sensors in FIGS. 2 and 44 include the focus detection pixels disposed without allowing any interval in between in the focus detection area, the focus detection pixels may each be set so as to occupy every few pixel positions. While the focus detection accuracy is somewhat lowered when the arraying pitch with which the focus detection pixels are disposed is increased, the quality of the image resulting from the interpolation processing is improved since the focus detection pixels are set with a lower density.

While the image-capturing pixels in the image sensors shown in FIGS. 2 and 44 are equipped with color filters assuming a Bayer array, the color filters adopting a structure or an array other than those shown in the figures may be used in conjunction with the present invention. For instance, an image sensor that includes complementary color filters, i.e., a G (green) filter, a Ye (yellow) filter, an Mg (magenta) filter and a Cy (cyan) filter, may be used. At this image sensor, the focus detection pixels should be disposed at pixel positions that would otherwise be occupied by image-capturing pixels equipped with cyan filters and magenta filters, i.e., image-capturing pixels equipped with color filters that contain a blue component with which the output error is relatively unnoticeable.

While the focus detection pixels in the image sensors shown in FIGS. 2 and 44 are not equipped with color filters, the present invention may be adopted in conjunction with focus detection pixels equipped with color filters, the color of which matches one of the colors of the color filters at the image-capturing pixels (e.g., green filters).

While the corrected image data are saved into the memory card in the processing shown in the flowchart presented in FIG. 15, the corrected image data may be displayed at the electronic viewfinder or at a rear-side monitor screen disposed on the rear surface of the body.

While the image signals at all the image-capturing pixels in the image sensor are cyclically read out during the EVF display in the explanation provided above, the image signals at some of the image-capturing pixels may be read out through a culled (sub-sampling) read during the EVF display and the image signals at all the pixels may be read out only during the image-capturing operation instead.

While the explanation has been given by assuming that the image sensor is a CMOS image sensor, the present invention may also be adopted in a CCD image sensor. The use of a CCD image sensor allows charges to be stored simultaneously at all the image-capturing pixels. For instance, the charge storage times at the image-capturing pixels and the focus detection pixels may each be independently controlled through separate charge storage control gates and transfer gates so as to store electrical charges at the focus detection pixels during a charge storage time set separately from the charge storage time at the image-capturing pixels and read out the image signals at the focus detection pixels in synchronization with the image signal read from the image-capturing pixels. In this case, the image signals at the focus detection pixels should be read out by adopting an operational flow identical to that shown in FIG. 17.

In addition, by installing a CCD transfer stage to be exclusively used for the image signal read from the focus detection pixels, the operational sequence of the image-capturing pixels and the operational sequence of the focus detection pixels can be controlled completely independently of each other. In this case, the image signals at the focus detection pixels should be read out by adopting an operational flow identical to that shown in FIG. 43.

The image-capturing device according to the present invention may be embodied as a device other than a digital still camera or a film still camera mounted with an exchangeable lens. The present invention may also be adopted in a digital still camera or a film still camera with an integrated lens. It may also be adopted in a compact camera module built into a portable telephone or the like, a surveillance camera or the like as well. The present invention may be further adopted in a focus detection device installed in a device other than a camera, a range-finding device or a stereo range-finding device.

As explained above, by adopting the embodiments, successful focus detection is enabled while refreshing the viewfinder image display over a shorter interval even when the brightness of the subject is low.

The above described embodiments are examples and various modifications can be made without departing from the scope of the invention.

LEGEND

10: micro-lens
10a-d: micro-lens
11: photoelectric conversion portion
12: photoelectric conversion portion
12a,b: photoelectric conversion portion
13: photoelectric conversion portion
13a,b: photoelectric conversion portion
29: semiconductor circuit substrate
50: micro-lens
52: photoelectric conversion portion
53: photoelectric conversion portion
60: micro-lens
62: photoelectric conversion portion
63: photoelectric conversion portion
70: micro-lens
71: photoelectric conversion portion
72: focus detection light flux
73: focus detection light flux
81: image-capturing light flux
82: focus detection light flux
83: focus detection light flux
90: exit pupil
91: optical axis
92: range-finding pupil
93: range-finding pupil 94: area
100: photographic image plane
101: focus detection area
102: focus detection area
103: focus detection area
104: focus detection area
105: focus detection area
106: focus detection area
201: digital still camera
202: exchangeable lens
203: camera body
204: mount unit
206: lens drive control device
207: aperture
208: zooming lens
209: lens
210: focusing lens
211: image sensor
212: image sensor
212A-H: image sensor
213: electrical contact point portion
214: body drive control device
214a: image sensor
214b: A/D conversion circuit
214c: internal memory
214d: CPU
215: liquid crystal display element drive circuit
216: liquid crystal display element
217: eyepiece lens
219: memory card
221: half mirror
310: image-capturing pixel
312: focus detection pixel
312a,b: focus detection pixel
313: focus detection pixel
313a,b: focus detection pixel
322: focus detection pixel
323: focus detection pixel
332: focus detection pixel
333: focus detection pixel
342: focus detection pixel
343: focus detection pixel
400: micro-lens
410: aluminum-shedding film
411: insulating layer
501: vertical signal line
502: signal holding unit
503: vertical scanning circuit
504: storage control circuit
505: horizontal scanning circuit
506: output circuit
507: vertical scanning line
510: reset MOS transistor
511: transfer AMP
512: row selector MOS transistor
513: transfer MOS transistor
520: reset MOS transistor
521: transfer MOS transistor
522: hold MOS transistor
523: transfer MOS transistor
611: photoelectric conversion portion
612: photoelectric conversion portion
621: polarization filter
622: polarization filter
631: pixel
632: pixel
672: light flux
673: light flux
682: light flux
683: light flux
690: polarization holding frame
692: polarization filter
693: polarization filter

What is claimed is:

1. An image sensor comprising:
image-capturing pixels that generate first image signals to be used for displaying an image;
focus detection pixels that generate second image signals to be used for focus detection; and
a storage control unit that controls a charge storage time of each of the image-capturing pixels and the focus detection pixels, wherein:
each of the image capture pixels and each of the focus detection pixels is physically different from each other in a structure of a photoelectric conversion portion;
the storage control unit outputs a first storage control signal through a first signal line for controlling the charge storage time of the image-capturing pixels disposed in a line and a second storage control signal, which is independent from the first storage control signal, through a second signal line, which is different from the first signal line, for controlling the charge storage time of the focus detection pixels disposed in the line.

2. An image sensor according to claim 1, wherein:
the image-capturing pixels are each equipped with an image-capturing photoelectric conversion portion at which an electrical charge corresponding to light entering therein during the first charge storage time is stored, and an image-capturing output unit that outputs a signal corresponding to a quantity of the electrical charge having been stored at the photoelectric conversion portion following a storage end; and
the focus detection pixels are each equipped with a focus detection photoelectric conversion portion at which an electrical charge corresponding to light entering therein during the second charge storage time is stored, a charge holding unit that temporarily holds the electrical charge having been stored at the photoelectric conversion portion following a storage end and a focus detection output unit that outputs an image signal corresponding to a quantity of the electrical charge held in the charge holding unit.

3. An image sensor according to claim 2, wherein:
each of the image-capturing output unit and the focus detection output unit each comprises a floating diffusion portion to which the electrical charge having been stored in the photoelectric conversion portion is transferred and an amplifier portion that outputs the image signal corresponding to the quantity of the electrical charge having been transferred to the floating diffusion portion.

4. An image sensor according to claim 1, wherein:
the second image signals are used for a focus detection according to a phase difference detection method; and
the focus detection pixels are each equipped with a pair of photoelectric conversion portions.

5. An image sensor according to claim 1, wherein:
the second image signals are used for a focus detection according to a phase difference detection method; and
the focus detection pixels include first focus detection pixels each equipped with a first photoelectric conversion portion and second focus detection pixels each equipped with a second photoelectric conversion portion to be paired up with the first photoelectric conversion portion.

6. An image sensor according to claim 1, wherein:
charge control is executed so as to store electrical charges at all the image-capturing pixels through a uniform charge storage time and storage starts and ends at all the image-capturing pixels in each row with matching timing.

7. An image sensor according to claim 1, wherein:
after reading out electrical charges having been stored at the image-capturing pixels, the first storage control signal resets the stored charges; and
after reading out electrical charges having been stored at the focus detection pixels, the second storage control signal does not always reset the stored charges.

8. An image sensor according to claim 1, wherein:
the storage control unit outputs the first storage control signal and the second storage control signal independently from each other so that the charge storage time of the image-capturing pixels and the charge storage time of the focus detection pixels in the line are different from each other.

9. An image sensor according to claim 1, wherein:
before a shutter release occurs, the storage control unit outputs the first storage control signal and the second storage control signal independently from each other so that the charge storage time of the image-capturing pixels and the charge storage time of the focus detection pixels in the line are different from each other.

10. An image sensor according to claim 9, wherein:
after a shutter release occurs, the storage control unit outputs the first storage control signal and the second storage control signal at the same timing so that the charge storage time of the image-capturing pixels and the charge storage time of the focus detection pixels in the line are consistent with each other.

11. An image sensor according to claim 1, wherein:
the first storage control signal is a reset signal for resetting charge storages of the part of the image-capturing pixels;
the second storage control signal is a reset signal for resetting charge storages of the focus detection pixels; and
a cycle of the first storage control signal is different from a cycle of the second storage control signal.

12. The image sensor according to claim 1, further comprising:
a plurality of first focus detection pixels;
and a plurality of second focus detection pixels, wherein:
the first focus detection pixels and the second focus detection pixels are alternately disposed along a single horizontal row in the image sensor.

13. The image sensor according to claim 1, wherein adjacent ones of the image focus sensors are physically different from each other in the structure of the photoelectric conversion portion.

14. An image-capturing device, comprising:
an image sensor according to claim 1;
a control unit that executes storage time control and output read control for the image sensor;
a display unit at which display is brought up based upon the first image signals; and
a focus detection unit that detects a focus adjustment state of an image-capturing optical system based upon the second image signals, wherein:
the control unit concurrently executes the storage time control for the image-capturing pixels and the storage time control for the focus detection pixels, controls storage at the image-capturing pixels by using the first storage control signal, brings up a display at the display unit by reading the first image signals over a predetermined cycle, controls storage at the focus detection pixels independently of the storage at the image-capturing pixels by using the second storage control signal and engages the focus detection unit in focus detection by reading out the second image signals in synchronization with the predetermined cycle.

15. An image-capturing device according to claim 14, wherein:
the control unit reads out the first image signals and the second image signals sequentially in an order corresponding to a positional arrangement assumed for the image-capturing pixels and the focus detection pixels and also specifies whether the second image signals having been read are valid or invalid.

16. An image-capturing device according to claim 14, wherein:
the control unit executes read of the first image signals and read of the second image signals independently of each other.

17. An image-capturing device according to claim 14, wherein:
the control unit reads out the first image signals from some of the image-capturing pixels.

18. An image-capturing device according to claim 14, further comprising:
a recording unit that records image signals, wherein:
the control unit engages the image-capturing pixels and the focus detection pixels in parallel operation and records into the recording unit the first image signals and the second image signals obtained by executing storage control for the image-capturing pixels and the focus detection pixels to store electrical charges through a uniform storage time based upon the first storage control signal and the second storage control signal.

19. An image-capturing device according to claim 14, wherein:
after reading out electrical charges having been stored at the image-capturing pixels, the first storage control signal resets the stored charges; and
after reading out electrical charges having been stored at the focus detection pixels, the second storage control signal does not always reset the stored charges.

20. An image-capturing device, comprising:
an image sensor that captures an image formed by an image-capturing optical system and comprises image-capturing pixels that generate display image signals and focus detection pixels that generate focus detection image signals;
a control unit that executes storage time control and output read control for the image sensor;
a display unit at which display is brought up based upon the display image signals; and
a focus detection unit that detects a focus adjustment state at the image-capturing optical system based upon the focus detection image signals, wherein:
each of the image-capturing pixels and each of the focus detection pixels is physically different from each other in a structure of a photoelectric conversion portion,
the control unit engages the image-capturing pixels and the focus detection pixels in parallel operation, executes storage control so as to store electrical charges at the image-capturing pixels and the focus detection pixels through a uniform storage time, brings up a display at the display unit by reading out the display image signals over a predetermined cycle through a destructive read and engages the focus detection unit in focus detection by reading out the focus detection image signals over the predetermined cycle through a non-destructive read.

21. An image-capturing device according to claim 20, wherein:
the focus detection unit detects the focus adjustment state at the image-capturing optical system by executing a phase difference detection method based upon the focus detection image signals.

22. An image-capturing device, comprising:
an image sensor that captures an image formed by an image-capturing optical system and comprises image-capturing pixels that generate display image signals, focus detection pixels that generate focus detection image signals and an output unit that amplifies the display image signals and the focus detection image signals and outputs amplified signals;
a control unit that executes storage time control and output read control for the image sensor;
a display unit at which display is brought up based upon the display image signals; and
a focus detection unit that detects a focus adjustment state at the image-capturing optical system based upon the focus detection image signals, wherein:
each of the image-capturing pixels and each of the focus detection pixels is physically different from each other in a structure of a photoelectric conversion portion,
the control unit engages the image-capturing pixels and the focus detection pixels in parallel operation, executes storage control so as to store electrical charges at the image-capturing pixels and the focus detection pixels through a uniform storage time, brings up a display at the display unit by reading out over a predetermined cycle the display image signals having been amplified with a predetermined amplification factor in the output unit and engages the focus detection unit in focus detection by reading out the focus detection image signals having been amplified to an amplification degree different from the predetermined amplification degree in the output unit in synchronization with read of the display image signals.

23. An image-capturing device according to claim 22, wherein:
the focus detection unit detects the focus adjustment state at the image-capturing optical system by executing a phase difference detection method based upon the focus detection image signals.

* * * * *